(12) United States Patent
Chan et al.

(10) Patent No.: US 6,192,054 B1
(45) Date of Patent: Feb. 20, 2001

(54) ACCELERATED FIBRE CHANNEL HUB AND PROTOCOL

(75) Inventors: Kurt Chan, Roseville; Alistair D. Black, Los Gatos, both of CA (US)

(73) Assignee: Gadzoox Networks, Inc.

( * ) Notice: Under 35 U.S.C. 154(b), the term of this patent shall be extended for 0 days.

(21) Appl. No.: 09/074,992

(22) Filed: May 8, 1998

Related U.S. Application Data

(63) Continuation of application No. 08/695,290, filed on Aug. 8, 1996, now Pat. No. 5,751,715.

(51) Int. Cl.[7] .................................................. H04L 12/42
(52) U.S. Cl. .......................................... 370/452; 370/461
(58) Field of Search ..................................... 370/404, 424, 370/444, 450, 451, 452, 455, 461, 462, 458, 459, 460; 340/825.05, 825.5, 825.51

(56) References Cited

U.S. PATENT DOCUMENTS

| | | | |
|---|---|---|---|
| 4,736,465 | * 4/1988 | Bobey et al. | 359/166 |
| 5,831,985 | * 11/1998 | Sandorfi | 370/468 |
| 5,848,251 | * 12/1998 | Lomelino et al. | 710/129 |

* cited by examiner

*Primary Examiner*—Chi H. Pham
*Assistant Examiner*—Kwang B. Yao
(74) *Attorney, Agent, or Firm*—Ronald C. Fish; Falk & Fish

(57) ABSTRACT

An apparatus for accelerated Fiber Channel protocol handshaking and data exchange involves dividing a Fiber Channel arbitrated loop architecture up into a plurality of arbitrated subloops, each of which arbitrates locally using the same fundamentals as the Fiber Channel arbitration protocol but with some slight modifications which do not affect the compatibility of standard Fiber Channel nodes. Each subloop is coupled to a hub port which contains a state machine which implements distributed intelligence to do switching function and fill word generation to implement the accelerated protocol by using a plurality of switching, fill word generation and token passing rules. The state machine in each hub port is coupled to its local subloop and to its neighboring hub ports through a single TDMA bus which has timeslots dedicated to carrying broadcast loop and return loop traffic and control token traffic. In some embodiments, the hub ports are coupled to their neighboring hub ports by separate broadcast and return loops and a control loop used for token passing.

12 Claims, 43 Drawing Sheets

ARBITRATED LOOP NODE

FRAMES AND FILL WORDS

| PRIMITIVE SIGNAL | MEANING | ORDERED SET | | |
|---|---|---|---|---|
| ARB (x) | ARBITRATE | K28.5 | D20.4 | AL_PA |
| ARB(FO) | ARBITRATE (FO) | K28.5 | D20.4 | AL_PA D16.7 |
| OPNyx | OPEN FULL-DUPLEX | K28.5 | D17.4 | AL_PD AL_PS |
| OPNyy | OPEN HALF-DUPLEX | K28.5 | D17.4 | AL_PD AL_PD |
| OPNfr | OPEN BROADCAST | K28.5 | D17.4 | AL_PD D31.7 |
| OPN yr | OPEN MULTICAST | K28.5 | D17.4 | AL_PD D31.7 |
| CLS | CLOSE | K28.5 | D5.4 | D21.5 D21.5 |
| MRKtx | MARK | K28.5 | D31.2 | MK_TP AL_PS |

: FC-AL PRIMITIVE SIGNALS

FIG. 3
PRIOR ART

PHYSICAL ARBITRATED LOOP WITH FOUR NODES

FC-AL TENANCY

SCSI WRITE OPERATION ON FC-AL

LOCAL ARBITRATION - NO TOKEN

FIRST EMBODIMENT
LOCAL DESTINATION
AND SOURCE

ACCELERATED
HUB ARCHITECTURE
FIBRE CHANNEL

DESTINATION REMOTE
CLS PROPAGATION

LOCAL DESTINATION
"DSH CONFIGURATION"
OPN PROPAGATION

LOCAL DESTINATION
"DSH CONFIGURATION"
CLS PROPAGATION
SOURCE INITIATED CLS

LOCAL DESTINATION
"SDH CONFIGURATION"
DATA PROPAGATION

LOCAL DESTINATION
"SDH CONFIGURATION"
CLS PROPAGATION
SOURCE NODE INITIATES CLOSE

LOCAL DESTINATION
"SDH CONFIGURATION"
CLS PROPAGATION
DESTINATION INITIATES CLOSE

LOCAL DESTINATION
"DSH CONFIGURATION"
CLS PROPAGATION
DESTINATION INITIATES CLS

LOCAL DESTINATION
"SDH CONFIGURATION" OR "DSH CONFIGURATION"
CLS PROPAGATION
SIMULTANEOUS CLS INIT

REMOTE DESTINATION
SIMULTANEOUS CLS PROPAGATION

LOCAL DESTINATION SDH PROCESSING

TERMINAL 4
CONTROL
STATES

TERMINAL 3 CONTROL

FIG. 32 TERMINAL 1 CONTROL

FILL WORD GENERATOR

ACCELERATED FIBRE CHANNEL HUB AND PROTOCOL

This application is a continuation of Ser. No. 08/695,290 filed Aug. 8, 1996, now U.S. Pat. No. 5,751,715.

FIELD OF USE

The invention is an improvement on the Fibre Channel Arbitrated Loop (FC-AL) protocol as defined by ANSI standard X3.272-199x revision 4.5. The invention perfoms an acceleration of data network traffic between two nodes through the elimination of node latency by bypassing nodes which are not participating in communication.

BACKGROUND OF THE INVENTION

Since traffic on a physical loop flows through many ports on the loop, including the connecting fiber or copper links, the two primary sources of latency on an arbitrated loop come from:

a) link propagation latency due to link length;
b) node latency (a maximum of 6 Fibre Channel (hereafter FC) words, or 240 bits.

These latencies have been demonstrated to be the primary cause of degraded performance for applications such as SCSI over Fibre Channel.

FIG. 1 shows an FC-AL node with a 6-word FIFO. It has a transmit port 1 and a receive port 2. Each FC unencoded 8-bit character is translated to 10 bits when encoded on the serial link via the 8-bit to 10-bit encoding as defined by the Fibre Channel Physical and Signalling Interface (FC-PH) standard, ANSI X3.230-199x. There are four characters per FC word. The 6 FC word FIFO is the cause of the 6 word delay between the time an FC word arrives on receive port 2 and is retransmitted on transmit port 1.

FIG. 2 shows the relationship between data frames and primitives. A primitive is a FC word which occupies the Inter-frame spaces, and has special meaning for flow control and loop management.

The primitives relevant to the invention are shown in FIG. 3. The ARB and OPN primitives contain addressing information. The ARB contains the address of the arbitrating node designated in FIG. 4 as AL_PA. The AL_PA is duplicated in the fourth character. The OPN primitive contains the destination node address (AL_PD) in the third character and the source node address (AL_PS) in the fourth character. Fill words are ARB primitives or IDLE primitives which are used by FC-AL nodes to perform loop signalling. Therefore, all fill words are primitives, but not all primitives are fill words.

FIG. 4 shows a four-node arbitrated loop having the prior art architecture. The output of one node is connected to the input of the subsequent node, and so on. The sum of the latencies of the nodes (each node's 6 word delay) plus the inter-node link propagation delays is referred to as the "system latency."

FIG. 5 shows a "loop tenancy," the hanshaking protocol traffic which occurs between nodes before the loop is relinquished and other nodes are allowed to communicate. A loop tenancy protocol is carried out so that a source node and a destination node can acquire the loop for their exclusive use in a data transfer operation. Each node has a priority ranking which is used during a process called arbitration. Arbitration is a process to decide which of 2 or more nodes which are simultaneously requesting control of the loop will get control of the loop. In the loop tenancy protocol shown in FIG. 5, an arbitration occurs, followed by an open (transmitted by the winning node), followed by transmission of one or more data frames, followed by a close (which can be transmitted by either node).

There follows a more detailed discussion of each phase of the loop tenancy protocol.

Arbitration:

A node knows when it has won arbitration when it sees an inbound ARB primitive containing it's own AL_PA priority ranking. Algebraically small AL_PAs are higher priority than algebraically large AL_PAs. If a port wishes to arbitrate and it receives a lower priority arbitration, it subsitutes its own ARB, i.e., it transmits an ARB with its own AL_PA. If it receives a higher priority ARB, it passes that higher priority ARB.

Open:

OPNs are passed by a receiving port if the destination address does not match the AL_PA of the receiving port.

Permission to Send:

RRDYs (permission to send) are returned by the OPN recipient, i.e., the node having the AL_PA which matches the AL_PD in an OPN primitive. Each RRDY received by the OPN initiator gives the OPN initiator permission to transmit one data frame. In the zero BB_Credit model supported by the second embodiment of the invention, the OPN initiator may not transmit data until one or more RRDYs are received.

Close:

A CLS primitive may be initiated by either node engaged in data transfer operation. If a node receives a CLS and did not originate a CLS, it must forward it. If both nodes originate a CLS simultaneously, since there is no addressing in a CLS, both nodes will believe the incoming CLS from the other node was their CLS, and both will close the loop concurrently.

Peformance:

FIG. 6 shows a series of loop tenancies which make up a SCSI Write operation. There are four loop tenancies in a write operation: one for sending the write command, one for acknowledging receipt of the write command by a disk drive, one for sending the actual write data, and one for acknowledging receipt of the write data by the disk drive. Each ARB and CLS must be passed through every node, while each Data frame and OPN primitive must be passed through, on the average, half the ports on the loop (since Data and OPN are not propagated by the destination node).

With 4 loop tenancies and an average of 3 round trips per tenancy, there are 12 round trips per SCSI write command.

Multiply this by the number of nodes on the loop and again by 6 words per node to get 72×N word delays per SCSI write command.

For a fully configured loop (126 nodes), this is 72×126= 9072 word delays, or 9072×40=363 kbit delays. At 1.062 Gbits/sec, this equals 341 microseconds of link overhead per SCSI write command.

For disk drives which have around 500 microseconds of controller software and hardware overhead, having a fixed 341 microsecond delay due just to FC-AL overhead significantly reduces the number of SCSI operations per second per arbitrated loop.

FIG. 7 demonstrates the expected decrease in system latency when the Accelerator Hub is used. This figure assumes:

1) a uniform distribution of FC ports connected to Accelerator Hub ports. For example, for 80 ports on the X-axis, a 4-port Accelerator would have 20 FC ports per hub port, and an 8-port Accelerator would have 10 FC ports per hub port.

2) 6 word delays per FC port. Each word delay is equal to 240 ns (40 bits per word at 1 Gb/s)

3) A 70%/30% mix of write operations to read operations 4) 3 FCP (round trip delays per read and 4 FCP round trip delays per write (Command/Data/Status or Command/Transfer Ready/Data Status)

5) 3 round trip delays per FCP Sequence (ARB=1, OPN-RRDY=1, Data/CLS=1)

Prior Art Solutions and Limitations

Solutions to the latency problem on arbitrated loop involve modifying the end to end protocol to minimize traffic or hide latency behind pipelining, rather than eliminating the latency altogether.

There are four known prior art methods of accelerating arbitrated loop operations:

1) Nonzero BB_Credit
2) TRANSFER mode
3) Dual loops
4) FL ports connected to Fibre Channel switches Nonzero BB_Credit allows a source node to transmit a specific number of data frames without receiving any RRDY primitives. While this hides a return latency to send data when opening a destination node, the destination node cannot initiate or forward a CLS primitive until it can guarantee it can accept a specific number of frames from another source node, should that other source node open it immediately. Thus, for a destination node which cannot empty data buffers quickly, the latency has merely been moved from the open operation to the close operation. Furthermore, the negotiation of how many frames can be transmitted without an RRDY being received involves complex software, and is not implemented by all FC-AL products. Nonzero BB_credit can be used in conjunction with embodiment 1 to gain even further acceleration.

TRANSFER mode involves the use of multiple opens and closes without re-arbitrating by being "unfair". After closing, the winning node does not allow ARBs to pass, instead examining the addresses of the incoming ARBs and issuing OPNs to the ports which are attempting to arbitrate.

However, this assumes the winning node knows that it is the desired destination of the arbitrating nodes. This technique only works on single SCSI initiator loops where the destination of arbitrating SCSI targets must be the single initiator. If target to target communication is needed (e.g., SCSI COPY), this technique does not work.

Dual loops can allow communication on one loop while the other loop is busy. Although the invention does not preclude this solution, the dual loop solution requires additional cost which is not necessary if the invention is used.

The FL Port is a port which allows loops to be connected together via a Fibre Channel switch. It is possible to map loop tenancies to a class 1 connection. The purpose of this is to allow existing FC-AL devices to connect through existing Fibre Channel switches which do not intrinsically support loop connectivity. However, there are difficulties when the class 1 connections must be queued or cannot be established. Furthermore, there is significant performance overhead in establishing the class 1 connection which is not present with the invention.

In general, the limitations of prior art methods 1–3 are that all participating nodes must have implemented the unique end to end protocol enhancements which lead to latency hiding or traffic minimization. Since these techniques are not broadly agreed on or standardized, interoperability between such nodes is less likely than if existing standards are observed by the end nodes, and the end nodes are connected to the invention. The limitation of method 4 is that there are inefficient protocols (manifested by both hardware and software) which must be implemented on top of the FC-AL protocol in order to communicate across an existing FC switch.

SUMMARY OF THE INVENTION

The broad genus of apparatus constructed according to the teachings of the invention to achieve accelerated Fibre Channel protocol handshaking and data exchange has three different attributes which achieve acceleration, each of which may be used together with one or more of the others or alone. These three attributes are: simultaneous arbitration on each of several local subloops to find local winners simultaneously so that as soon as the ARB token arrives, the highest ranking node at that subloop currently desiring access is already known; broadcasting the OPNs simultaneously to all subloops and simultaneously circulating the OPNs on each subloop so as to locate the destination node sooner than would be the case if the OPN were forced to pass serially through each node in the entire network to find the destination node; and, after the subloop upon which the destination node resides is found, performing switching in each hub port so as to remove from the data path all subloops not having either the source node or destination node coupled thereto.

More specifically, the broad genus of apparatus according to the teachings of the invention includes species which are characterized by dividing a Fibre Channel arbitrated loop architecture up into a plurality of arbitrated subloops. Each of these subloops and the hub port to which it is connected arbitrates locally using the same fundamentals as the Fibre Channel arbitration protocol but with some slight modifications which do not affect compatibility of standard Fibre Channel nodes with the hub ports. Each hub port contains a state machine which does switching function and fill word generation to implement the accelerated protocols described herein by using a plurality of switching, fill word generation and token passing rules. Each species within the genus of the invention will implement in its hub port state machines one or more of the three acceleration attributes described in the opening paragraph of this Summary of the invention section.

In the preferred embodiment, the state machine in each hub port is coupled to its local subloop and to its neighboring hub ports through a single TDMA bus which has timeslots dedicated to carrying broadcast loop and return loop data path traffic and control token traffic. In another embodiment, the hub ports are coupled to their neighboring hub ports by separate broadcast and return loops for the data path and a separate control loop used for token passing. This embodiment uses a preferred three token control and management protocol. In another embodiment, only a single ARB token is passed and a broadcast loop and return loop (or the equivalent timeslots in a TDMA bus) are used as the data path.

The preferred embodiment according to the teachings of the invention uses the distributed intelligence of the state machines in each hub port to achieve acceleration in a Fibre Channel Arbitrated Loop protocol by performing the following steps: allowing simultaneus local arbitration in all subloops; notifying the local arbitration winner on a subloop coupled to a hub port when an ARB token arrives at that hub port; broadcasting an OPN primitive to all hub ports and subloops to start the process of finding the subloop upon which the destination node is located; identifying the subloop upon which the destination node is found; establishing switching connections to connect the subloop on which the source node is found to the subloop on which the destination node is found and bypassing all subloops upon which neither the source nor destination node is found; completing a data transfer from the source node to the destination node and closing the connection between the source node subloop and the destination node subloop. Numerous hardware and software implementations may exist to carry out this basic process or one of the three main accelaration techniques thereof. All such implementations are within the scope of the invention and are intended to be included within the scope of the appended claims.

BRIEF DESCRIPTION OF THE DRAWINGS

FIG. 3 is a table of the various prior art primitives that are defined in the prior art Fibre Channel protocol and there data structure and recognition codes and meaning.

DETAILED DESCRIPTION OF THE PREFERRED EMBODIMENT

Referring to FIG. 8, there is shown a block diagram of an improved accelerated Arbitrated Loop Fibre Channel protocol network. The network has been broken down into four subloops in accordance with the teachings of the invention. Subloop "A" is comprised of three nodes designated A1, A2 and A3. Each one of these nodes can be a unit such as a disk drive, server, etc. Likewise, the three other subloops have three nodes also. For example subloop "B" has nodes B1, B2 and B3 and likewise for subloops "C" and "D". Each of these subloops is coupled to a hub port. The four hub ports are labeled A, B, C and D and are coupled to the subloop having the same letter designation.

The function of these hub ports is to implement an accelerated protocol for operating the Fibre Channel protocol network. This accelerated protocol is consistent with the Fibre Channel protocol in that all the same commands and primitives are used for purposes of arbitration to take control of the network and setting up and closing data transfer connections. However, the accelerated protocol implemented by the structure of FIG. 8 is improved in that each data transfer from a source node to a destination node is implemented through switching in the hub ports such that many of the nodes in the network which would otherwise be involved in the transfer in a prior art Fibre Channel network are essentially "cut out of the loop". Since each node that a data frame passes through in a Fibre Channel network imposes a six word delay (called a latency time) with each word being forty bits long, each node that is cut out of the loop in a data transfer with the accelerated protocol results in a saving in overall loop latency time. This means that the data in a transfer operation arrives at the destination sooner and the destination can send back a CLS (close) or RRDY (ready to send data) command sooner to request more data or close the connection. By virtue of the data transfer happening more quickly, the Fibre Channel network is released more quickly for another data transfer transaction. Therefore, the entire I/O transfer rate of the network increases substantially.

Figure 8A:
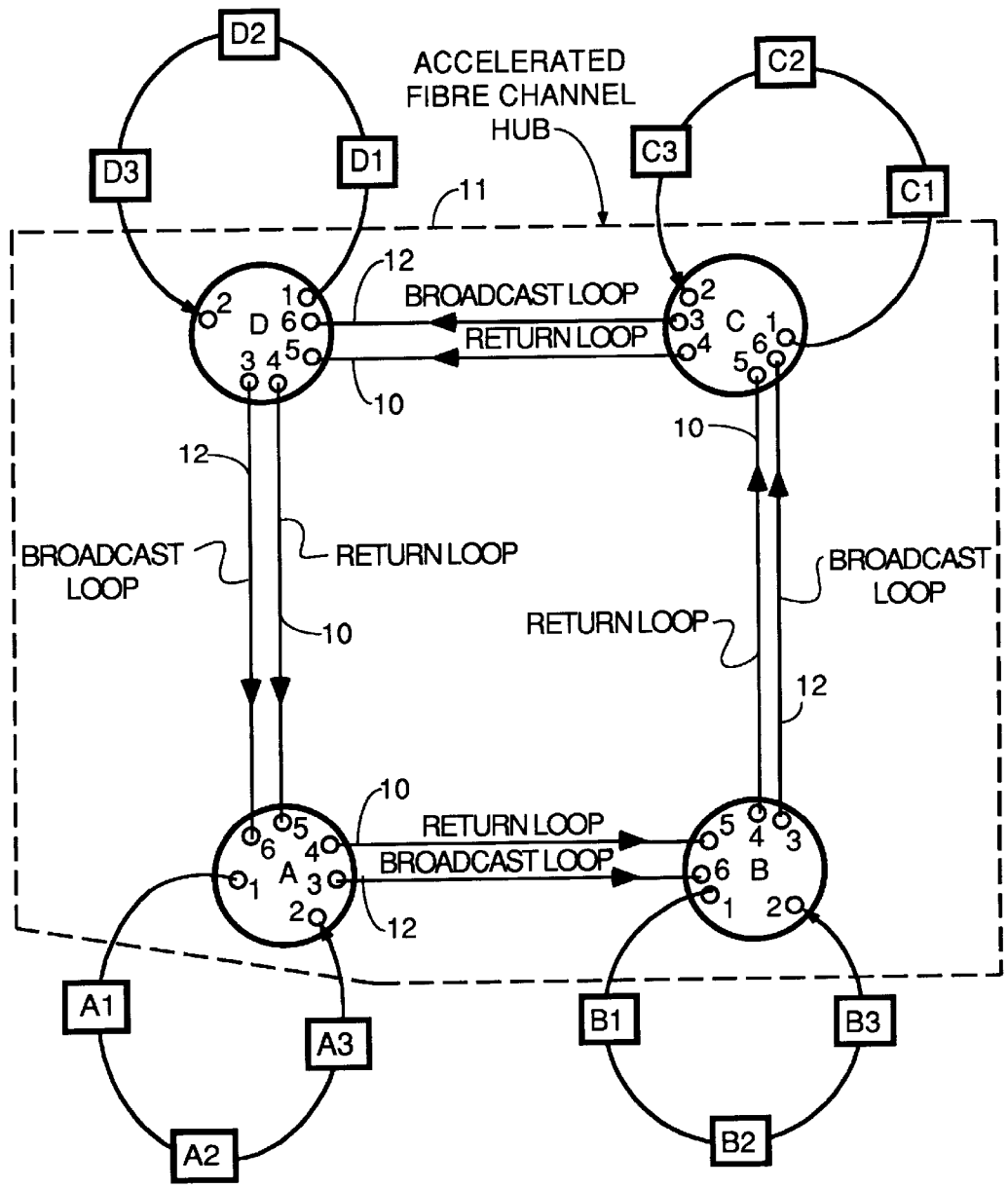
FIG. 8A is a diagram of the architecture of an accelerated Fibre Channel local area network implemented using an accelerated protocol Fibre Channel hub having four hub ports coupled to four subloops, although any number of hub ports and subloops can be used.
Figure 8B:
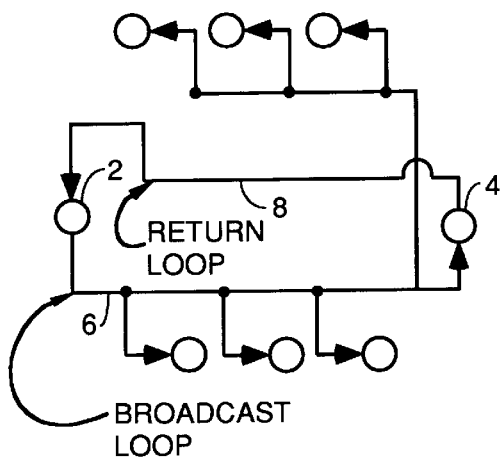
FIGS. 8B and 8C and 8D are diagrams illustrating in summary fashion how the invention works to provide a better understanding of the key ideas so that the reader will not become lost in the details of the descriptions of the structures and protocols implemented in the two alternative embodiments which both use the general concepts given in FIGS. 8B, 8C and 8D.
Figure 8C:
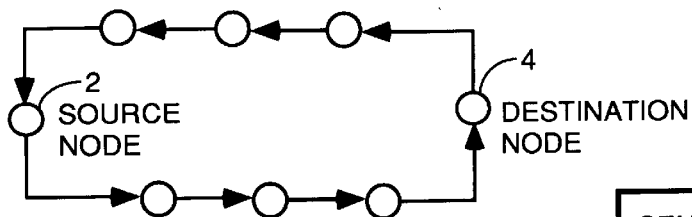
Figure 8D:
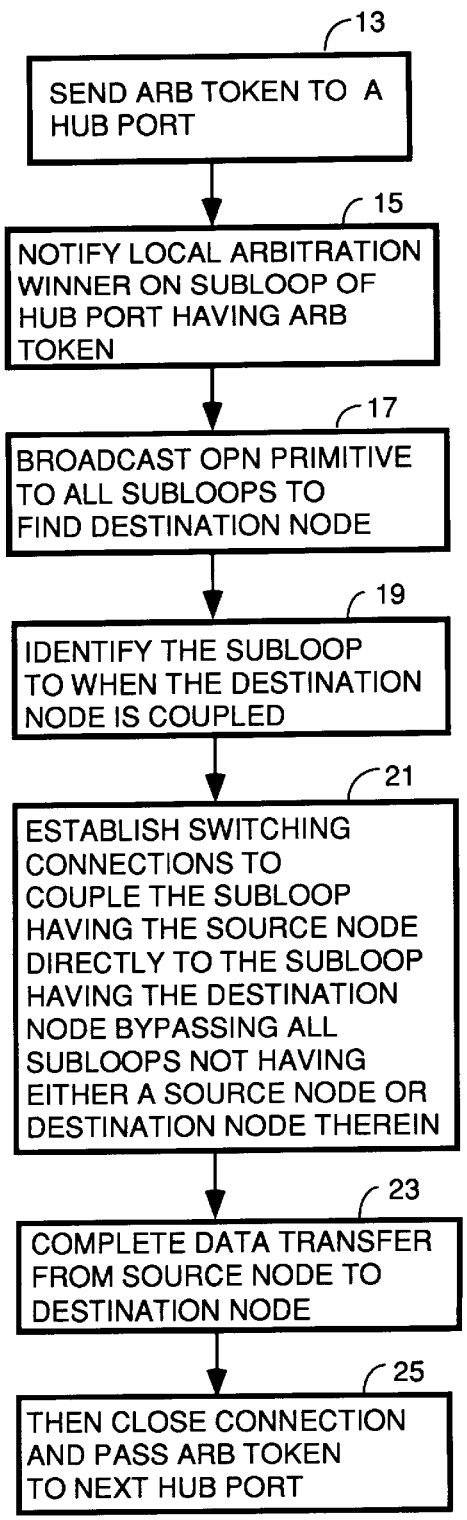

This basic concept that underlies all the embodiments described herein is illustrated in FIGS. 8B, 8C and 8D. Familiarity with these figures will aid the reader in hot becoming lost in the detail given below describing the structure, operation and protocols implemented by the various embodiments to carry out the basic idea. FIG. 8B is a simplified diagram of a Fibre Channel Arbitrated Loop according to the structure of the invention before the destination node has been located by the distributed intelligence of the hub ports (not shown). FIG. 8B shows the connections between the nodes (shown as small circles) made by the hub ports during the process of locating the destination node. Assume that node 2 is the source node and node 4 is the destination node, but the hub ports do not know this fact yet. The source node 2 wins arbitration and issues an OPN addressed to node 4. The OPN is broadcast to every node by virtue of the connections shown in FIG. 8B in order to find the destination node. When the OPN arrives at node 4, the node responds with an RRDY or CLS command. The hub ports sense this and then do switching operations to establish the connections shown in FIG. 8C. In FIG. 8C, the source node 2 is coupled to and sends traffic to the destination node 4 by a broadcast loop 6, while the destination node is coupled to and sends traffic to the source node by a return loop 8. By virtue of this connection the nodes not directly involved in the transaction are cut out of the loop so that traffic traveling from the source node to the destination node and vice versa does not have to propagate through the nodes which are not involved in the transaction. This eliminates the 6 word delay which would be encountered at each node by each command and primitive exchanged during the protocol of carrying out the data exchange of the loop tenancy.

FIG. 8D shows the process which defines the broad genus of the invention. Two different species of the invention are described below both of which fall within the genus represented by FIG. 8D. Although the process of FIG. 8D uses an ARB token, other processes may exist which do not use an ARB token but do use the basic idea outlined above. Since the acceleration is achieved in the genus of the invention by cutting out any subloop which does not have either a source node or a destination node thereon, the genus of the invention involves locating the subloops upon which the destination node and source node are located and setting up a direct connection between those two subloops for propagation of data. However, since the ARB token is only at one particular hub port at any particular time, the subloop upon which the source node is located is known since it can only be on the subloop connected to the active hub port which has the ARB token in its possession. Therefore, the challenge is locating the subloop upon which the destination node is located. Any species which is able to locate the subloop upon which the destination node is located either by drawing inferences from the transmission of tokens or by any other means, will fall within the genus of the invention.

Specifically, the genus of the invention starts out with the process symbolized by block 13 where the ARB token is sent to a hub port thereby rending that hub port the active hub port. The process of block 15 is performed next wherein the local arbitration winner on the subloop of the active hub port having the ARB token is notified. This can take many forms, but in the species disclosed herein, this notification takes the form of the active hub port stopping substitution of an ARB (F0) primitive for the inbound ARB primitive. Notification of a node that it has won arbitration is done by simply passing the inbound ARB primitive to the outbound segment of the local subloop so that it can propagate back to the winning node. Since the inbound ARB primitive will be the ARB primitive of the local node having the highest priority which is attempting to obtain control of the loop, this causes that node's ARB primitive to propagate around the subloop until it reaches that local node, i.e., the local arbitration winner. This tells the node which originated the ARB that it has won the arbitration and can take control of the loop. The local arbitration winner responds with the transmission of an OPN primitive.

Next, the process represented by block 17 is performed. This is the process of broadcasting the OPN primitive to all subloops in order to find the destination node. The OPN primitive has the destination node's address therein. The process of block 17 represents propagating this OPN primitive to all nodes on all subloops.

Figure 13:
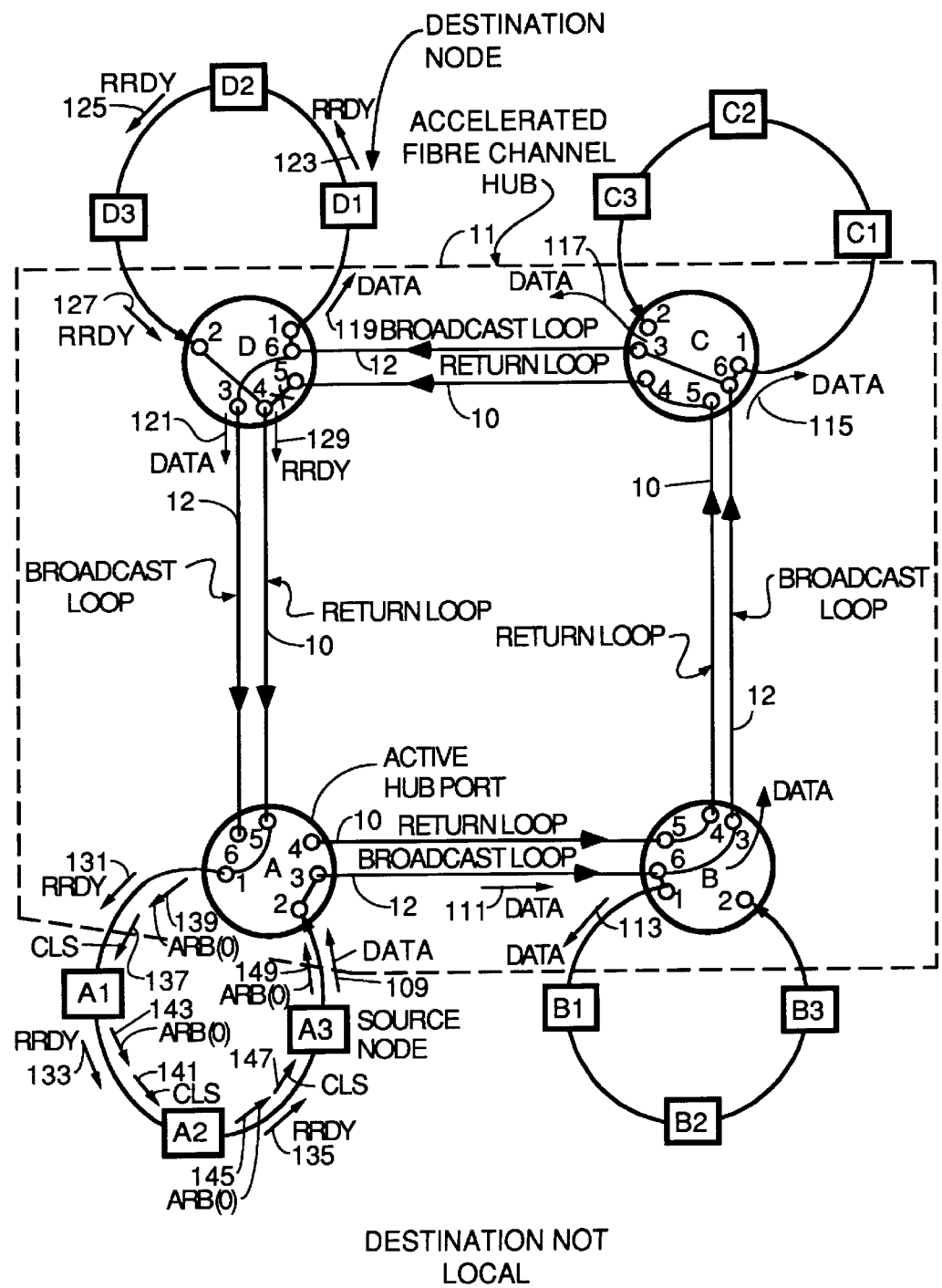
FIG. 13 is a diagram illustrating data frame propagation and switching connections in the active and inactive hub ports according to the protocol of FIG. 11 for a nonlocal destination.

Next, the process of block 19 is performed to identify the subloop to which the destination node is coupled. This can be done in any one of a number of different ways. In some species, the location of the subloop containing the destination node is deduced from drawing inferences from propagation of tokens. In other species, inferences are drawn from the number of OPN primitives which return on the return loop. Location of the destination node in the species shown in FIG. 11 is done by using different predetermined switching rules at the destination hub port and the active hub port and the inactive hub ports as illustrated in FIG. 13. Note that the destination hub port B makes a 2–4 logical connection because it receives a RRDY primitive on terminal 2 whereas none of the other hub ports make the 2-4 logical connection. This has the effect of making a direct connection between the source node subloop A and the destination node subloop D. In other words, data from the source node directed to the destination node propagates around the broadcast loop until it reaches terminal 6 of the destination hub port where it traverses the path from terminal 6 to terminal 1 and propagates around subloop D to the destination node. The destination node responds with an RRDY command which propagates across the 2-4 connection at hub port D and returns to terminal 5 at the active hub port A via the return loop. The active hub port has a 5-1 connection in existence thereby passing the RRDY primitive to the source node. The source node responds with another data frame transmission. Therefore, a direct connection between source loop A and destination loop D is made thereby cutting out all nodes on subloops B and C for purposes of propagation of the data frames and handshaking primitives between the source node and the destination node. This prevents the latency of all nodes on subloops B and C from slowing down the arrival of a data frame or primitive at the destination node thereby accelerating the data transfer of the loop.

In some embodiments, the subloop to which the destination node is coupled may be signalled by use of a time division multiplexed bus to replace the broadcast loop, the return loop and the control loop. In such an embodiment, multiple time slots will be dedicated to transmission of the OPN primitive and multiple time slots will be dedicated solely to the transmission of the RRDY primitive. The active hub port which receives the OPN primitive will place that primitive in the time slot corresponding to that particular hub port. All the other hub ports will be synchronized so that they know which time slot is which. Therefore, when the OPN primitive arrives at the destination hub port, the destination hub port will know which hub port is the active hub port by virtue of the time slot in which the OPN primitive arrived. In return, the destination hub port will place the returning RRDY or returning CLS primitive in the time slot corresponding to that destination hub port which is dedicated for transmission of the RRDY or CLS primitives. When the RRDY or CLS primitive arrives back at the active hub port, the active hub port will know which hub port is the destination hub port by virtue of the time slots in which these primitives arrive. Therefore, the active hub port and the destination hub port will know each other's identities and can set up direct connections between their subloops thereby cutting out the subloops which do not need to be involved and achieving acceleration.

This process of establishing switching connections to couple the subloops having the source node and destination directly and bypassing all subloops not having either the source node or the destination node therein, is represented by block 21 in FIG. 8D.

The process of block 23 represent the process of completing the data transfer from the source node to the destination node. In the embodiments disclosed herein, this process involves propagation of the CLS primitives and the resulting signaling of the source node to the active hub port that it is done with the connection by forwarding of the ARB (0) primitive to the active hub port. This causes the active hub port to take down its connections and signal all other hub ports to resume their initial configurations. This also causes the ARB token to be forwarded to the next hub port. This process of closing down the connections and passing the ARB token to the next hub port is symbolized by block 25.

Although the network shown in FIG. 8A utilizes four subloops, each with the same number of nodes, any number of subloops can be used, and the number of nodes in each subloop can vary. However, optimum acceleration usually occurs when all the subloops have the same number of nodes and there are as many subloops as is practical. Each subloop can have from 1 to 126 nodes, but the total number of nodes must be less than or equal to 126.

Each of the hub ports A, B, C and D are coupled together by a return loop 10 which is shown in FIG. 8 as four segments, each labeled 10. Likewise, the hub ports are also coupled together by a broadcast loop 12, also shown as four segments each individually labeled as 12. In the preferred embodiment, the return loop 10 and the broadcast loop 12 are replaced by a single time division multiplexed bus having timeslots which are dedicated to carry specific primitives or commands used in the protocol and specific tokens. What these primitives and tokens are and what they are used for will become clear in the below discussions of the various species of the invention.

Each of the subloops and return loop and broadcast loop segments are shown as terminating inside the hub ports with terminals numbered 1 through 6. The reason for this notation is that the hub ports do switching so as to make various connections between these terminals at different times carrying out the process which implements the accelerated protocol of the invention. These connections will be made clear in the process of describing the protocol in context of the species disclosed herein.

An ARB token is sequentially transmitted from each hub port to the next at high speeds in both species of the invention disclosed herein. This ARB token can be transmitted between the hub ports on the broadcast loop or on the return loop and in one species, is transmitted between hub ports on a control loop. Possession of the ARB token by any one of the hub ports means that any node on the subloop connected to that hub port may arbitrate to acquire the entire network for a data transfer transaction.

The fairness rules of the Fibre Channel arbitration protocol are implemented concurrently in each subloop without any intervention. In other words, within each subloop, arbitration among the nodes coupled to that subloop may be occurring simultaneously, with arbitration on all the other subloops.

Figure 9:
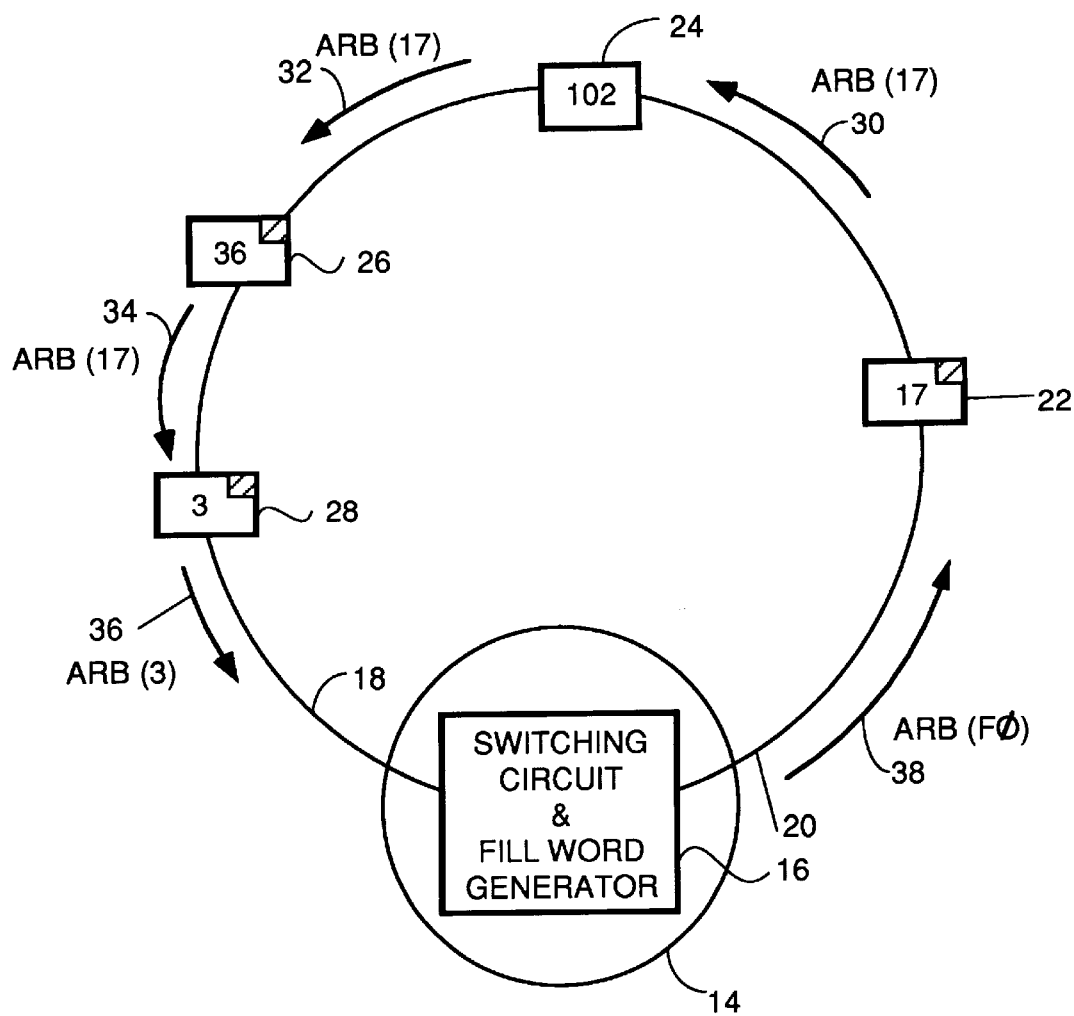
FIG. 9 is a diagram illustrating the process of local arbitration on a subloop in a Fibre Channel Arbitrated Loop network which has been divided into multiple subloops each of which may carry out arbitration simultaneously with each other subloop.

FIG. 9 illustrates the process of local arbitration on each subloop that can be simultaneously happening on all the subloops for the situation where the hub port 14 is not in possession of the ARB token. Each hub port has a switching circuit and fill word generator circuit 16 within the hub port. The switching circuit and fill word generator in each hub port is a state machine which implements the states and transition rules described below in the state diagrams of FIGS. 30–33 and in accordance with the Boolean Logic Pseudocode defined below in the section entitled Switching and Token Handling State Machine Boolean Logic Pseudocode for Three Token Embodiment (Active and inactive Ports). The acceleration provided by local, simultaneous arbitration on all subloops is general however and is applicable to all embodiments disclosed herein and in other embodiments which have subloops but which do not broadcast OPN primitives or do switching to eliminate the latency of nodes that are not on the subloops containing either the source node or the destination node. As such, only the states and transitions of the fill word generator portion of the state machine is relevant to the discussion of accelerated arbitration by simultaneous subloop local arbitration.

The switching circuit and fill word generator state machine in each hub port is coupled to the subloop inbound and outbound buses or segments and is also coupled to the data path(s) (not shown) coupling the hub ports. Any node on a subloop desiring access to the data path so as to send one or more data frames to a destination node generates an ARB primitive. Each ARB primitive has a priority ranking which is the address of the node which generated the ARB.

Fairness is implemented in performing simultaneous local arbitrations by passing an ARB token from hub port to hub port. The hub port fill word generator state machines (hereafter fill word generators) act differently depending upon whether they do or do not have possession of an ARB token.

If a hub port does not have the ARB token, it is called an inactive hub port. In an inactive hub port, the fill word generator receives ARB primitives coming in on the inbound segment 18 of the subloop and substitutes an ARB primitive having an F0 priority as the fill word on the outbound segment. This ARB (F0) arbitration primitive is transmitted outbound on segment 20, as symbolized by arrow 38. The F0 priority ranking is the lowest priority ranking possible, and no node is allowed to have the F0 priority ranking. Likewise, the priority ranking 0 is the highest priority ranking, and no node is allowed to have this ranking. In FIG. 9, the four nodes shown having addresses and priority rankings of 17, 102, 36 and 3, respectively, are shown as boxes 22, 24, 26 and 28, respectively. At the time represented by FIG. 9, only nodes 22, 26 and 28 desire to do data transfer operations on the Fibre Channel network data path and are actively arbitrating for control, as symbolized by the crosshatched block in the upper right hand corner of the node block.

The local arbitration for the subloop and inactive hub port of FIG. 9 occurs as follows. Since the hub port 14 does not have the ARB token, every arbitration primitive that arrives on the inbound segment 18 has a F0 priority ranking substituted therein by the fill word generator portion of state machine 16. This new arbitration primitive having an F0 ranking is a 4 byte word comprising 2 bytes which are essentially a control code and 2 bytes giving it a priority ranking. The two byte control code indicates that this primitive is an arbitration primitive. This modified arbitration primitive is transmitted on outbound segment 20 to the first node 17 by the fill word generator. The first node examines the priority ranking of the ARB (F0) primitive and, if that node desires to acquire the overall network for a data transfer operation, it substitutes its own ranking for the ranking of the inbound primitive if its own ranking is higher than the ranking in the inbound primitive. Since for node 22, the inbound ARB primitive is always an F0 ranking when hub port 14 is inactive, the priority ranking of node 22 will always be higher than F0 and will be substituted if node 22 is arbitrating. In this case, the node 22 ranking of 17 is higher than F0, so node 17 transmits ARB (17), as symbolized by arrow 30. The next node in the sequence, node 24, does not have any data to send, and therefore does not need control of the network. Therefore, it passes the ARB (17) primitive unchanged, as symbolized by arrow 32. Node 26 does want to acquire control of the network, but its priority ranking is 36 is lower than the priority rankings of 17 of the inbound ARB primitive. Therefore node 26 passes the ARB (17) to the next node upstream without changing the priority ranking, as symbolized by arrow 34. Node 28, also wants to acquire control of the network for data transfer operation. It receives the ARB (17) primitive and compares its priority ranking of 3 to the inbound priority ranking of 17. As a result, it substitutes a priority ranking of 3 for the priority ranking of 17 in the inbound arbitration primitive and transmits an ARB (3) fill word to the hub port on inbound segment 18, as symbolized by arrow 36. As the hub port 14 does not have the ARB token, the inbound arbitration primitive represented by arrow 36 is altered by the fill word generator to an ARB(F0) and transmitted outbound so the process can start again.

Typically, the switching circuit and fill word generator 16 is a state machine which is capable of recognition of specific events such as the reception of an arbitration primitive or other control codes such as open (hereafter referred to as OPN), Receive Ready (hereafter RRDY) or Close (hereafter CLS) or receipt of various tokens such as the ARB token.

The switching circuit and fill word generator 16 allows all other fill words between data frames, other than the incoming arbitration primitives, to pass unchanged when it does not have the ARB token. The reason for this is that the hub port cannot let a node on the local loop win arbitration if it does not have the ARB token. If this were the case, the hub port would be implementing an "unfair" arbitration protocol in the strict definition. However, starvation avoidance is guaranteed in the invention since all ports within each subloop will eventually get the ARB token.

Each of the hub ports stores the current fill word (hereafter CFW) that is circulating on its subloop. When the hub port gets the ARB token, it checks its CFW to determine if the CFW is an arbitration primitive or includes an arbitration primitive. If the CFW does not contain an arbitration primitive, that hub port passes the ARB token on to the next hub port immediately since the absence of an arbitration primitive in the CFW means that no node on the local subloop is arbitrating to gain control of the entire network.

If the CFW is an arbitration primitive or contains an arbitration primitive, that arbitration primitive will be the current arbitration winner for that subloop. When the CFW contains an arbitration primitive and the hub port receives the ARB token, the hub port keeps the ARB token so as to become the active hub port. It then forwards the stored arbitration primitive received on the inbound segment 18 out on the outbound segment 20 to start the process of notifying the local arbitration winner that it has won control of the network. Since the arbitration primitive received on the inbound segment 18 will be the arbitration primitive generated by the node having the highest priority which is attempting at that time to gain control of the network data path, the outbound arbitration primitive will contain the priority ranking of the highest ranking node on the subloop which is currently attempting to achieve control of the network (hereafter the "local winner" or source node). Therefore, this arbitration primitive from the local winner will pass unimpeded and unaltered through all the other nodes on the subloop until it reaches the local winner. When the local winner receives its own ARB primitive back, it knows that is has won the local arbitration and that the hub port to which it is connected has the ARB token. This means that: the local winner source node may issue an OPN primitive to start a transaction; and, the processes of achieving control of the network data path, finding the destination node named in the OPN in an accelerated manner and switching so as to make connections that cut out of the data path between the source node and destination node any subloops not having the source node or destination node thereon will be carried out by the state machines in the hub ports so as to accelerate the transaction.

There is one other process that the fill word generator in each hub port carries out to handle the situations where the destination node is on the same subloop as the source node. There are two corner cases that must be dealt with in this situation. Both of the embodiments described herein implement a second form of accelerating the transaction by broadcasting the OPN issued by the source node on a broadcast loop coupled to all hub ports. Each hub port then circulates the OPN around its local subloop simultaneously so as to find the destination node faster than would be the case if the OPN passed in serial fashion to each node on the entire network. But because of the switching rules defined later herein, the OPN primitive returns to the active hub port on the broadcast loop which is never connected to the outbound segment of the local subloop. Therefore, unless the destination node, if on the local subloop, will never see the OPN direted to it. To handle this situation, each fill word generator stores a copy of each OPN generated by any source node on its local subloop. When the conclusion is drawn that the destination node is also on the local subloop, the fill word generator in the active hub port substitutes the stored OPN for the current fill word sent on outbound segment 20 so that the destination node will see it and the transaction can be completed. This processing is described in more detail on FIG. 34.

There is the possibility that the source node will open a full duplex transaction wherein the source node issues one or more RRDYs with its OPN. These RRDYs will be broadcast on the broadcast loop immediately following the OPN and will reach the destination node unless the destination node is on the same subloop as the source node. To handle the latter situation, each state machine in each hub port includes an RRDY counter to count how many RRDYs followed a full duplex OPN. After a full duplex OPN when the active hub port concludes that the destination node is on the same subloop as the source node, the active hub port's fill word generator substitutes an RRDY for the fill word which is transmitted outbound on its local loop segment 20 and uses the RRDY count to continue to do this a number of times equal to the RRDY count. The processing by the fill word generator for handling both of these local destination cases is described in more detail in FIG. 34.

Figure 10:
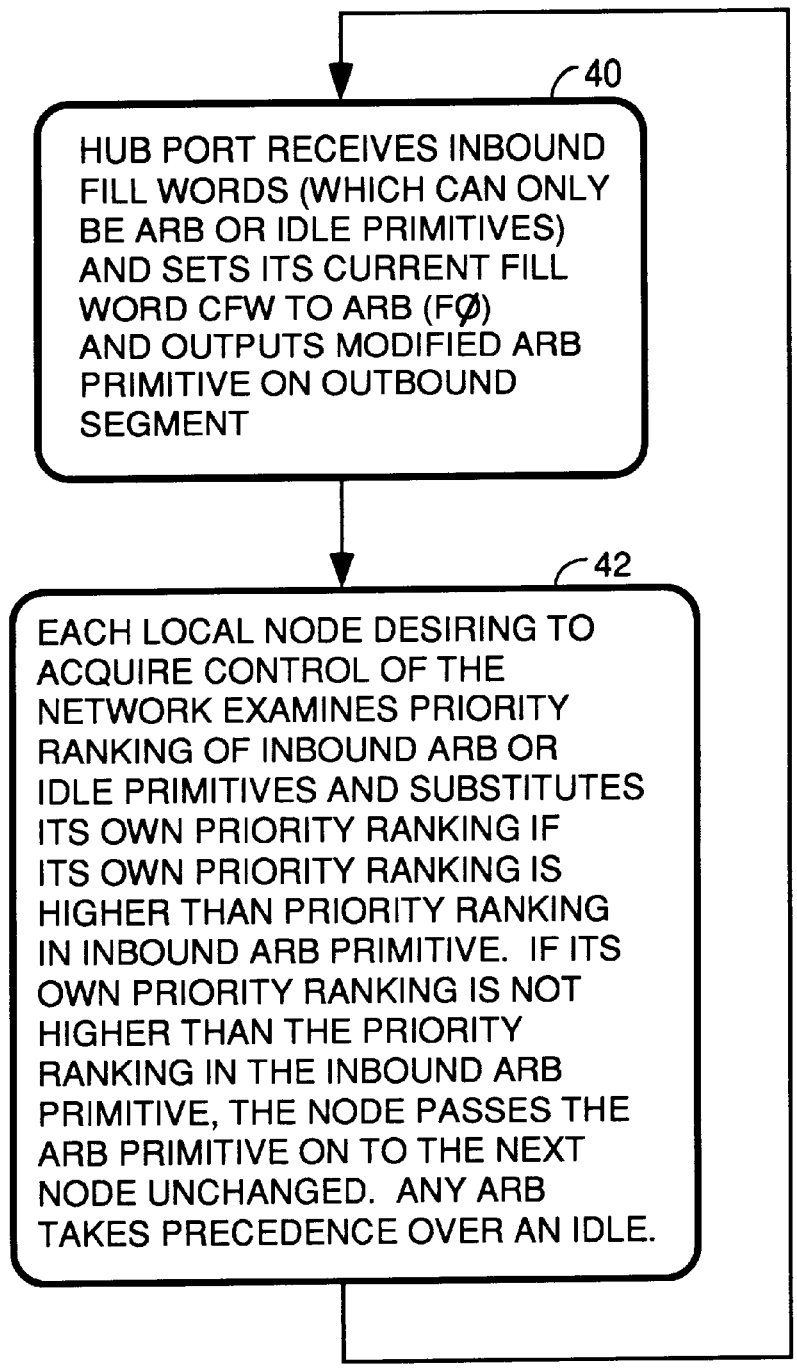
FIG. 10 is a flow chart illustrating the flow of processing steps in carrying out local arbitration on a subloop in accordance with either disclosed species of the accelerated Fibre Channel protocol according to the teachings of the invention.

FIG. 10 is a flow chart illustrating the sequence of events in local arbitration process on each subloop just described. Block 40 represents the process carried out by each hub port in receiving inbound current fill words (which can only be ARB or IDLE primitives) and substituting an F0 priority ranking into any arbitration primitive. The hub port then transmits the modified arbitration primitive on the outbound segment. Block 42 represents the process carried out by each local node which desires to acquire control of the network in examining the priority ranking of the inbound ARB or idle primitives and substituting its own priority ranking (if its own priority ranking is higher than the priority ranking of the inbound arbitration or idle primitive). Any ARB takes precedence over an idle. If a node's priority ranking is not higher than the priority ranking in the inbound arbitration primitive, block 42 symbolizes the process of the node passing the arbitration primitive on to the next node unchanged.

According to the conventional Fibre Channel protocol, arbitration to achieve control of the network is won by the node with the highest ranking priority when that node receives an arbitration primitive from having its own priority ranking from an upstream node. When this happens, the node knows it has won the arbitration. The next step in the conventional and the accelerated protocol is to issue an open command (OPN) by inserting in the fill word a 4 byte OPN code. The OPN command are the 2 bytes of the OPN code followed by a destination address and a source address. The source address is the address of the node which has just won the arbitration and which wishes to transmit data. The destination address is the address of the node to which data is to be sent. That OPN command (hereafter called a primitive) propagates along the network until it reaches the destination node. The destination node then recognizes the OPN command with its address as the destination address and issues either a Received Ready command (hereafter RRDY). The RRDY command constitutes permission to send one frame of data. The CLS command causes the connection to be shut down. The RRDY command propagates along the network until it reaches the source node. The source then transmits one frame of data in response. This frame of data propagates along the network and is received and buffered by the destination node. The destination node, if it is ready to accept another frame of data then issues another RRDY command which propagates along the network to the source node. When the source node receives the RRDY command, it transmits another frame of data. This ping pong process continues until either the source node or destination node issues a CLS command. The CLS command causes the control of the network to be relinquished.

The way the above described conventional protocol (which is also follwed in the accelerated protocol) is implemented in the accelerated Fibre Channel network hub is illustrated in the flow diagram of FIG. 11. FIG. 11 is comprised of FIGS. 11a–11d on multiple sheets which, when assembled along the cut and paste lines indicated, comprise a single flow chart showing the process carried out by the hub ports and source and destination nodes to implement a data transfer between the source and destination nodes in an accelerated manner according to a first embodiment within the genus of the invention. The protocol illustrated by FIG. 11 will cut out any subloops not having either the source node or the destination node coupled thereto. This accelerates the transaction because the six word delay imposed by each node on any subloop which is cut out is not imposed upon traffic in either direction from the source to the destination or the destination to the source.

Figure 11A:
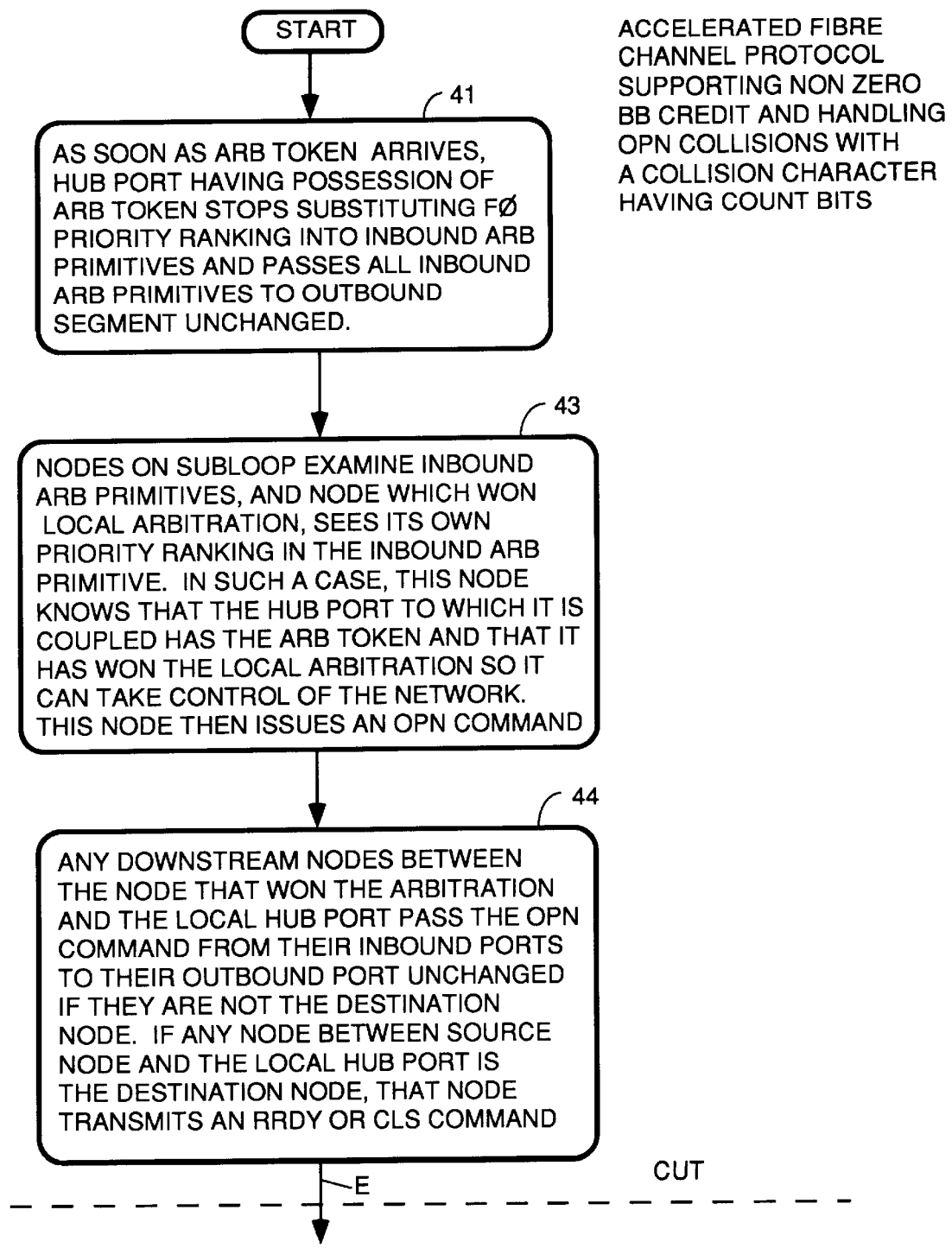
FIG. 11 is a flow chart of the flow of processing steps in establishing a connection between subloops, transferring data and closing the connection in accordance with a first embodiment of the accelerated protocol that supports non-zero BBcredit and which handles collisions between open primitives using count bits and a special collision character.

Block 41 in FIG. 11a represents the process which occurs at any hub port which has received the ARB token and which has been substituting F0 priority rankings into incoming ARB primitives. As soon as the ARB token arrives at this hub port, the hub port stops substituting an F0 priority ranking into the inbound ARB primitives and passes all inbound ARB primitives to the outbound segment unchanged. As noted above, this arbitration primitive propagates all the way around the subloop until it reaches the local winner node which won the local arbitration. In the hypothetical of FIG. 9, when the ARB token arrives at hub port 14, the switching circuit and fill word generator 16 passes the inbound ARB primitive having the priority ranking 3 from the inbound segment 18 to the outbound segment 20 where it propagates all the way around the loop until it reaches node 28 again. When node 28 sees this arbitration primitive having its own ranking of 3, it issues an OPN command. This process of recognizing the ARB primitive with its own ranking and transmitting an OPN command is symbolized by block 43 of FIG. 11. A node will only see its own priority ranking on the inbound ARB primitive when the hub port to which it is connected has the ARB token and that node has won the local arbitration. This is how notification by the hub port to the local arbitration winner takes place. This means that the local winner node can take control of the network for its data transfer operation. Accordingly, the node issues an OPN command to open a communication channel to the destination.

Block 44 illustrates the process that happens in the event there are nodes downstream in the subloop between the source node and the hub port. If there are any such downstream nodes between the source node that won the arbitration and the local hub port (which are not the destination node), they pass the OPN command from their inbound ports to their outbound port unchanged. If any downstream node between the source node and the local hub port is the destination node, that node transmits an RRDY or a CLS primitive.

In order to start the process of setting up the proper switching operations in the hub ports to locate the destination node and cut out all subloops not having either the source node or destination node coupled thereto, the "active" hub port (the hub port having the ARB token in its possession) determines whether or not it has received an OPN command. This process is symbolized by test 46 in FIG. 11b.

If the active hub port did receive an OPN command on terminal 2, then the process symbolized by block 48 is performed. Block 48 represents the process of the active hub port broadcasting the OPN command on the broadcast loop 12 in FIG. 8 and simultaneously setting the fill word (CFW) to an ARB (0) primitive. Setting the CFW to ARB (0) allows detection when the data transfer between the source and destination nodes is completed.

Figure 11B:
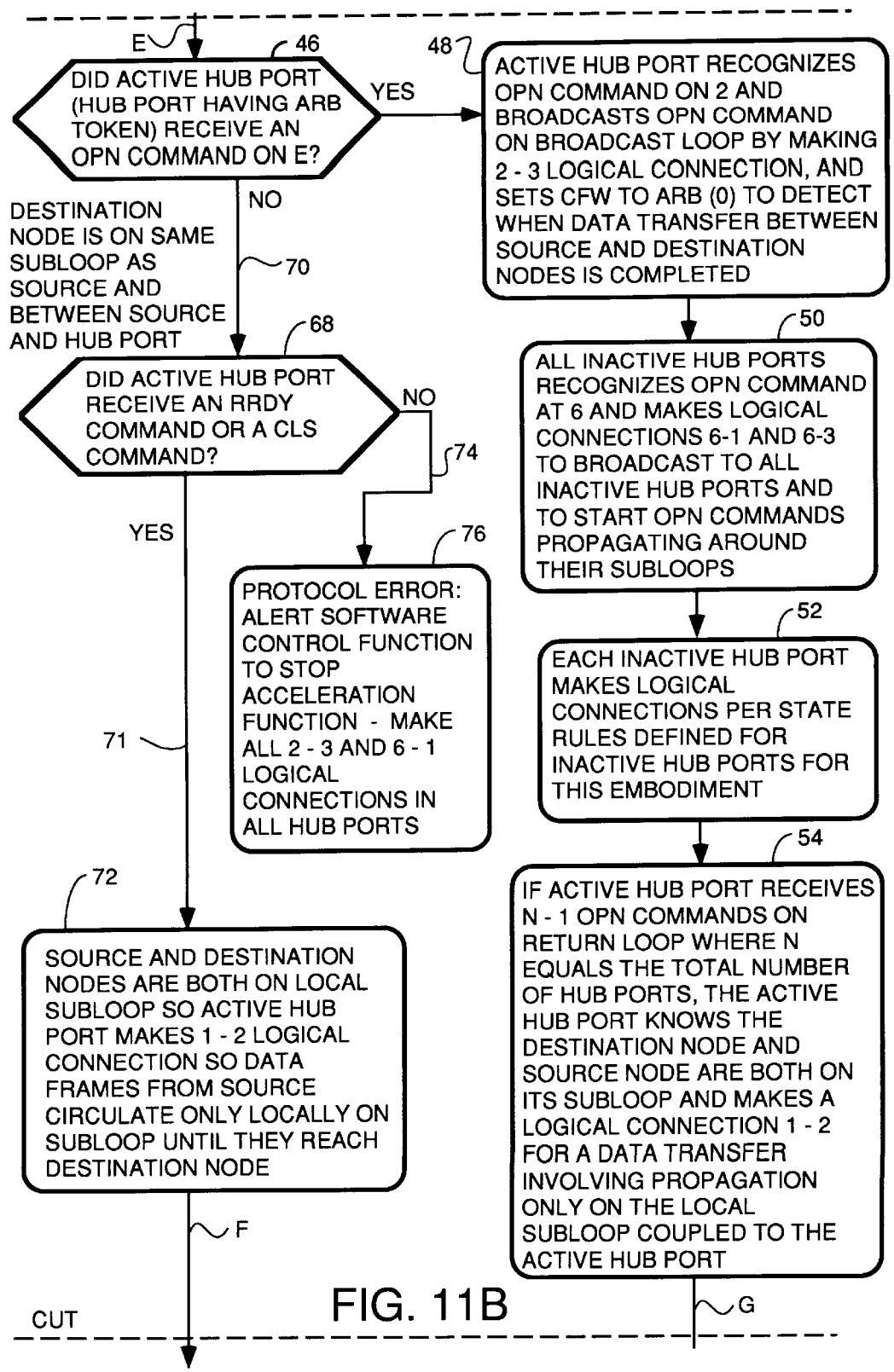
Figure 12:
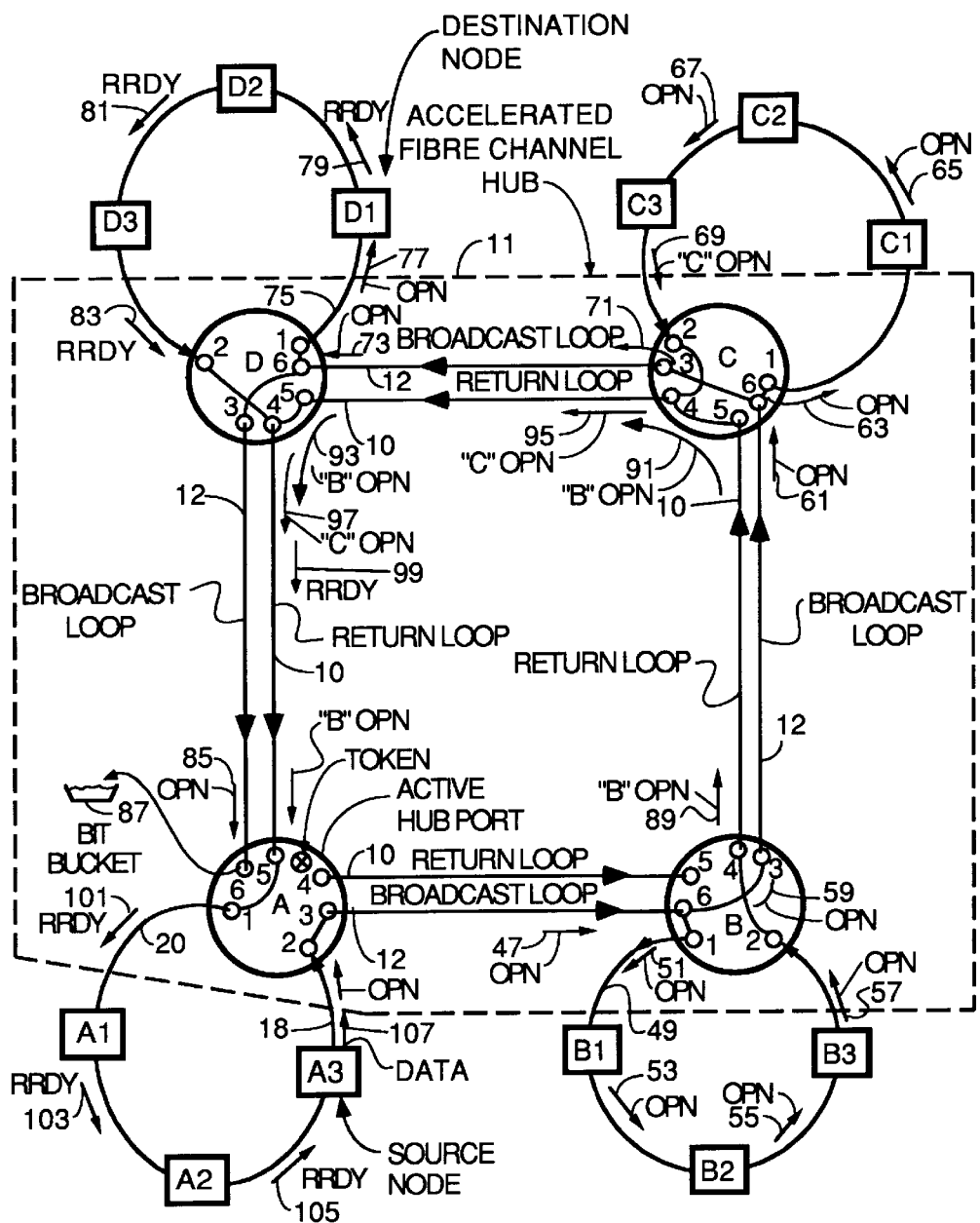
FIG. 12 is a diagram illustrating OPN primitive propagation and switching connections in the active and inactive hub ports according to the protocol of FIG. 11 for a nonlocal destination.

The broadcast of the OPN command which occurs in the process symbolized by block 48 is achieved by each hub port by transition of its switching circuit and fill word generator 16 so as to establish the logical switching connections shown in FIG. 12. Specifically, each of the hub ports A, B, C and D in FIG. 12 have a switching circuit and fill word generator 16 such as circuit 16 in FIG. 9. This switching circuit and fill word generator 16 is implemented by a state machine in the preferred embodiment, and is coupled to each of the six terminals numbered 1 through 6 inside the circle representing each hub port. The process represented by block 48 in FIG. 11b is carried out as follows. The active hub port A sees the OPN command on inbound segment 18 issued by source node 10. Hub port A then makes a switch connection between terminals 2 and 3. This places the OPN command on broadcast loop 12 where it propagates to hub port B.

Each of the hub ports A, B, C and D and the broadcast loop 12 and the return loop 10 are totally internal to the Fibre Channel hub represented by the enclosure within dashed line 11. When the OPN command reaches hub port B, that hub port follows the switching rules for inactive hubs given below. Specifically the switching circuit and fill word generator 16 inside hub port B recognizes the OPN command on terminal 6 and the fact that it has arrived on the broadcast loop and makes the connections shown in FIG. 12 from 6-3 and 6-1 and 2-4. The purpose of making these switching connections is to transmit the inbound OPN command represented by arrow 47 simultaneously out on the outbound segment 49 of subloop B and on to the next hub port C via broadcast loop 12 as represented by arrow 59. In some embodiments, all inactive hub ports without the ARB token automatically make the 6-3 and 6-1 connections and only make the 2-4 connection when they see an OPN command arrive on terminal 2.

Each of the hub port's state machines operates in accordance with a predetermined set of rules. These rules define the states to which the hub port's state machine will transition when certain input conditions are observed.

Switching Rules for Inactive Hub Ports for Protocol of FIG. 11

The hub port rule for inactive hub ports which do not possess the ARB token are as follows:

(1) All inactive hub ports make 6-3, 6-1 when OPN arrives on terminal 6. If the hub port receives an OPN command at terminal 2, the hub port makes a logical connection from terminal 2 to terminal 4 to transmit the OPN command on the return loop 10 and stores a copy of the OPN command. This condition will occur when none of the nodes on the subloop connected to that hub port is the destination node. The 2-4 connection will be broken after the OPN primitive has been transmitted on the return loop 10. The 2-4 connection will only be made after the 5-4 connection has been broken. The active hub port also starts substituting ARB(0)'s for the inbound ARB primitives to prevent any other node from winning arbitration locally while the source node which originated the OPN command has control of the network.

(2) If the hub port receives a OPN command on the return loop input (terminal 5), the hub port makes a logical connection between terminals 5 and 4 so as to forward the incoming OPN primitive on the return loop. The 5-4 connection will be made only long enought to transmit the OPN command on the reuturn loop and then will be broken. The 5-4 connection will not be made if there is a preexisting 2-4 connection, but will be made when the 2-4 connection is broken. This means that each hub port must have the capability to store an inbound OPN at the terminals long enough to wait for a pre-existing 2-4 connection to be broken. This condition will exist when a subloop upstream of the hub port has propagated the broadcast OPN command around the subloop and received the OPN command back at terminal 2 indicating that none of the nodes coupled to that subloop was the destination node. In such a case, the upstream hub port will make the connection from terminal 2 to terminal 4 and transmit the OPN command on the return loop 10 which causes the downstream hub port to see an inbound OPN command appearing at terminal 5. Essentially this state just passes the OPN command from the inbound return loop segment coupled to terminal 5 to the outbound return route segment coupled to terminal 4. This happens at all hub ports coupled to subloops where there is no destination node.

(3) If the hub port detects a RRDY or a CLS command at its local input coupled to terminal 2 (the inbound segment of its subloop), the hub port will make a logical connection from terminal 2 to terminal 4 long enough to forward the RRDY or CLS on the return loop and then break the connection. Simultaneously, the hub port blocks any transmission of data between terminals 5 and 4. This state is entered when the destination node is coupled to the subloop of this hub port. The logical connection from terminal 2 to terminal 4 passes the RRDY or CLS command outbound on the return loop for transmission to the active hub port. Blocking transmission of any data from terminal 5 to terminal 4 prevents any transmission of a OPN command propagating on the return loop from propagating through the hub port to the active hub port. This is no longer necessary since the destination node has been found.

(4) If the hub port detects either a RRDY or CLS command inbound on the return loop coupled to terminal 5, the hub port's state machine makes a logical connection between terminals 5 and 4 and blocks any data transmission between terminals 2 and 4. This state is entered when a subloop upstream of the hub port has the destination node thereon, which means, by definition, that the subloop to which this sub port is connected does not have the destination node thereon. Therefore, the hub port's job in this situation is to pass the RRDY or CLS command to the active hub port by making the connection between terminals 4 and 5 so as to complete the return loop. Blocking the connection between terminals 2 and 4 prevents any protocol error primitive such as a RRDY, CLS or PON primitive arriving on terminal 2 from propagating around the subloop from reaching the return loop thereby necessitating a recovery protocol. That is, there should be only one RRDY or CLS command originating from the single destination node and any such command from any other node would represent a protocol error.

(5) It is possible that an OPN command from an upstream subloop will arrive on the return loop on terminal 5 at the same time or overlapping (OPN command is 40 bits long) with an OPN command arriving at terminal 2 from the inbound segment of a downstream hub port. In this case, a collision between the OPN commands will have occurred and it is necessary to carry out a process to indicate to the active hub port how many subloops returned OPN commands for purposes of deciding whether the destination node is on the active hub port's local subloop. A local destination node is detected by the active hub port when N-2 OPN commands have been received on the return loop 10 at terminal 5 of the active hub port (where N is equal to the number of hub ports in the system). In other words, In the case of FIG. 12 with four hub ports, when three OPN commands have been received at terminal 5 of the active hub port, the active hub port knows that the source node and the destination node are both coupled to subloop A. Because there must be counting of these OPN commands by the active hub port, a collision must be accounted for so that the count of the number of subloops returning OPN commands remains accurate. Therefore in the case of a collision between OPN commands at terminals 2 and 5, the hub port's switching circuit and fill word generator 16 substitutes a shorter control character on the return loop (hereafter called the collision character) which is unique and not defined by the conventional Fibre Channel protocol (unaccelerated) for the colliding OPN commands. This collision character will have several count bits appended thereto which are set by the switching circuit and fill word generator 16 to indicate how many OPN commands the substitute character represents. In other words, if an OPN command from subloop B collides with an OPN command from subloop C, the substitute character will be generated by a hub port C and will be put on the return loop segment coupled to terminal 4 and the count bits will be set at 2 indicating two OPN commands represented by that character. If this character then arrives at terminal 5 of hub port D so as to collide with an OPN command arriving at terminal 2, hub port D will then alter the count bits 2 of the collision character to represent three OPN commands and output the collision character on the return loop segment coupled to terminal 4. The active hub port A will then receive the collision character on terminal 5 and read the count bits and realize that it has just received three OPN commands thereby indicating that the source and destination nodes are both on subloop A. If the active hub port receives N-1 OPN commands back on terminal 5 (where N equals the number of hub ports/subloops), the active hub port knows that the destination is local. In that case, the active hub port makes a 2-1 connection and transmits the stored copy of the original OPN command outbound from terminal 1. The OPN command propagates around the active hub port's subloop and reaches the destination node. The destination node replies with an RRDY (or a CLS command) which propagates around the subloop to the source node. If the destination node transmitted a RRDY, the source node transmits a data frame which propagates across the 2-1 connection to the destination node. This process continues until the data transfer is complete, or either source or destination node transmits a CLS command. If the destination node transmitted a CLS command, the source node receives it and stops substituting its CFW for the ARB (0) primitives, and passes the ARB (0) primitive back to the active hub port. This signals the active hub port to close the connection and forward the ARB token to the next hub port.

(6) To illustrate these switching rules in action, we return to the consideration of FIG. 12. The OPN command, represented by arrow 47, reaches hub port B terminal 6 and propagates from terminal 6 to terminal 1 and then propagates completely around subloop B since none of nodes B1, B2 and B3 is the destination node. This fact is represented by arrows 51, 53, 55 and 57. Simultaneously, the OPN command propagates from terminal 6 to terminal 3 and then along broadcast loop segment 12 to hub port C, as represented by arrows 59 and 61. Since the destination node is not coupled to subloop C either, hub port C reaches the same state as hub port B making logical connections between terminals 6 and 1 and 6 and 3. Therefore, the OPN command propagates around subloop C as represented by arrow 63, 65, 67 and 69. Simultaneously, the OPN command propagates outbound along the broadcast loop segment 12 coupling hub port C to hub port D via the connection between terminals 6 and 3; as represented by arrows 71 and 73. Hub port D is coupled to the subloop to which the destination node D1 is connected. However, hub port D does not know this fact yet and makes the same logical connections between terminal 6 and 1 and terminal 6 and 3. The connection between terminal 6 and 1 causes the OPN command to propagate up the outbound segment 75 of subloop D until it reaches destination node D1. At node D1, the OPN command is examined and the destination address therein is compared to the address of node D1. A match occurs so a state machine in the destination node D1 removes the OPN command from the fill word and substitutes the RRDY or CLS command. This process is symbolized by arrows 77 and 79. The RRDY command propagates around the balance of the D subloop and arrives at terminal 2 of the D hub port, as symbolized by arrows 81 and 83. Since propagation around the subloops is much slower than propagation of the OPN command around the broadcast loop because of the six word latency time of each node, the OPN command which originated at hub port A on the broadcast loop will have made it all the way around the broadcast loop and arrived at terminal 6 of hub port A well before any of the B, C or D subloops have returned any commands from any of their nodes. The OPN primitive which returns to the active hub port on the broadcast loop is represented by arrow 85. The active hub port, when it sees the OPN command at terminal 6, makes a connection from terminal 6 to a bit bucket 87 which symbolically represents the process of throwing away the OPN command arriving on the broadcast loop.

We now turn to consideration of the processing by each hub port of the commands from the subloops which arrive at terminals 2 well after the broadcast OPN command has propagated all the way around the broadcast loop. Since subloop B does not contain the destination node, the OPN command represented by arrow 51 will return to terminal 2 as represented by arrow 57. This will cause sub port B to enter state 1 described above in the inactive Hub Port Switching Rules (for the species represented by the protocol of FIG. 11) thereby making a connection between terminals 2 and 4. This causes the "B" OPN command from subloop B to propagate outbound to hub port C on the return loop 10, as symbolized by arrow 89. When this OPN command arrives at terminal 5 of hub port C, hub port C enters state 2 described above and makes a connection between terminals 5 and 4 thereby forwarding the OPN command 89 through to hub port D on the return loop, as symbolized by arrow 91. As soon as the OPN command arriving at terminal 5 has been forwarded, the 5-4 connection is broken. Hub port D will then enter state 2 and make a connection between terminals 5 and 4 long enough to pass the "B" OPN command to the active hub port A via the return loop 10, as symbolized by arrow 93. When this OPN command arrives at terminal 5 of hub port A, it will be counted.

When subloop C returns the OPN command, as symbolized by arrow 69, hub port C enters state 1 and makes a logical connection between terminals 2 and 4 long enough to forward the OPN command outbound on the return loop. The OPN command from subloop C, designated "C" OPN command, and represented by arrow 69, propagates on to the return loop to hub port D as represented by arrow 95. When the "C" OPN command reaches hub port D, hub port D enters state 2 and makes a logical connection between terminals 5 and 4 long enough to pass the "C" OPN command through to hub port A, as symbolized by arrow 97. When this OPN command reaches terminal 5, it too is counted by the active hub port A.

Since the destination node D1 is on subloop D, when the RRDY command, represented by arrow 83, reaches terminal 2 of hub port D, hub port D enters state 3 described above. In this state it opens the 5-4 connection and makes a connection between terminals 2 and 4 long enough to pass the RRDY command to active hub port A via the return loop 10, as represented by arrow 99. When active hub port A sees the RRDY command at terminal 5, it makes a connection from terminal 5 to terminal 1 thereby passing the RRDY command out on the outbound segment 20 of subloop A, as represented by arrow 101. This RRDY command propagates through nodes 8 and 9 and reaches source node 10, as represented by arrows 103 and 105. In response to receiving the RRDY command, source node 10 outputs a single data frame on the inbound segment 18, as represented by arrow 107.

The process represented by block 50 in FIG. 11*b* is the process described above where each inactive hub port recognizes the OPN command coming in on the broadcast loop segment connected to terminal 6 and makes simultaneous logical connections between terminal 6 and 1 and terminal 6 and 3. This broadcasts to all inactive hub ports the OPN command and also simultaneously starts the OPN command propagating around the subloop coupled to each inactive hub port. This is the manner in which the subloop on which the destination node resides is found.

The process represented by block 52 in FIG. 11*b* is the process described above which each inactive hub port carries out to do the switching described above in accordance with the inactive Hub Port Rules defined above. In other words, this block represents the process of connecting terminal 2 to terminal 4 if a subloop returns a OPN command when the destination node is not on that subloop, as well as the process of connecting terminal 2 to 4 when the destination node is on the subloop and a RRDY command is returned from a subloop on terminal 2.

The process represented by block 54 in FIG. 11*b* is the process carried out by the active hub port when it concludes that both the source node and destination node are on its own subloop. Basically, if the active hub port receives N-1 OPN commands on the return loop segment coupled to terminal 5, (where N equals the total of hub ports in the system), then the active hub port knows that the destination node and the source node are both on its subloop, and it makes a connection between terminals 1 and 2 for data transfer involving propagation only on the local subloop coupled to the active hub port.

In an alternative embodiment where the destination is local, the active hub port makes a logical connection 2-3, each of the inactive hub ports makes a connection 6-3. This completes the broadcast loop all the way through the inactive hub ports but bypassing all of the subloops which do not have either the source node or destination node thereon. The active hub port also makes a 6-1 connection. Therefore, data frames transmitted from the source node on, for example subloop A, traverses from terminal 2 to terminal 3 in the active hub port and propagates completely around the broadcast loop and back to terminal 6 of the active hub port. Each data frame then traverses the logical connection from terminal 6 to terminal 1 in the active hub port, and propagates outbound on the subloop to the destination node. The destination node receives the data and transmits another RRDY command (or a CLS command) which propagates around the subloop to the source node. In the case where the destination node is between the source node and the active hub port, and is downstream from the source node, the RRDY or CLS command transmitted by the destination node propagates around the broadcast loop and then back around the subloop until it reaches the source node. The source node then detects this primitive and transmits another frame of data along the same path. In the case of a CLS propagating this way, the source node passes the next inbound ARB (0) back to the active hub port to close the connection.

Figure 11C:
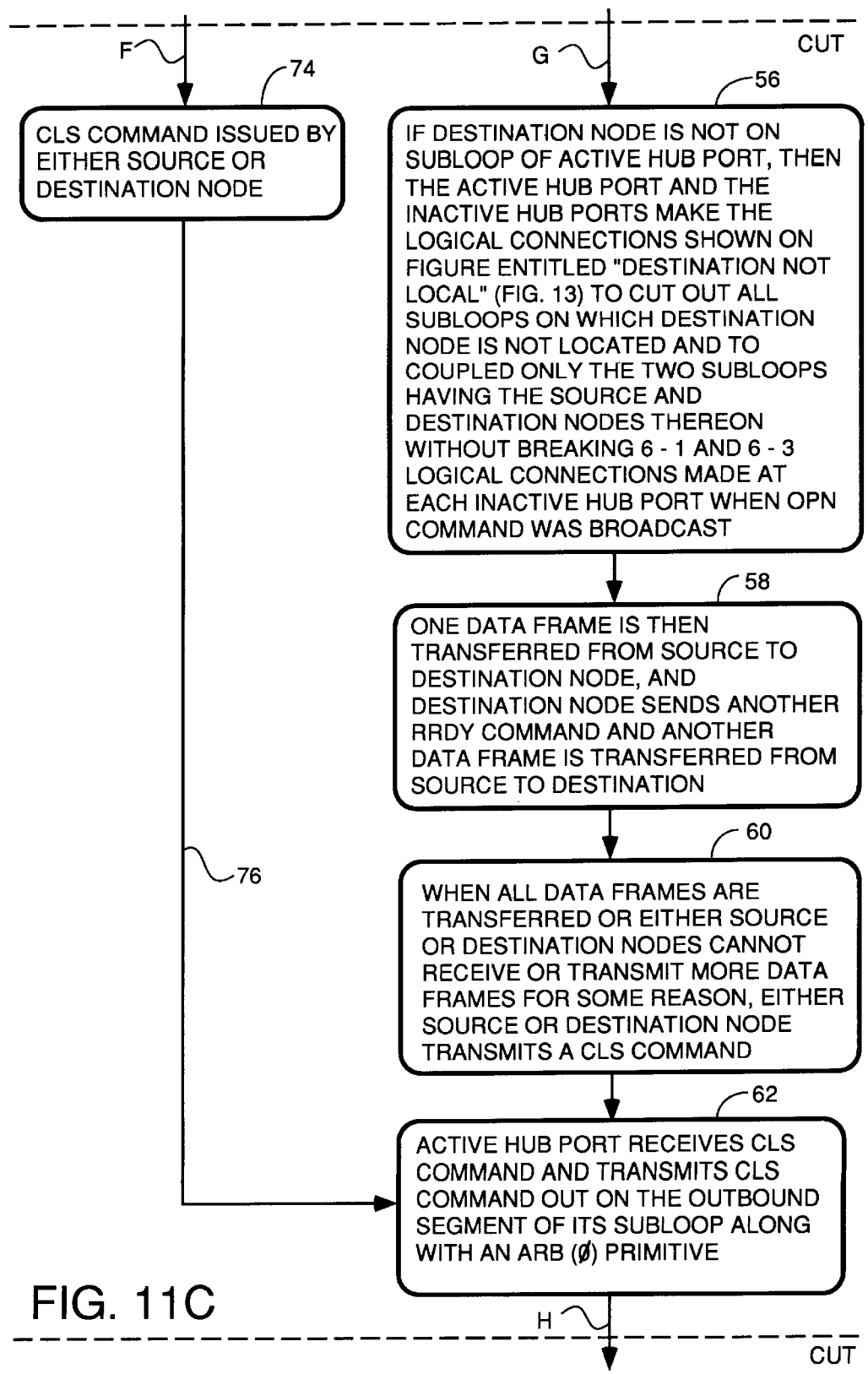

Block 56 in FIG. 11*c* represents the process which occurs in the hub ports for propagation of data frames when the destination node is not on the local subloop of the active hub port. In this situation, the active hub port and the inactive hub ports makes the logical connections shown on FIG. 13. These connections cut out all subloops in which the destination node is not located and make a data path from the subloop upon which the source node is located to the subloop on which the destination node is located through the broadcast loop from the source node to the destination node and through the return loop from the destination node to the source node. These logical connections are made without breaking the 6-1 and 6-3 connections previously made at each inactive hub port when the OPN command was broadcast. To set up the data path from the active hub port to the subloop containing the destination node, the active hub port makes the connection 2-3 and 5-1. The source node 10 then transmits a single data frame represented by arrow 109 in response to an RRDY. This data frame arrives at terminal 2 of the active hub port and is transferred to terminal 3 and propagates outbound on the broadcast loop segment 12, as symbolized by arrow 111. When the data arrives at terminal 6 of inactive hub port B, the previous 6-1 and 6-3 logical connections still exist so the data propagates outbound on the outbound segment of the B subloop as represented by arrow 113 as well as simultaneously outbound on the broadcast loop segment 12 from hub port B to hub port C via the 6-3 connection. When the data frame arrives at terminal 6 of hub port C, the broadcast logical connections previously made 6-1 and 6-3 also still exist. Therefore, the data frame propagates around subloop C and simultaneously propagates outbound on broadcast loop segment 12 toward hub port D. This condition is represented by arrows 115 and 117. When the data frame represented by arrow 117 arrives at terminal 6 of hub port D, the previously made broadcast loop connections 6-1 and 6-3 are still in existence. This causes the data frame to propagate around subloop D as represented by arrow 119, and to simultaneously propagate outbound from terminal 3 of hub port D on the broadcast loop segment connecting hub port D to hub port A, as represented by arrow 121. When the data frame represented by arrow 121 arrives at terminal 6 of the active hub port it is discarded. In the meantime, the data frame represented by arrow 119 propagates to the destination node D1 where it is buffered. The destination node D1 then transmits either a RRDY or CLS command as represented by arrow 123. Assume for this hypothetical that the destination node transmits a RRDY command. This command is passed along unchanged by nodes D2 and D3, as represented by arrows 125 and 127, and arrives at terminal 2 of hub port D. Hub port D recognizes the RRDY command and enters state 3 where it makes the logical connection 2-4 and blocks any data transfer from terminal 5 to terminal 4. This causes the RRDY command to propagate down the return loop segment coupling hub port D to hub port A, as symbolized by arrow 129. Because the connection 5-1 already exists at the active hub port, the RRDY command propagates outbound on subloop A, as symbolized by arrow 131. The RRDY command is passed through nodes A1 and A2 unchanged, as symbolized by arrows 133 and 135, and reaches source node A3. As soon as source node A3 detects the RRDY command on its inbound segment, it transmits another data frame, and the process is repeated. All of the above processing illustrated in FIG. 13 is symbolized by the process of block 58 in FIG. 11*c*.

Block 60 in FIG. 11*c* represents the process of starting to close the connections. When all the data frames are transferred from the source to the destination, or either the source or destination node cannot receive or transmit more data frames for some reason, a CLS command will be transmitted. This CLS command, if transmitted by the source node, propagates around the broadcast loop to hub port D where it propagates around subloop D and reaches the destination node. The destination node then forwards the CLS command as do nodes D2 and D4. When the CLS command reaches terminal 2 of hub port D, it's transferred from terminal 2 to terminal 4 by the connection previously made when state 3 was entered and propagates on the return loop segment 10 from hub port D to hub port A.

What happens at this point, is symbolized by block 62 in FIG. 11*c*. When the active hub port receives a CLS command at terminal 5, it transmits the CLS command out on the outbound segment of its subloop along with an ARB (0) primitive by virtue of the connections and state it previously entered when it received an RRDY or CLS on terminal 5 in response to broadcast of the OPN command. This process is symbolized by arrows 137 and 139 in FIG. 13. The CLS command and the ARB (0) primitives propagate around subloop A through nodes A1 and A2 until they reach the source node A3 as symbolized by arrows 141, 143, 145 and 147. When the CLS command and the ARB (0) primitives arrive at the source node 10, the process of block 64 in FIG. 11*d* occurs. The source recognizes the CLS command and stops absorbing the inbound ARB primitive and instead passes the ARB (0) back to the active hub port, as represented by arrow 149.

Figure 11D:
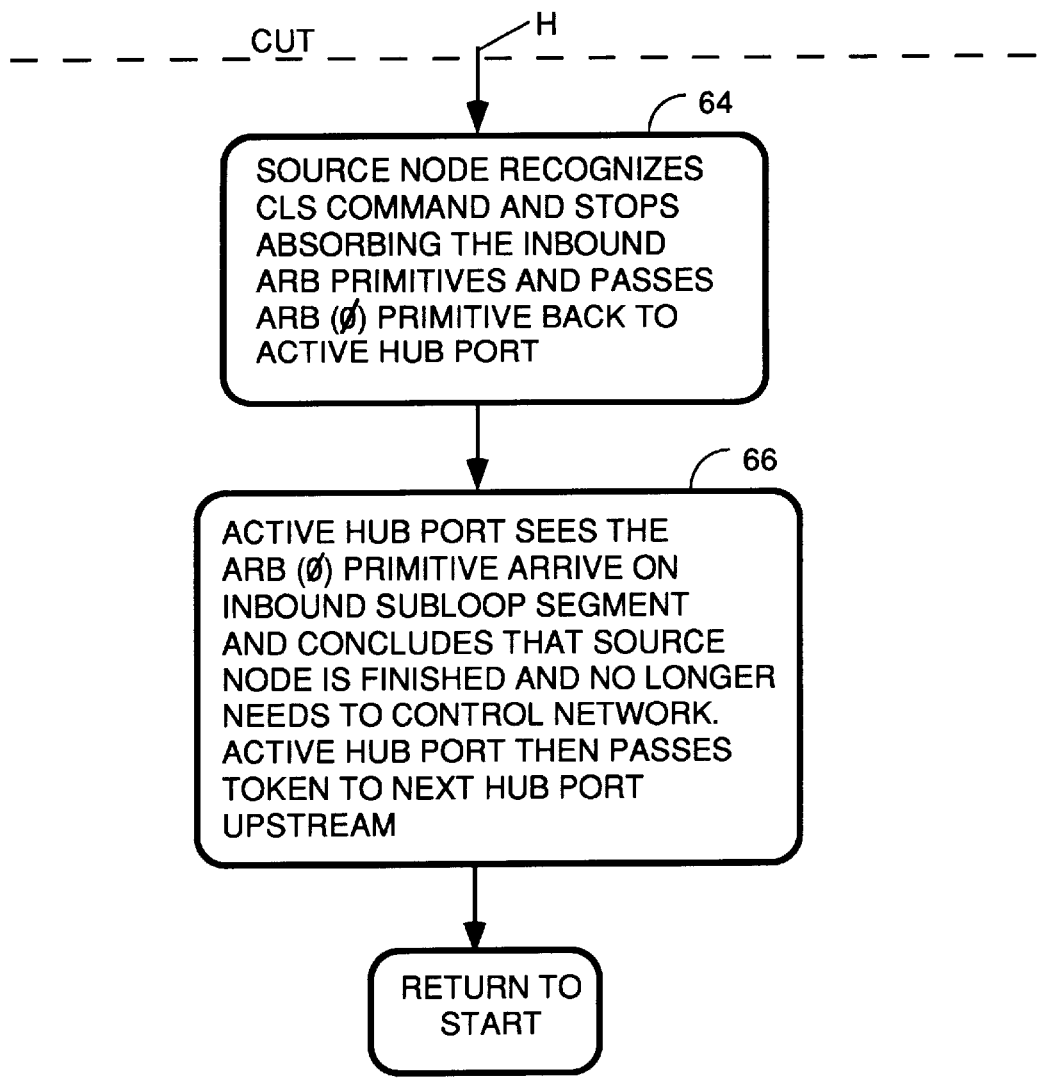

When the ARB (0) primitive arrives at terminal 2 of the active hub port, the process of block 66 in FIG. 11*d* occurs wherein the source node sees the CLS and stops absorbing the inbound ARB (0) primitives and substituting its CFW ARB (0). The source node then passes the ARB (0), represented by arrows 147 and 149, to the active hub port. The active hub port sees the ARB (0) primitive arrive on the inbound subloop segment and concludes that the source node is finished and no longer needs to control the network. At that point the active hub port passes the ARB token to the next hub port upstream. Hub port B then becomes the active hub port, and the process starts over at block 41 in FIG. 11*a*. That concludes the processing for the data transfer operation in the first embodiment where the destination node is not local.

Figure 14:
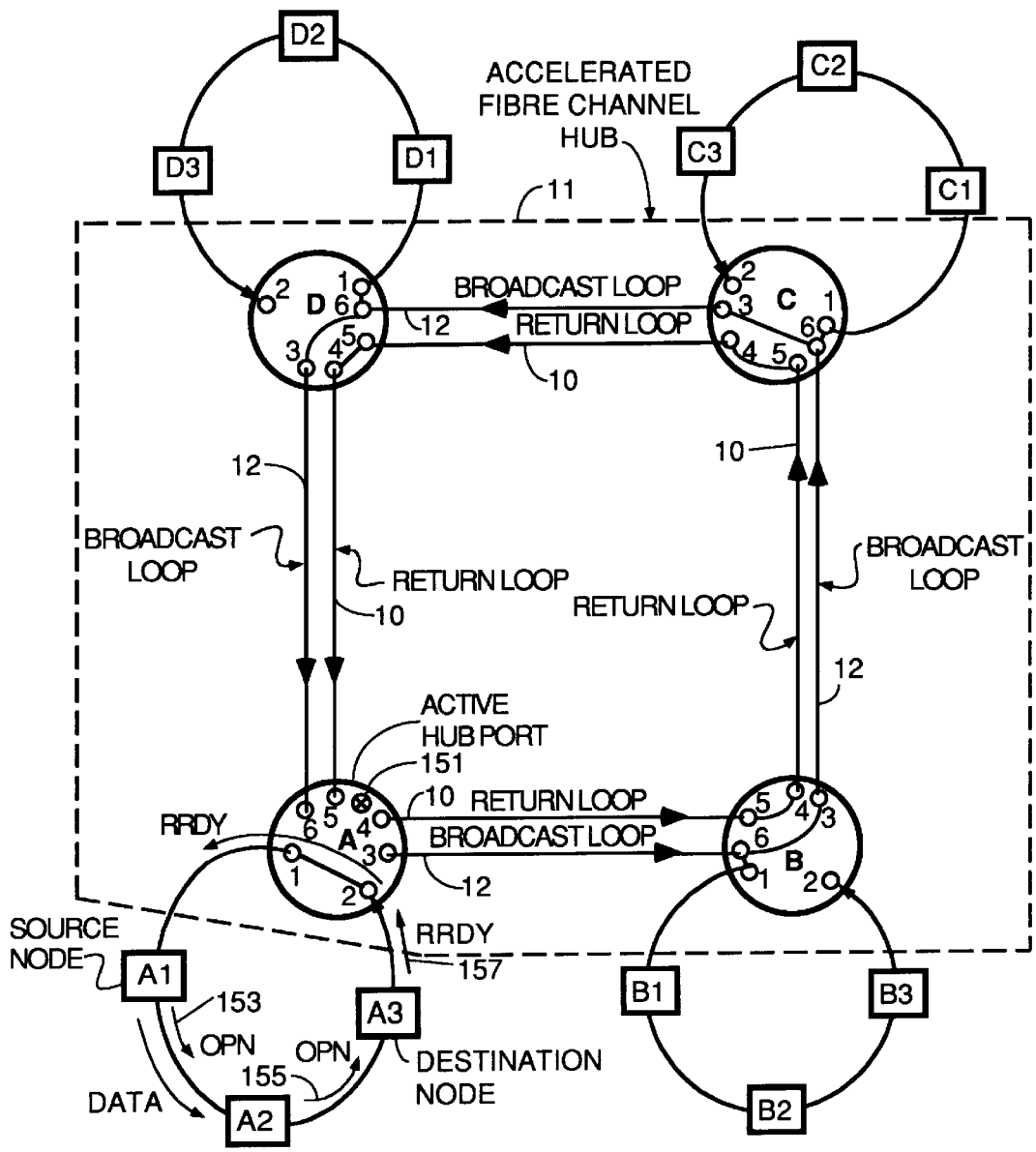
FIG. 14 is a diagram illustrating RRDY and data frame propagation and switching connections in the active hub port according to the protocol of FIG. 11 for a local source and destination.
Figure 15A:
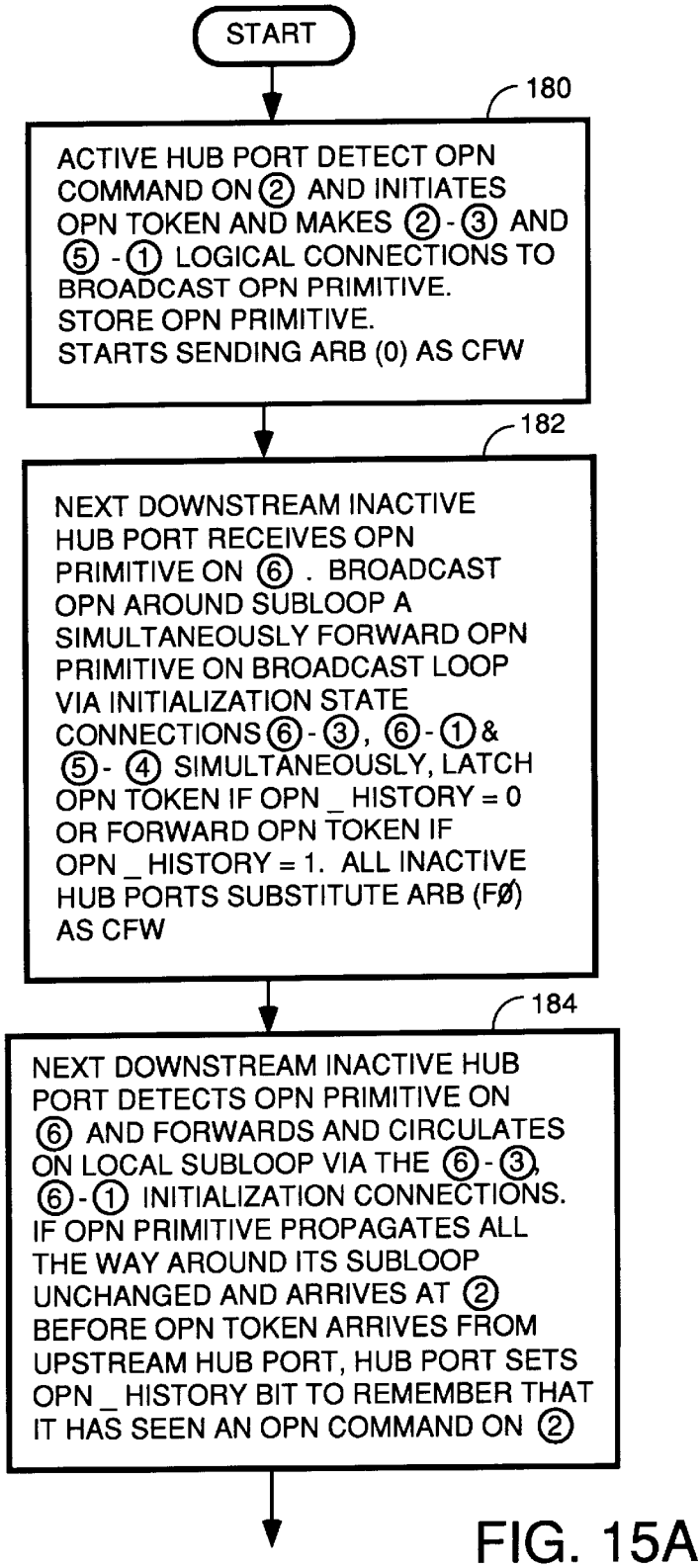
FIG. 15 is a flow diagram showing the flow of processing steps for a second embodiment of an accelerated Fibre Channel protocol using three tokens for ARB, OPN and CLS operations. This accelerated protocol does not support non-zero BB credit cases.
Figure 15B:
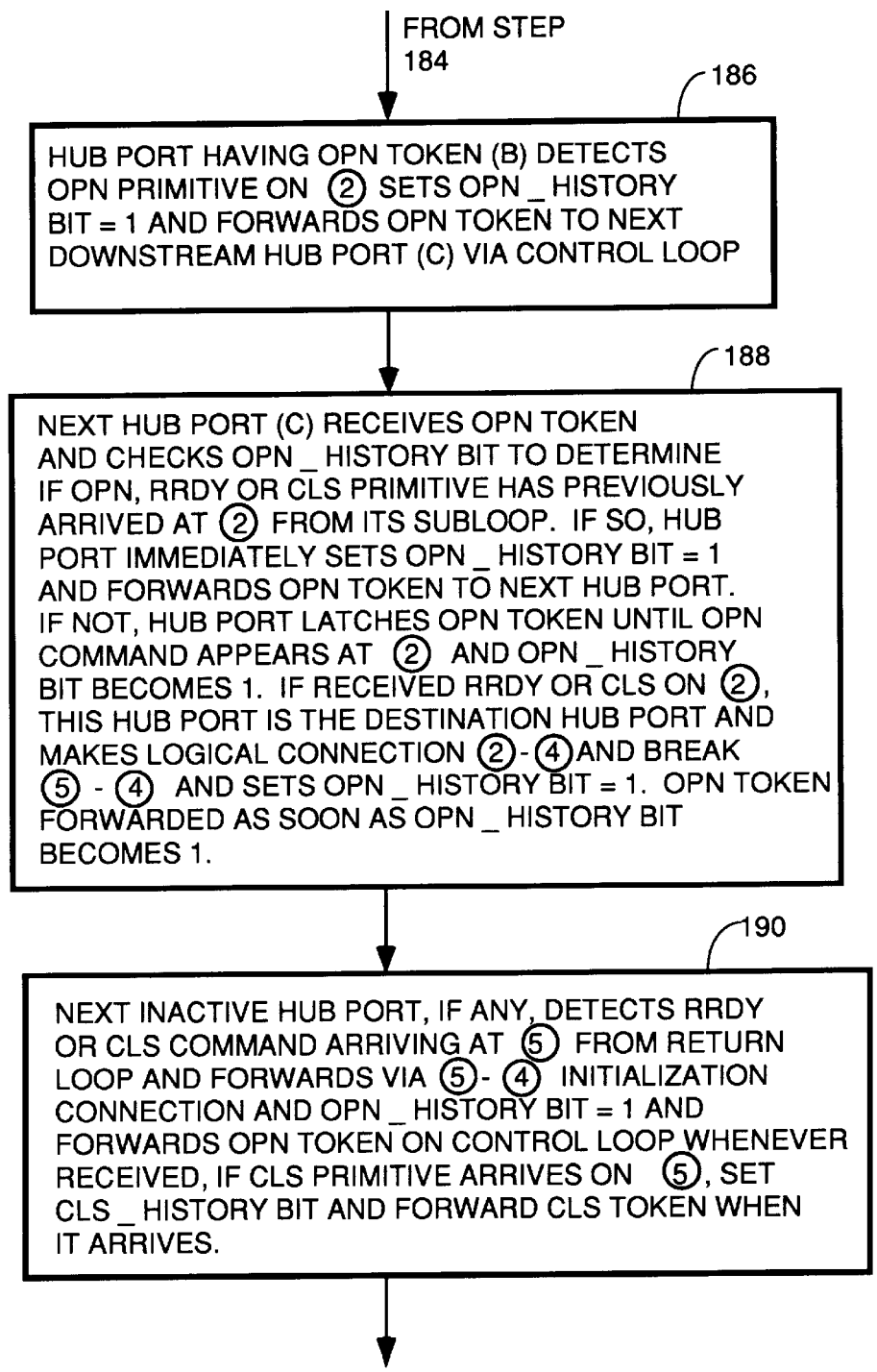
Figure 15C:
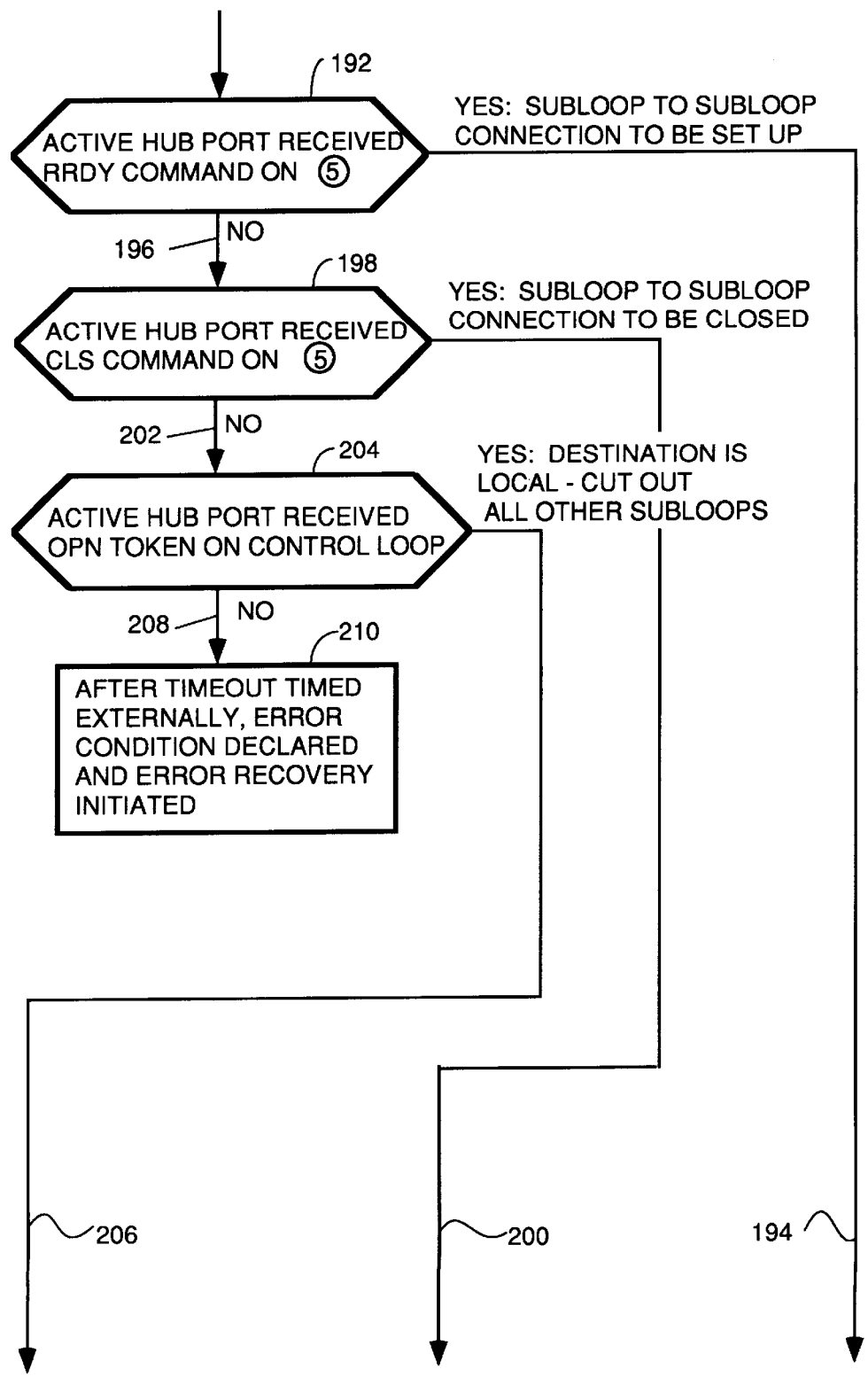
Figure 15D:
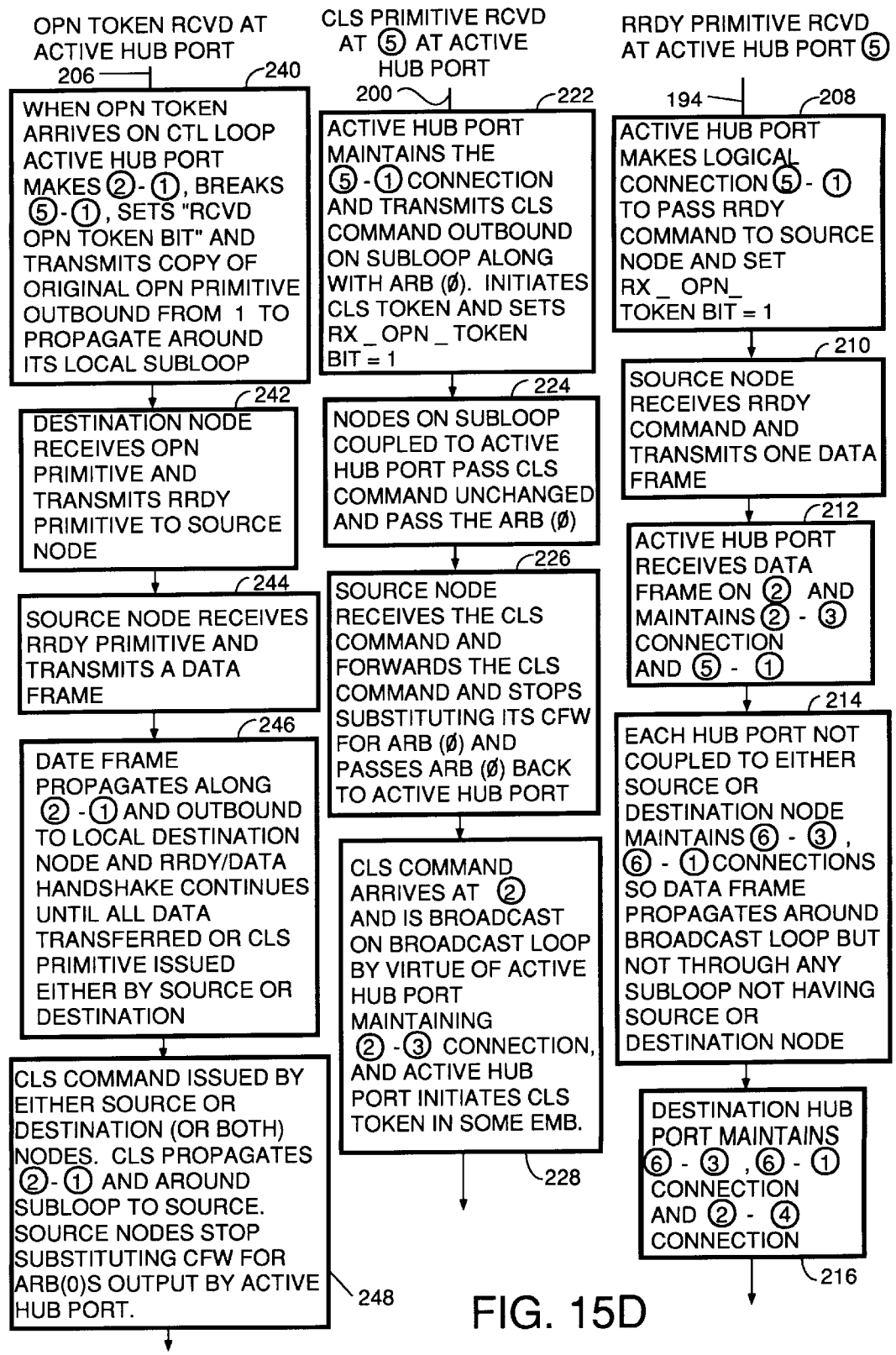
Figure 15E:
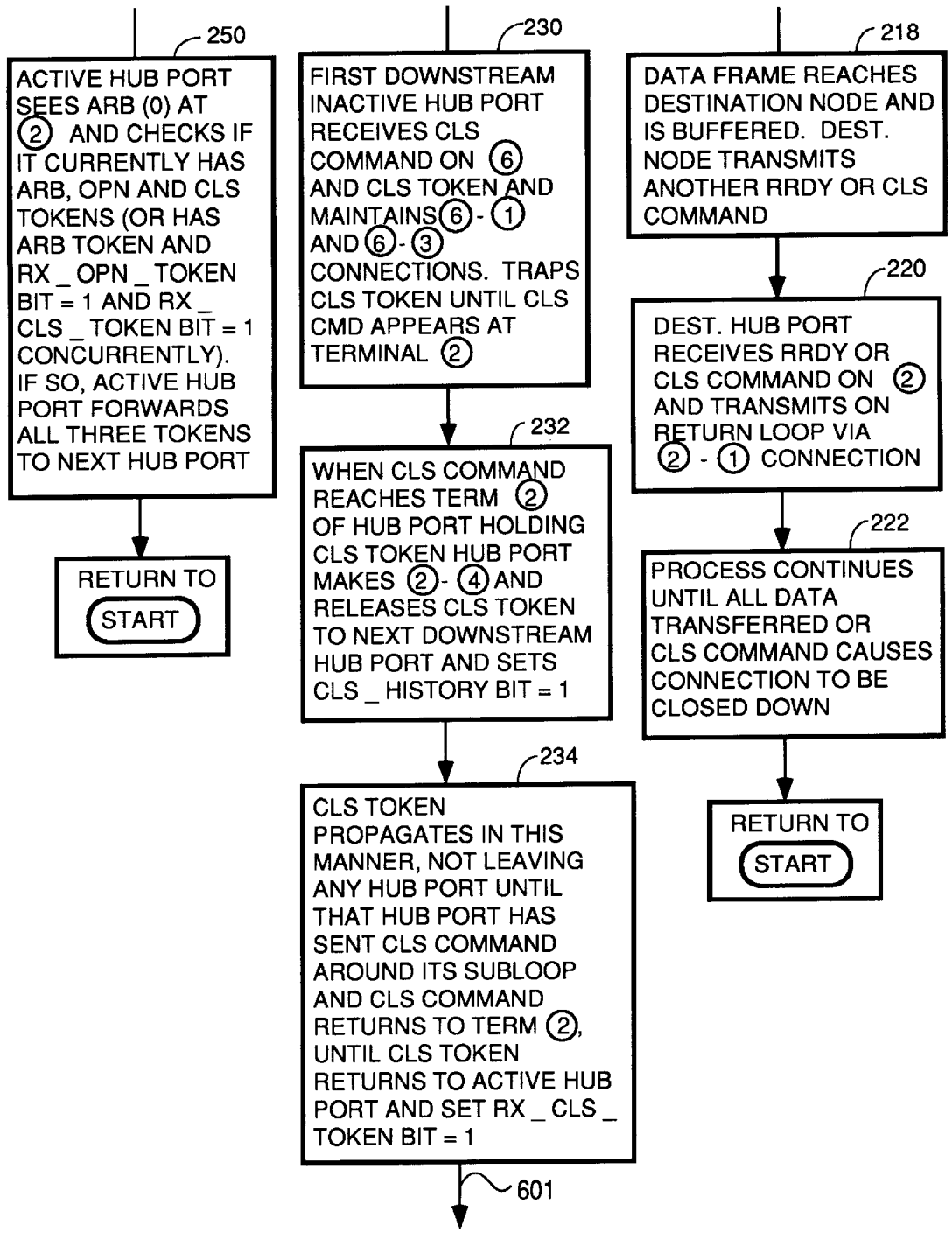
Figure 15F:
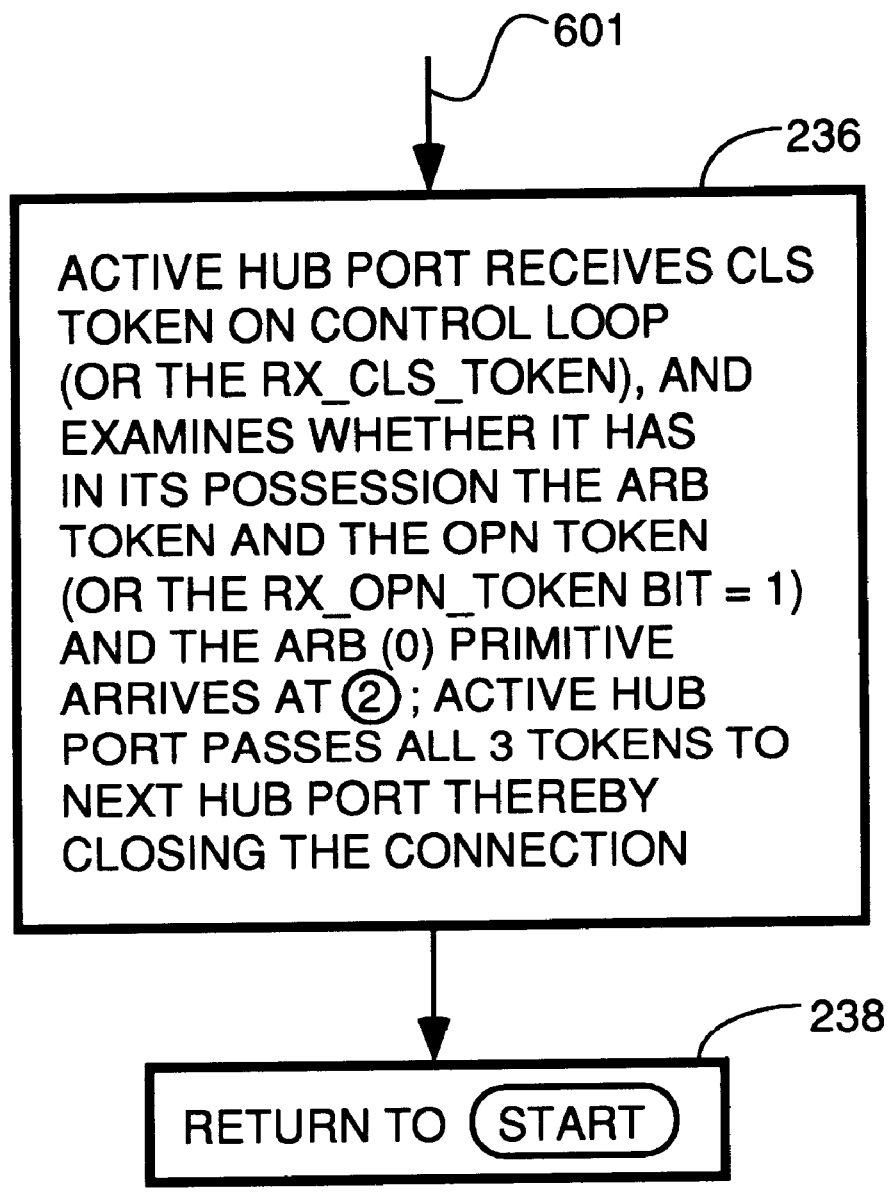

The case where the destination node is on the same subloop as the source node and is located on the subloop between the source node and the active hub port and downstream of the source node is covered by the processing symbolized by blocks 46 and 68 and the following blocks in FIG. 11*b*. Assume, for purposes of illustration, that the source node is A1 and the destination node is A3 as shown in FIG. 14. In this situation, when hub port A receives the ARB token 151 it passes the inbound ARB primitives outbound on its local subloop. Source node A1 will eventually see its own ARB primitive return to it if it is the highest ranking node on that subloop which is currently requesting control of the network. When source node A1 sees its own ARB primitive return to it, it will know that it won the local arbitration and will issue an OPN command. The OPN command issued by source node A1 is symbolized, by arrow 153. The OPN command is passed unchanged by node A2 and reaches the destination node A3 as symbolized by arrow 155. The destination node A3 recognizes the OPN command, and transmits a RRDY command to terminal 2 of the active hub port, as symbolized by arrow 157. This results in processing by the active hub port symbolized by block 46 in FIG. 11b, and results in a transition along the "NO" path 70 from block 46 to block 68. Transition along the "NO" path 70 only occurs when the destination node is on the same subloop as the source node and resides on that subloop between the source node and the active hub port. When the active hub port A receives the RRDY command represented by arrow 157 on terminal 2, it knows that the destination is local, and the process in block 68 in FIG. 11b occurs. The process represented by block 68 is a test to determine whether the active hub port received a RRDY command or a CLS command on its local input, i.e., terminal 2. In this example, the answer to this question will be yes, so processing vectors along path 71 to the process represented by block 72. If the test of block 68 determines that the active hub port did not receive either a RRDY command or a CLS command on terminal 2, then a protocol error has occurred, and processing will vector along the "NO" path 74 to the process represented by block 76. The process of block 76 declares a protocol error and alerts a software control function to stop accelerating the loop. To stop accelerating the loop, all hub ports make logical connections 2-3 and 6-1 thereby turning the loop into a single Fibre Channel loop operating in accordance with a conventional Fibre Channel non-accelerated protocol.

The process represented by block 72 in FIG. 11b is executed only when the source and destination nodes are both on the local subloop and the destination node is downstream from the source node. In this situation, the active hub port A makes the 1-2 logical connection so that data frames from the source node circulate only locally on the subloop until they reach the destination node. In an alternative embodiment, the active hub port can make a 2-3 and 6-1 connection and each inactive hub port can make a 6-3 logical connection so that the data propagates around the broadcast loop which is internal to the accelerated Fibre Channel hub 11. When the data reaches terminal 6 of the active hub port, it traverses the 6-1 logical connection so that the data is transferred outbound on the local subloop. It then reaches the destination node and is buffered. When the data transfer is completed, or either the source node or destination node issues the CLS command the process symbolized by block 74 in FIG. 11c occurs, and processing vectors along path 76 to the process represented by block 62. Thereafter, the processes represented by blocks 62, 64 and 66 are performed to close the connection and pass the ARB token to the next hub port.

THREE TOKEN ALTERNATIVE EMBODIMENT

Referring to FIG. 15, there is shown a flow chart for processing of an alternative embodiment employing three tokens. The first token is called ARB. This token circulates around the loop comprised of the hub ports and serves the same function as the ARB token in the previously described embodiment. The second token is called the OPN token, and the third token is called the CLS token. The purpose of the latter two tokens is in accounting to make sure all subloops have seen the OPN and CLS primitives, respectively. The advantage of the three tokens embodiment is that it eliminates the counter bits and the collision character of the previous embodiment made necessary by the possibility of a collision between OPN primitives. It also reduces the complexity of the embodiment by eliminating the possibility of collisions between OPN commands by substituting a simple token trapping technique. This embodiment more gracefully covers the case when the source node and the destination node are both on the same subloop.

Figure 16:
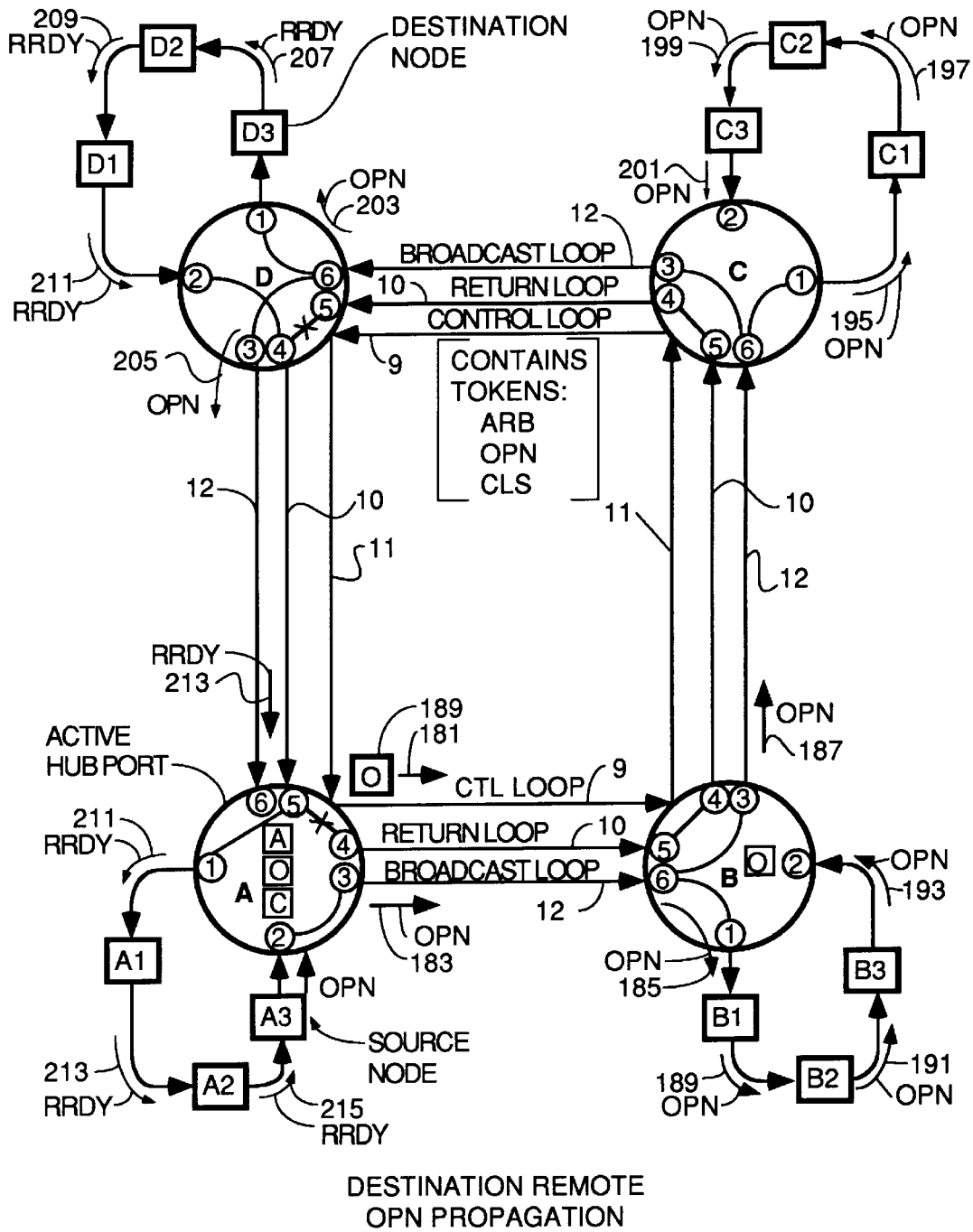
FIG. 16 is a diagram illustrating OPN and RRDY primitive propagation and switching connections in the active and inactive hub ports according to the accelerated protocol of FIG. 15 for a nonlocal destination.
Figure 17:
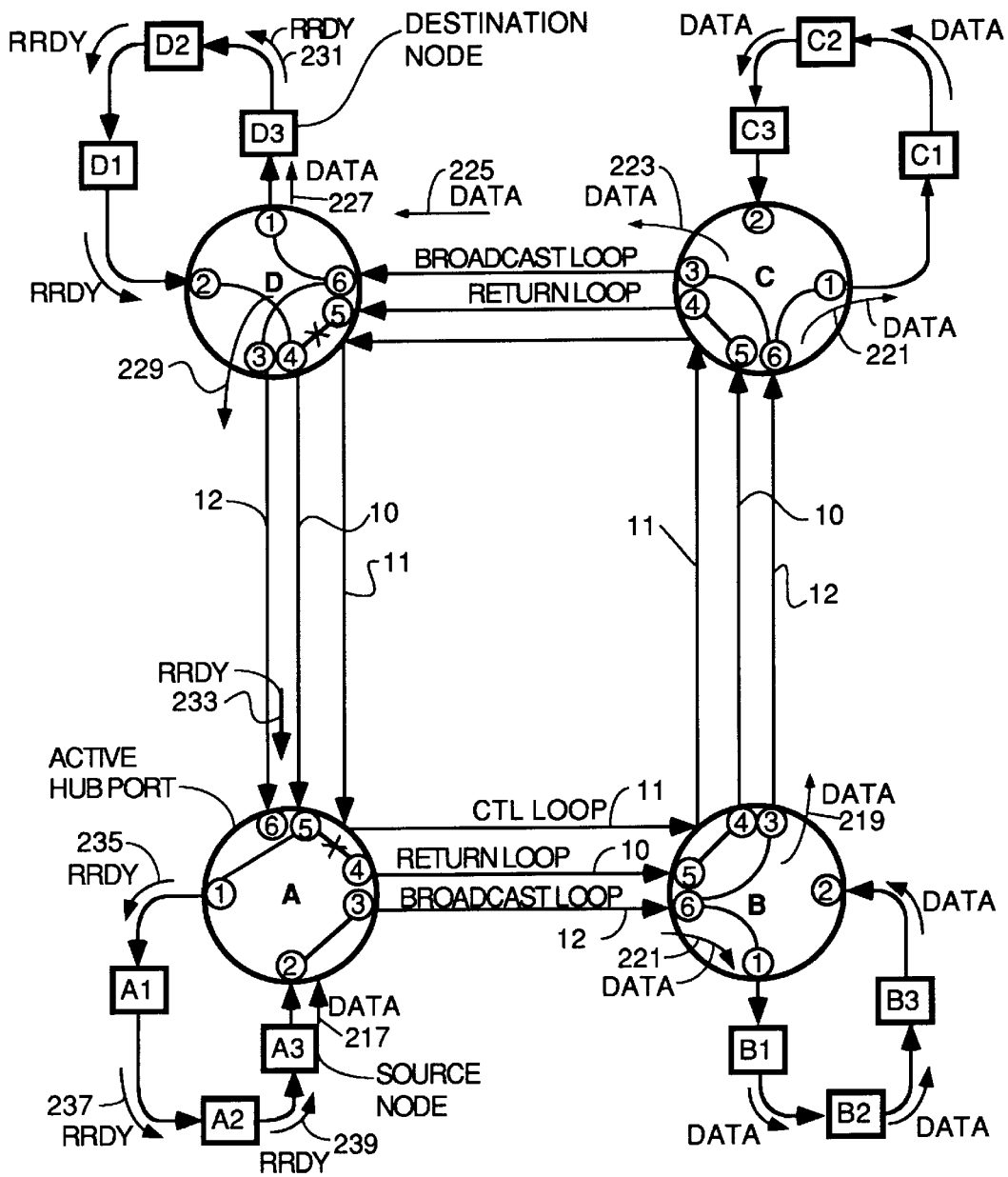
FIG. 17 is a diagram illustrating data frame propagation and switching connections in the active and inactive hub ports according to the accelerated protocol of FIG. 15 for a nonlocal destination.
Figure 18:
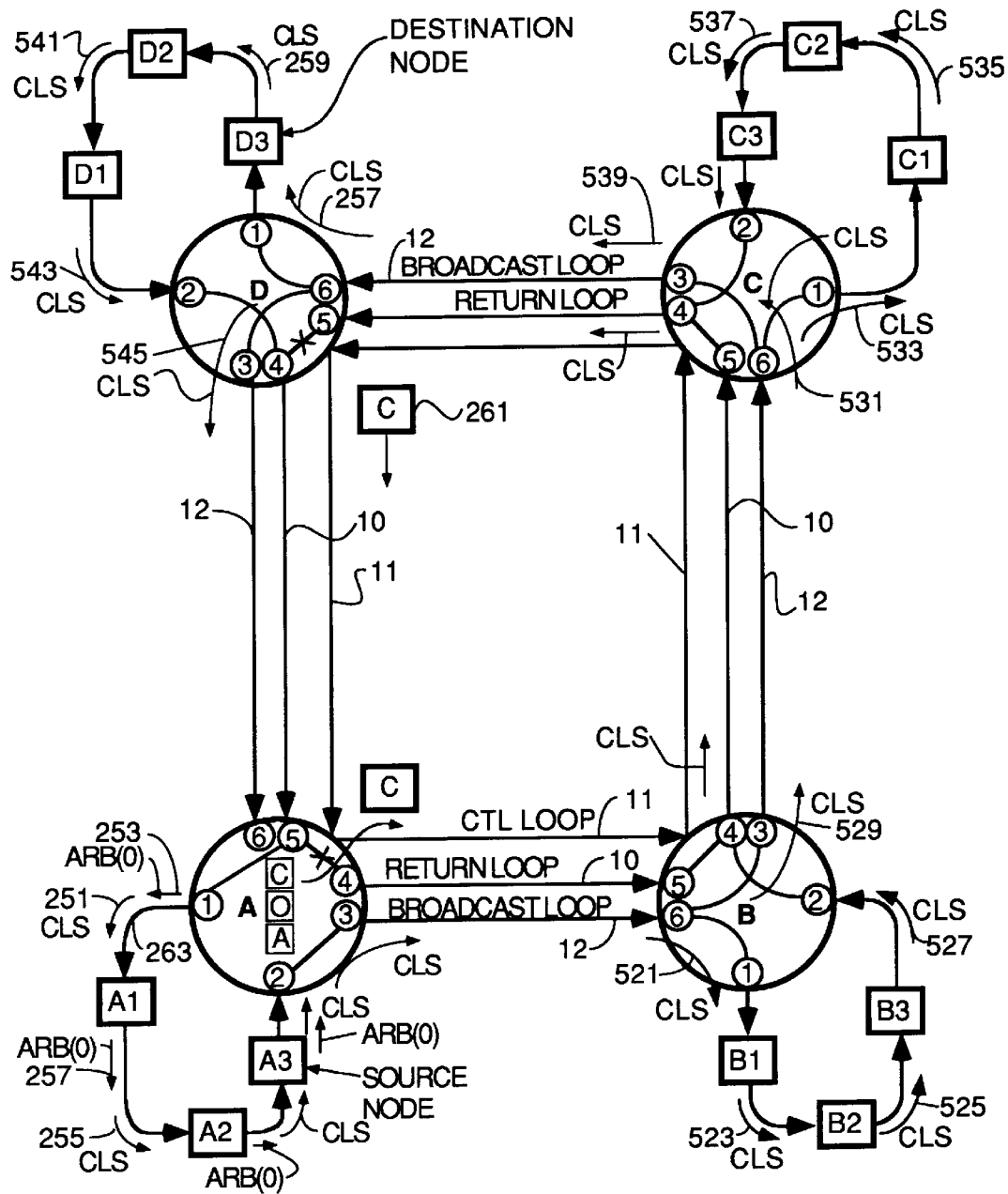
FIG. 18 is a diagram illustrating CLS primitive propagation and switching connections in the active and inactive hub ports according to the accelerated protocol of FIG. 15 for a nonlocal destination.

Referring to FIG. 16, there is shown a slightly modified accelerated Fibre Channel hub architecture from that shown in FIG. 8. The only difference between these two architectures is the presence of a control loop 11 which is coupled to each hub port for propagation of the three tokens and implementation in switching machines within the hub ports of different switching rules to implement the accelerated three token protocol. In the preferred embodiment, the data carried on the broadcast loop, 12, the return loop 10, and the control loop 11 are all carried in individual time slots on a single ten bit wide time division multiple access (hereafter TDMA) bus which couples each hub port to its neighboring hub ports. In alternative embodiments, three separate buses may be used. There follows a summary of the switching and token handling rules followed by the active and inactive hub ports to implement the three token embodiment.

Switching and Token Handling State Machine Boolean Logic Pseudocode for Three Token Embodiment (Including Rules for Both Active and Inactive Hub Ports)

The following are the switching and token handling rules of operation for the active and inactive hub ports (the destination hub port, i.e., the hub port coupled to the subloop having the destination node coupled thereto, is considered an inactive hub port). The active hub port is defined as the hub port which has the ARB token. Each hub port, whether active or inactive, has the ability to detect an OPN or CLS command on the local inbound port 2 and also to detect on terminal 2 any start of frame characters that precede data frames. These rules supercede the flow charts comprising FIG. 15 and accompanying switching diagrams to the extent that there are any inconsistencies between the flow chart and/or switching drawings and this boolean description of the state machines. The flow charts that comprise FIG. 15 show the general flow, but because of their linear nature, they cannot show the concurrency of activity in all the active and inactive hub ports. A series of state diagrams in the form of flow charts will be presented following the discussion of FIG. 29 to show the concurrency of operations more accurately.

Terminology

"Active" hub port refers to the hub port which has the ARB token.

"Inactive" hub port refer to all other hub ports (which do not have the ARB token).

"CFW" means the current fill word.

Terminal 1 is the inbound local loop.

Terminal 2 is the outbound local loop.

Terminal 3 is the outbound broadcast loop.

Terminal 4 is the outbound return loop.

Terminal 5 is the inbound return loop.

Terminal 6 is the inbound broadcast loop.

"OPN Recipient" node is the node to which the OPN primitive is addressed (destination node).

"OPN Initiator" node is the node which transmitted the OPN. Also called the (source node).

The "control loop" is a separate control line or a dedicated time slot on a TDMA bus coupling all hub ports.

On the active hub port:

"Received OPN token" bit=1 indicates that OPN token forwarding process is complete.

"Received CLS token" bit=1 indicates that CLS token forwarding process is complete.

On the active hub port, if the OPN recipient is local and the hub port is:

downstream from the OPN initiator and upstream from the OPN recipient the configuration is "local DSH";

downstream from the OPN recipient and upstream from the OPN initiator the configuration is "local SDH".

On an inactive hub port:
  CLS history bit is set when it sees a CLS arrive on its local loop (terminal 2).
  OPN history bit is set when it sees an OPN arrive on it's local loop (terminal 2).
General Connection Rules
The hub initializes with all ports in the inactive state and one port in the active state.
The active hub port is made active through the reception of all three tokens (ARB, OPN, CLS).

All inactive hub ports initialize with:
  5-4 connections (close the return loop);
  6-3 and 6-1 connections (close the broadcast loop).
Inactive hub ports keep 6-3 and 6-1, but switch node 4 from 5 to 2 when they detect RRDY or CLS on 2.
When ARB token is received, the hub port opens all connections and clears all Rx_token flags.
When 2-4 is made on a hub port, the 5-4 connection is implicitly broken (terminal 4 is the pole of the switch).

Active Hub Port Rules

```
IF ARB token held THEN                                          # Active hub port rules
    IF CFW = IDLE THEN
        Send ARB(F0)
        IF ARB(F0) returned before any other ARB THEN pass tokens ENDIF
    ENDIF
# Continuously test for end conditions
    IF CLS token received on control loop set Rx_CLS_token = 1 in active hub port
    IF OPN token received on control loop set Rx_OPN_token = 1 in active hub port
    IF Rx_CLS_token bit = 1 AND Rx_OPN_token bit = 1 AND ARB(0) received THEN
        pass tokens
    ENDIF
# Launch OPN primitive and token
    IF OPN primitive received on 2 THEN
        set CFW = ARB(0) and substitute CFW for all incoming IDLEs and ARBs
        Store copy of OPN in active hub port.
        Make 2-3, make 5-1
        Initiate OPN token on control loop
# Local OPN recipient detected via OPN token reception ("local DSH" configuration)
        IF OPN token received on control loop THEN
            break 5-1, make 2-1
            forward stored copy of OPN to terminal 1        # send OPN locally
            UNTIL RRDY_count = 0
            DO
                transmit RRDY as CFW
                decrement RRDY_count
            DONE
# Remote OPN recipient detected
        ELSEIF RRDY received on 5 THEN                       # RRDY received from remote node
            make 5-1
            set Rx_OPN_token = 1
        ELSEIF CLS primitive received on 5 THEN    # CLS received from remote node
            initiate CLS token on control loop
            make 5-1
            set Rx_OPN_token = 1
# OPN launched, CLS returned on local (local OPN recipient prematurely closed)
        ELSEIF CLS primitive received on 2 THEN
            make 2-3                                         # launch OPN primitive and token
            initiate CLS token on control loop
# OPN and RRDY received on 2 indicating full duplex
        ELSEIF RRDY primitive received on 2 THEN
            increment RRDY counter
        ENDIF
# RRDY received on 2 without OPN received on 2 - local OPN initiator and recipient ("local SDH")
    ELSE IF RRDY received on 2 THEN
        set CFW = ARB(0) and substitute CFW for all incoming IDLEs and ARBs
        make 2-1, break 5-1
        set Rx_OPN_token = 1
# CLS received on 2 without OPN launched on 2 - local OPN initiator and recipient ("local SDH")
    ELSE IF CLS received on 2 THEN                           # must be local SDH
        set CFW = ARB(0) and substitute CFW for all incoming IDLEs and ARBs
        make 2-1
        set Rx_OPN_token = 1
        set Rx_CLS_token = 1
    ENDIF
```

| Inactive Hub and Destination Hub Port Switching Rules |
|---|
| ```
# inactive hub port rules: 6-1, 6-3, and 5-4 connections already made
# OPN_history and CLS_history bits = 0 initially
ELSE                                                      # ARB token not held
    set CFW = ARB(F0) and substitute CFW for all incoming ARBs and IDLEs
    IF OPN token received on control loop THEN
        IF OPN_history bit = 1 THEN
            Forward OPN token on control loop
        ELSE
            Hold OPN token until OPN_history_bit = 1
        ENDIF
    ENDIF
    IF CLS token received on control loop THEN
        IF CLS_history bit = 1 THEN
            Forward CLS token on control loop
        ELSE
            Hold CLS token until CLS_history_bit = 1
        ENDIF
    ENDIF
    IF OPN primitive received on 6 THEN
      IF OPN primitive received on 2 THEN
            Set OPN_history bit = 1
        ELSEIF CLS primitive received on 2 THEN
            Make 2-4
            Forward CLS on 4
            Set CLS_history bit = 1
            Set OPN _history bit = 1
        ELSEIF RRDY or SOF received on 2 THEN
            Open 5-4, make 2-4      # 2-4 forwards RRDY on return loop
            Set OPN_history bit = 1
        ENDIF
    ENDIF
    IF CLS primitive received on 6 THEN
      IF CLS primitive received on on 2 THEN
            Make 2-4
            Forward CLS on 4
            Set CLS_history bit = 1
        ENDIF
    ENDIF
    IF RRDY received on 5 THEN Set OPN_history bit = 1 ENDIF
    IF CLS received on 5 THEN Set CLS_history bit = 1 ENDIF
ENDIF
``` |

FIG. 15, comprised of FIGS. 15A through 15F, is a flow chart of the processing involved in the three accelerated token protocol starting with the issuance of the OPN primitive by the source node. The reader is encouraged to read the discussion of FIG. 15 and study the discussions of FIGS. 16–30 to get a feel for the overall processing of the accelerated hub port before studying the concurrency showing state diagram/flow charts of FIG. 30 et seq. The local arbitration process is identical in the protocol implemented by the embodiment of FIG. 15 et seq. to the process illustrated in FIG. 9.

The process of making a data transfer from the source node to the destination node starts with block 180 in FIG. 15. This block represents the process of detection by the active hub port of the arrival of an OPN command on local input terminal 2. The active hub port then initiates the OPN token. Initiation of the OPN token is the process of sending it downstream to the next hub port, as symbolized by arrow 181 in FIG. 16. The active hub port also makes the 2-3 connection to broadcast the OPN primitive on the broadcast loop 12. This is symbolized by arrow 183 in FIG. 16. Block 182 in FIG. 15 represents the process that occurs at the first downstream hub port which the OPN token encounters. Since the next hub port downstream does not have the ARB token in its possession, it is an inactive hub port and it follows switching rules defined above. When all hub ports are initialized, they make 6-3, 6-1 and 5-4 connections. This causes the OPN primitive arriving at terminal 6 to start propagating around subloop B in FIG. 16, as symbolized by arrow 185 and simultaneously causes the OPN primitive to proceed along broadcast loop segment 12 from terminal 3 of the B hub port to terminal 6 of the C hub port, as symbolized by arrow 187. Simultaneously, the next downstream hub port, in this case hub port B, receives the OPN token, symbolized by box 189 and latches it until the OPN primitive 185 propagates entirely around the subloop. Each hub port has an OPN token history bit (OPN_history bit in switching rules above) which has a 0 initialization state. The purpose of this history bit is to declare by a 1 state that an OPN primitive has previously arrived on terminal 2. The OPN_history bit must be 1 before the OPN token can be forwarded to the next active hub port. When the OPN token arrives at any inactive hub port, including the destination hub port, it will be forwarded on the control loop to the next hub port if OPN_history bit=1. If not, the OPN token will be trapped at that hub port until the OPN_history bit=1. Essentially, the OPN token is not forwarded to the next hub port until the OPN primitive arriving at terminal 6 has propagated around the subloop and returned to terminal 2. This causes OPN_history bit to be set to 1 and means the destination node is not on that subloop. Also, each inactive hub port has its CFW initialized to ARB (F 0) and while not in possession of the ARB token, each inactive hub port substitutes ARB (F 0) for all incoming ARB primitives so that local fairness and arbitration proceeds in anticipation of the arrival of the ARB token.

The OPN primitive 187 almost always arrives at terminal 6 of hub port C before the OPN token arrives from hub port B. Hub port C then carries out the process symbolized by block 184. In this process, the next downstream inactive hub port, in this case hub port C, detects the OPN primitive on terminal 6 and forwards it on the broadcast loop and simultaneously circulates it around its subloop via the 6-3, 6-1 and 5-4 initialization connections. If the OPN primitive propagates all the way around its subloop unchanged (meaning that the destination node is not on that subloop) and arrives at terminal 2 before the OPN token arrives from the upstream hub port, then the hub port sets the OPN_history bit=1 to remember it has seen the OPN primitive command on terminal 2. The OPN_history bit is set to 1 also if either a RRDY or CLS primitive arrives on terminal 2. Then, as soon as the OPN token arrives on the control loop 9 it will be forwarded immediately if the OPN_history bit=1.

Because the destination note is not on subloop B, the OPN primitive 185 propagates around subloop B unchanged, as symbolized by arrows 189, 191 and 193 in FIG. 16. When the hub port B detects the OPN primitive 193 at terminal 2, it sets the OPN_history bit to 1 and forwards the OPN token to the next downstream hub port, in this case hub port C, via the control loop 11. This process is symbolized by block 186 in FIG. 15.

In the hypothetical example of FIG. 16, the downstream hub port C has already seen the OPN primitive arrive on terminal 2 and has set OPN_history bit=1 before the OPN token arrives from hub port B. Therefore, since it now has possession of the OPN token and has previously seen the OPN, RRDY or CLS primitives at terminal 2 (as indicated by OPN_history bit=1), the hub port immediately forwards the OPN token to the next hub port. If none of the three primitives OPN, RRDY or CLS primitives has arrived at terminal 2 prior to the time that the OPN token 189 arrives, then the hub port latches the OPN token until the OPN_history bit=1. If any hub port received either a RRDY or CLS primitive at terminal 2, it makes connection 2-4 and breaks 5-4 to propagate those two primitives back to the active hub port. In this case, hub port D is coupled to the subloop having the destination node so hub port C detects an OPN primitive at terminal 2. Thus, hub port C makes no connection between terminal 2 and terminal 4. This fact is symbolized in FIG. 16 by arrows 195, 197, 199 and 201 on subloop C and the lack of a 2-4 connection.

The 6-3 connection made by hub port C causes the OPN primitive to propagate on broadcast loop 12 to terminal 6 of hub port D. Hub port D, upon receiving the OPN primitive at terminal 6 forwards it on the broadcast loop and circulates it on its local subloop via the 6-1 and 6-3 logical connections. This fact is symbolized by arrows 203 and 205 in FIG. 16. Since the destination node is node D3, the OPN primitive 203 is detected by the destination node and converted to either a RRDY or CLS primitive as symbolized by arrow 207. This RRDY primitive propagates through nodes D2 and D1, as symbolized by arrows 209 and 211, and arrives at terminal 2 of hub port D. Hub port D detects the RRDY or CLS and makes the connection 2-4 and sets OPN_history bit=1 thereby transmitting the RRDY primitive (or CLS primitive) on the return loop 10 to terminal 5 of the active hub port A, as symbolized by arrow 213.

In hypothetical example of FIG. 16, if there had been another intermediary inactive hub port downstream from hub port D, the RRDY primitive (or CLS primitive) would arrive at terminal 5 from the return loop. This next inactive hub port would then forward the RRDY or CLS primitive via the initialized 5-4 connection so as to propagate the RRDY primitive directly through on the return loop enroute to the active hub port. The intermediary, inactive hub port would also forward the OPN token as soon as received on the control loop. This process is symbolized by block 190 in FIG. 15.

Processing by the active hub port depends upon the primitive which is received on terminal 5, If any, and starts with the test of block 192. Test 192 determines if the active hub port has received the RRDY command on terminal 5. If it has, processing is vectored on path 194. If not, processing proceeds to path 196 to test 198. Test 198 determines if the active hub port has received a CLS command on terminal 5. If it has, processing is vectored along path 200. If not, processing is vectored along path 202 to test 204. Test 204 determines whether the active hub port has received the OPN token on the control loop 9. If it has, processing is vectored along path 206. If not, processing is vectored along path 208 to the process represented by block 210. The process of block 210 is the declaration of an error condition. Each hub port has several status lines upon which are output state determination signals which are monitored by an external timer circuit. After a predetermined time with no change of state of the hub port, an error condition will be declared and an error recovery routine initiated. The details of the time out in monitoring of states for error condition recovery are not part of the invention.

Returning to test 192, If the hub port has received the RRDY command on terminal 5, it means that the destination node has been found in a remote subloop which is different than subloop that the source node is on. In that case, the processing of block 208 is performed.

The process of block 208 represents the process of the active hub port detecting the arrival of the RRDY command on terminal 5, and making logical connection 5-1 to pass the RRDY command to the source node. The active hub port also sets a Rx_OPN_token bit to 1 indicating that the OPN token has been received by virtue of having found the destination node. This process is symbolized by arrows 211, 213 and 215 and FIG. 9.

The next step in the process is symbolized by block 210 where the process of the source node receives the RRDY command forwarded via the 5-1 connection of the active hub port and transmits one data frame in response thereto. This data frame is represented by arrow 217 in FIG. 17.

The next step is symbolized by block 212 in FIG. 15. There the active hub port receives the data frame on terminal 2 and transmits it on the broadcast loop 12 by maintaining the 2-3 connection. The active hub port also maintains the logical connection 5-1. The data frame then propagates to the next hub port, which in the hypothetical example, is hub port B. Block 214 represents the processing by each inactive hub port not coupled to either the source or destination node such as hub ports B and C. Each of these hub ports maintains the 6-3 and 6-1 connections. The 6-3 connection causes the data frame to propagate on the broadcast loop segment 12 coupling hub port nodes B and C as symbolized by arrows 219 and 223 in FIG. 17. The 6-1 connection causes the data frame to simultaneously propagate outbound on the B subloop, as represented by arrow 221. Although the data frame represented by arrow 221 propagates around the subloop B, the latency time of the nodes on subloop B is not a delay factor since terminal 2 of the B hub port is not coupled to anything, and the active data path between the source and destination is on the broadcast loop. The same sequence of events happens at hub port C, as represented by arrows 221 and 223. In other words, although the data frame does simultaneously propagate through the subloops not containing the destination node, those subloops are not part of the data path between the source node and the destination node thereby eliminating the latency time associated with propagation of data through a node which is not on the subloop coupled to the destination node.

When the data frame arrives at the destination hub port, terminal 6, as symbolized by arrow 225, the destination hub port maintains the 6-3 and 6-1 connections. This causes the data to propagate outbound on the D subloop as represented by arrow 227 and simultaneously propagate along the broadcast loop segment 12 coupling the destination hub port D to the active hub port A, as represented by arrow 229. When the data frame represented by arrow 229 arrives at the active hub port, terminal 6, it is discarded.

The data frame propagating on the D subloop, represented by arrow 227, reaches the destination node D3 and is buffered there. The destination node then outputs either a RRDY command or a CLS command, as symbolized by arrow 231. Either one of these commands propagates through nodes D2 and D1 and arrives at terminal 2 of the destination hub port. Since the destination hub port maintains the previously established 2-4 connection, the RRDY command or the CLS command propagates outbound on the return loop segment 10 coupling terminal 4 of the destination hub port D to the active hub port A terminal 5. This processing at the destination hub port is represented by blocks 216, 218 and 220 of FIG. 15.

Because the active hub port maintains the connection 5-1, the RRDY (or CLS) command arriving at terminal 5 propagates around the A subloop through nodes A1 and A2 to the source node A3, as symbolized by arrows 233, 235, 237 and 239. In response to the RRDY command, the source node A3 transmits another data frame. This process continues until all data is transferred or a CLS command is issued by either the source node or the destination node thereby causing the connection to be closed down, all as symbolized by block 222 in FIG. 15. Closing the connection is identical to the processing of 62, 64 and 66 of FIG. 11c and FIG. 11d.

Next processing is vectored to the start label at the beginning of the flow chart of FIG. 15.

Returning to the consideration of block 198 in FIG. 15, if the active hub port received a CLS command on terminal 5, it means that the destination node can no longer receive data for some reason. In this case processing proceeds to step 222. The processing of block 222 represents the process carried out by the active hub port in maintaining the logical connection 5-1 and transmitting the CLS primitive outbound on the local subloop along with an ARB (0). This process is represented by arrows 251 and 253 in FIG. 18. The active hub port then initiates the CLS token on the control loop and sets the RX_OPN_token bit=1 to indicate that the OPN token is back or is effectively back.

Block 224 represents the process carried out by the nodes on the local subloop coupled to the active hub port in forwarding the CLS command unchanged and forwarding the ARB (0) primitive to the next node. This process is represented by arrows 255 and 257 in FIG. 18.

Ultimately the CLS command and the ARB (0) primitive reach the source node A3. At that point the process of block 226 is performed where the source node receives the CLS command and forwards the CLS command back to the active hub port. Simultaneously, the source node stops substituting its CFW for the ARB (0) primitive thereby allowing the ARB (0) primitive to pass back to the active hub port.

Block 228 represents the process which occurs in the active hub port when the CLS command and the ARB (0) command arrives at terminal 2. The protocol requires that the node which initiated the CLS command see a return of that CLS command. This allows the CLS initiator to know that the other node in the data transfer has seen the CLS command and understands that the point to point connection is to be shut down. Accordingly, the active hub port must broadcast the CLS command to make sure that it gets back to the destination node, if it was the destination node that initiated the CLS command. Therefore, the active hub port maintains the connection from terminal 2 to terminal 3 causing the CLS command to be broadcast on the broadcast loop. In some embodiments the active hub port initiates the CLS token at this point by causing a transition on the control loop indicating that the CLS token is transferred. The purpose of the CLS token is to make sure that all nodes on all subloops have seen the CLS command. The CLS token will not be returned to the active hub port until all nodes have seen the CLS command.

Block 230 represents the process carried out by the first downstream inactive hub when it receives the CLS command and the CLS token. This first downstream inactive hub, in the hypothetical example given in FIG. 18, maintains the logical connections 6-1 and 6-3. This causes the CLS command to propagate around subloop B and simultaneously passes the CLS command to be broadcast loop segment 12 coupling inactive hub port B to inactive hub port C. Inactive hub port C maintains the same 6-1 and 6-3 logical connections such that the CLS command circulates around subloop C and simultaneously traverses the broadcast loop segment 12 coupling inactive hub port C to destination hub port D, all as symbolized by arrows 521, 523, 525, 527, 529, 531, 533, 535, 537, 539, 257, 259, 541, 543, and 545 in FIG. 18.

Returning to the consideration of block 230 in FIG. 15, inactive hub port B receives the CLS token and holds it until CLS command appears at terminal 2 as symbolized by arrow 527. This condition occurs only after the CLS command has propagated entirely around subloop B.

Block 232 represents the process which is carried out by any inactive hub port which is holding the CLS token. In the hypothetical example, this is inactive hub port B. When the CLS command reaches terminal 2 of the hub port holding the CLS token, that hub port makes the 2-4 connection to forward the CLS command on the return loop, releases the CLS token to the next downstream hub port and sets the CLS_HISTORY BIT=1. By setting this bit, if the CLS token has not yet arrived, it will be forwarded immediatly when it does arrive.

Block 234 represents the process carried out by the rest of the hub ports in propagating the CLS token. Basically, the CLS token propagates in the manner described above from hub port to hub port. The rule for forwarding of the CLS token is that the CLS token may not leave any hub port until that hub port has sent the CLS command that arrived on the broadcast loop around its subloop and the CLS command has returned to terminal 2 of that hub port. This process continues until the CLS token is returned to the active hub port on the control loop. Processing the vectors on path 601 to the process of block 236.

The destination hub port follows the same rules for propagating of the CLS command and the CLS token as the inactive hub ports. Specifically, when a CLS command arrives on the broadcast loop, it is transmitted out on the outbound segment of the local subloop and propagates around the subloop as symbolized by arrow 257 in FIG. 18. The destination node D3 receives the CLS command and simply forwards it around the loop as symbolized by arrow

259. Finally the CLS command arrives at terminal 2 of the destination hub port D, and at that time, the destination hub port releases the CLS token for transmission on the control loop 11 segment coupling the destination hub port D to the active hub port A, as symbolized by arrow 261. Block 236 in FIG. 15 represents the processes which are carried out by the active hub port when it receives the CLS token on the control loop. Basically, when the active hub port receives the CLS token, it examines whether it has in its possession the ARB token and the OPN token. If it is in possession of the ARB token and the OPN token (or the Rx_OPN_token bit is set), then three of the four conditions that need to be satisfied for forwarding of the ARB token to the next hub port to release the loop have been satisfied. The fourth condition that must be satisfied before the ARB token can be forwarded is that ARB (0) primitive must be received inbound at terminal 2 at the active hub port indicating that the source node has received the CLS command. The reader will recall that the active hub port started substituting ARB (0) primitives on the outbound segment 263 in FIG. 18 when the source node A3 first generated an OPN command. The ARB (0) primitive will arrive on terminal 2 of the active hub port only after the source node A3 has seen a CLS command. Prior to the time of reception of the CLS command, the source node A3 continually substitutes Its current fill word for all inbound ARB primitives including the ARB (0) arbitration primitive, and its current fill word was set to ARB (F 0) when the source node won the arbitration. Therefore, any incoming arbitration primitive prior to reception of the CLS command is converted to an ARB (F0) primitive and forwarded to the active hub port. However, when the source node receives the CLS command, and it receives an ARB (0) primitive inbound, it simply passes the ARB (0) primitive outbound and back to the active hub port. When that ARB (0) primitive arrives at terminal 2 of the active hub port, the last condition necessary to forward the ARB token to the next downstream hub port has been satisfied. In other words, as soon as the active hub port has concurrent possession of the CLS token, the ARB token and the OPN token (or the RX_OPN_token bit=1 and the Rx_CLS_token bit=1 and has the ARB token) and the active hub port has received the ARB (0) primitive, the active hub port passes the ARB token to the next downstream hub port thereby closing the connection.

Block 238 represents the process of returning to the start label at the beginning of the flow chart illustrated in FIG. 15. This causes the process to start over again at any other hub port coupled to a subloop having a node which has won local arbitration.

Figure 19:
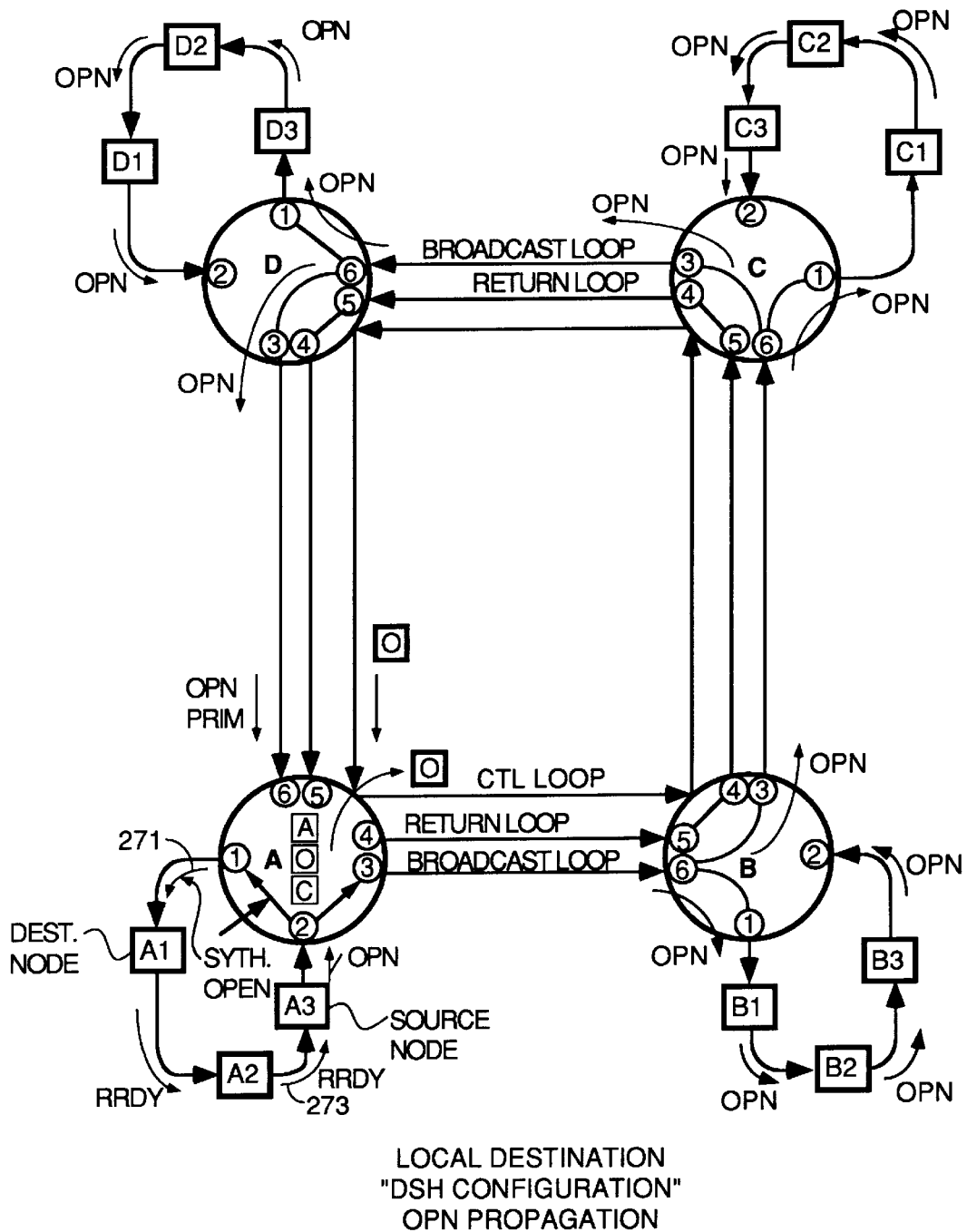
FIG. 19 is a diagram illustrating OPN primitive propagation and switching connections in the active and inactive hub ports according to the accelerated protocol of FIG. 15 for a local destination in a DSH configuration.
Figure 20:
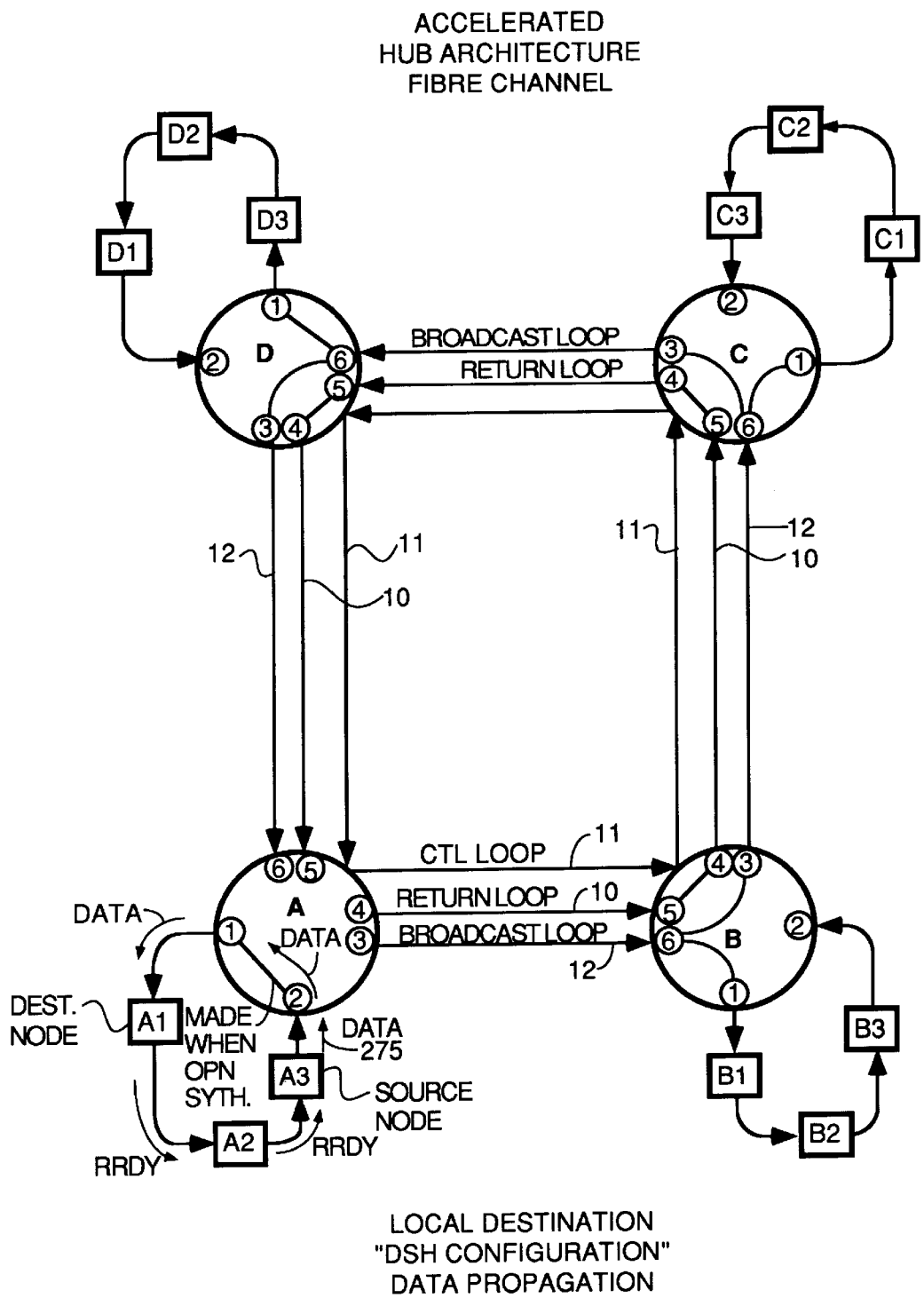
FIG. 20 is a diagram illustrating data frame propagation and switching connections in the active and inactive hub ports according to the accelerated protocol of FIG. 15 for a local destination in a DSH configuration.
Figure 21:
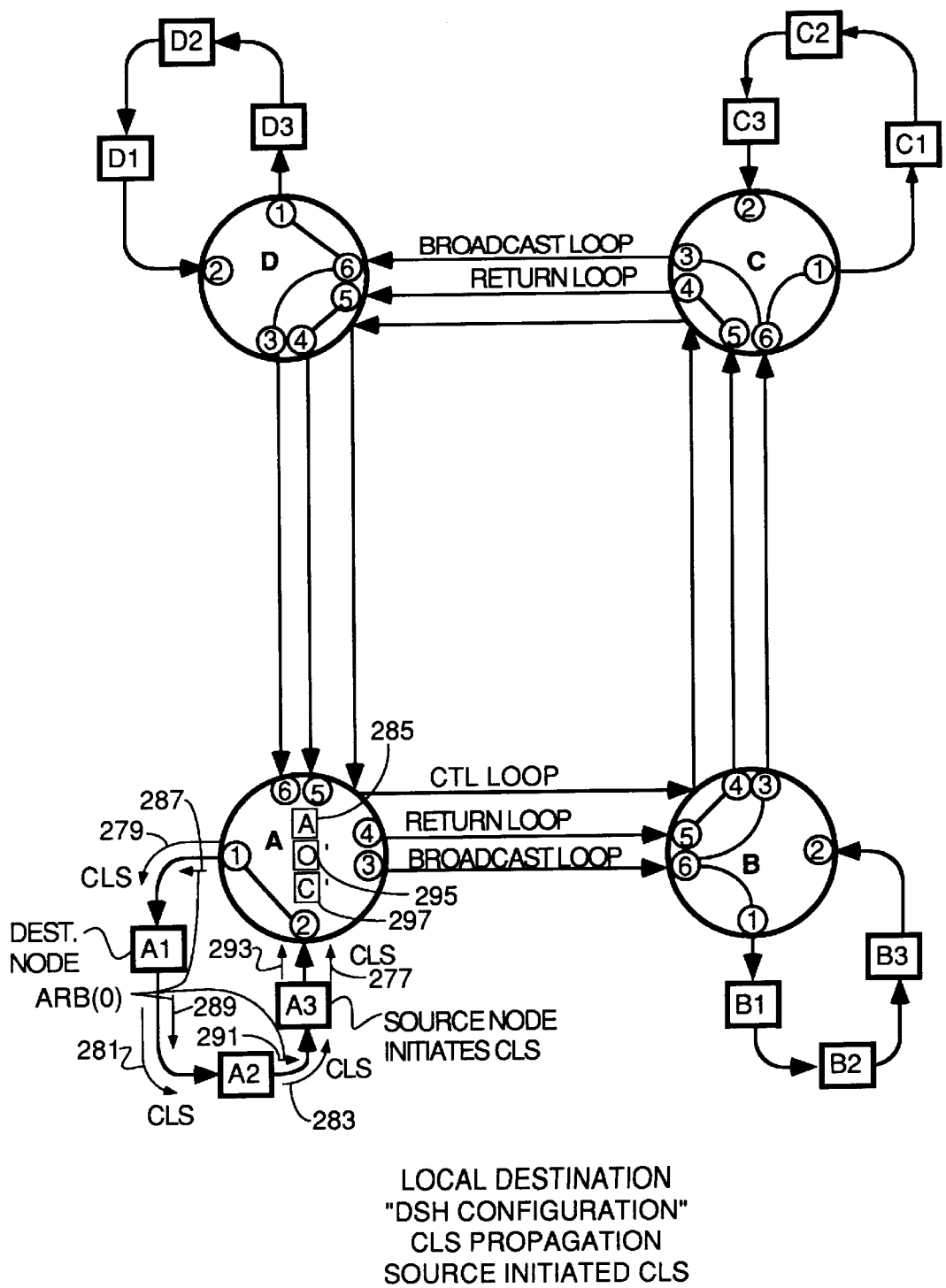
FIG. 21 is a diagram illustrating CLS primitive propagation and switching connections in the active and inactive hub ports according to the accelerated protocol of FIG. 15 for a local destination in a DSH configuration.
Figure 26:
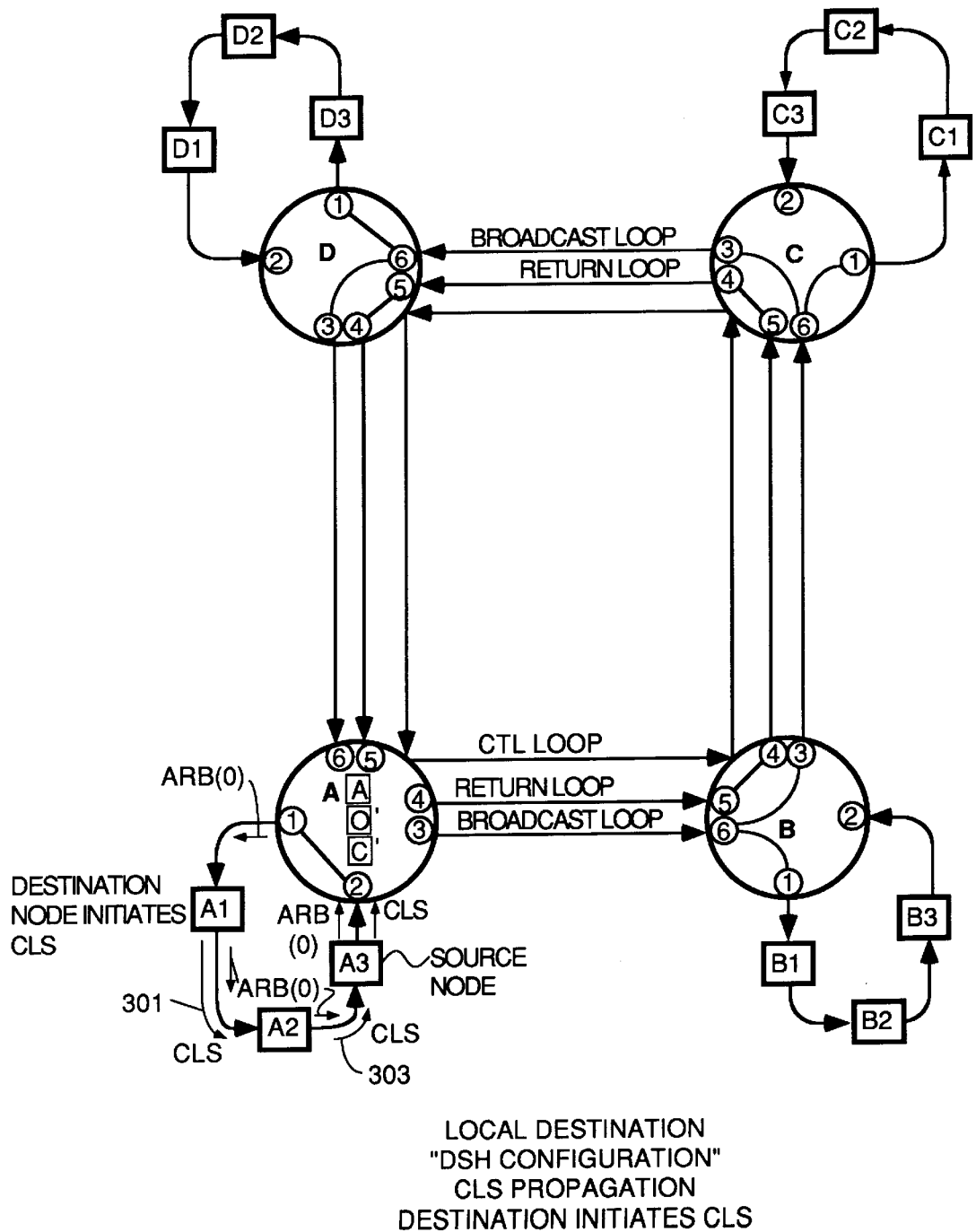
FIG. 26 is a diagram illustrating CLS primitive propagation and switching connections in the active and inactive hub ports according to the accelerated protocol of FIG. 15 for a local destination in a DSH configuration where the destination initiates the CLS.

Returning to the consideration of block 204 in FIG. 15, there is shown the beginning of the process of handling the situation where the destination node is local, i.e., on the same subloop as the source node. In this situation, the hub ports follow rules so as to cut out all the other subloops to eliminate latency time in those subloops such that data is propagated directly from source node to the destination node on the same subloop without having to pass through any node on any other subloop which is neither the source node or the destination node. This process starts with the test of block 204. If the active hub port receives the OPN token on the control loop, it knows that the OPN command has propagated through all of the other subloops and none of the other subloops contain the destination node. The active hub port then concludes that the destination is on its own local subloop and proceeds via path 206 to the process represented by block 240 on FIG. 15. The process of block 240 represents the process of the active hub port making the 2-1 connection and breaking the 5-2 connection. In addition, the process of block 240 also includes sending a copy of the original OPN command which started the process outbound on terminal 1 so that it propagates around the subloop of the active hub port to the destination node. Obviously this requires each hub port to have sufficient memory to be able to store a copy of an OPN command or some encoded or compressed version thereof that can be expanded back into the original OPN command. To understand the switching transactions that occur when the destination node is on the same subloop as the source node, please refer to FIG. 19 and compare it to FIG. 16. FIGS. 19, 20 and 21 detail the switching transactions and primitive propagations which occur when the local destination node is on the same subloop as the source node. In these three figures, a DSH configuration is assumed where the source node is downstream of the destination node on the same subloop and located between the destination node and the hub. In the hypothetical assumed for FIGS. 19 through 21, the destination node is assumed to be node A1 and the source node is assumed to be node A3. FIG. 19 details the propagation of the OPN primitive and the OPN token. FIG. 20 details the data frame propagation for a local destination, DSH configuration. FIG. 21 details the CLS primitive propagation for a local destination, DSH configuration where the source node initiated the close. FIG. 26 illustrates the CLS primitive propagation for a local destination, DSH configuration where the destination node initiates the close.

In FIG. 19, when the source node A3 transmits an OPN primitive to terminal 2 of the active hub port, the active hub port does not know whether the destination node is local or remote. If the destination node is local, an OPN primitive must be sent to the destination node to open it. However, in hypothetical example of FIG. 19, the OPN primitive which is broadcast when the active hub port makes the 2-3 connection returns to the active hub port on terminal 6. Since terminal 6 is not connected to terminal 1, the OPN primitive will never be sent outbound from terminal 1 of the active hub port so that it reaches the destination node A1. This is the reason a copy of the OPN command is saved. Note also, the difference between FIG. 19 and FIG. 16 where the 5-1 connection at the active hub port does not exist in FIG. 19 whereas it did exist in FIG. 16. This difference arises from the fact that the destination is remote in FIG. 16 and is local in FIG. 19. Because the destination is remote in FIG. 16 terminal 2 of the destination hub port D receives a RRDY command when the OPN primitive reaches destination node D3. This causes the destination hub port to make the 2-4 connection thereby sending a RRDY command to terminal 5 of the active hub port A. In FIG. 19 this does not occur. Instead, when the OPN primitive reaches terminal 6 of the hub port D, it propagates all the way around the D subloop and arrives at terminal 2. This causes hub port D to forward the OPN token to the active hub port A on the control loop but no OPN primitive is forwarded by hub port D from terminal 2 to terminal 4 thereof. Therefore no OPN primitive arrives at terminal 5 of the active hub port A and, even if it did, there is no 5-1 connection to send it to the destination node. Accordingly, it is a rule for all hub ports which have the ARB token that when they received an OPN primitive on terminal 2, they must save a copy of the OPN primitive in memory at the same time they broadcast the OPN command by making the 2-3 connection. Simultaneously, the active hub port holding the ARB token, forwards the OPN token on the control loop to the next downstream hub port except in the case where the OPN token arrived at the active hub port on the control loop meaning that the OPN token had previlously been initiated. When the OPN token arrives again at the active hub port on the control loop, the active hub port must break the 5-1 connection and make the 2-1 connection as symbolized by block 240. After making the 2-1 connection, the copy of the OPN primitive referred to as the synthesized open in FIG. 19, is transmitted outbound on terminal 1, as represented by arrow 271 in FIG. 19. This causes the destination node A1 to transmit a RRDY command which propagates through node A2 and reaches source node A3. The process of the destination node receiving the OPN primitive and transmitting a RRDY primitive to the source node is symbolized by block 242 in FIG. 15.

When the source node A3 receives the RRDY primitive, symbolized by arrow 273 in FIG. 19, it immediately transmits a frame of data, symbolized by arrow 275 in FIG. 20. The data frame propagates from terminal 2 to terminal 1 and then outbound on the local subloop to the destination node A1. At this point, the destination node can issues a CLS primitive or another RRDY primitive, but it is assumed that the destination node transmits another RRDY primitive which propagates to the source node. The source node then transmits another data frame, and this process continues until all the data is transferred, or the source node or destination node transmits a CLS command. This process of the source node receiving the RRDY primitive and transmitting a data frame and the data frame propagating along the 2-1 connection outbound to the local destination node and the RRDY data handshake process continuing until all data is transferred or the CLS primitive is issued by either the source or destination is symbolized by blocks 244 and 246 in FIG. 15.

FIG. 21 illustrates for a local destination, DSH configuration how the CLS primitive propagates and how the connection from the source node to the destination node is shut down. FIG. 21 assumes that the source node A3 has initiated the CLS primitive, as symbolized by arrow 277. This primitive propagates along the 2-1 connection and then outbound to destination node A1, as symbolized by arrow 279. The destination node A1 forwards the CLS primitive, as symbolized by arrow 281 as does node A2, as symbolized by arrow 283. When the source node A3 sees the CLS primitive returned to it, it stops substituting its current fill word ARB (F 0) for all incoming ARB primitives. At all times while the active hub port A has the ARB token, 285, it continually substitutes ARB (0) primitives for incoming fill words between frames, as symbolized by arrow 287. This ARB (0) primitive gets forwarded by nodes A1 and A2, as symbolized by arrows 289 and 291, to the source node A3. When the ARB (0) primitive reaches A3, after the CLS primitive has reached A3, the ARB (0) primitive is passed through to terminal 2 of the active hub port, as symbolized by arrow 293. This causes the active hub port to simultaneously forward the ARB token 285, the OPN token 295, and the CLS token 297, assuming that the active hub port is concurrently in possession of the ARB, OPN and CLS tokens or has the ARB token and the Rx_OPN_token bit=1 and the Rx_CLS_token bit=1 concurrently when the ARB (0) primitive arrives. If all these conditions are satisfied, the three tokens are forwarded via the control loop to the next downstream hub port as symbolized by blocks 248 and 250 in FIG. 15.

FIG. 26 illustrates, for a local destination, DSH configuration how the CLS primitive propagates when initiated by the destination node A1. Transmission of the CLS primitive from node A1 is symbolized by arrow 301. This primitive is forwarded by node A2 to node A3, as symbolized by arrow 303. When the source node A3 receives the CLS primitive, it stops substituting its current fill word for the ARB (0) primitives circulating in the subloop. After the CLS primitive arrives at source node A3, the next ARB (0) primitive that arrives at node A3 will be passed through to terminal 2. If the active hub port is then in possession of the ARB, OPN, and the CLS tokens (or the the Rx_OPN_token bit=1 and the Rx_CLS_token bit=1 concurrently), when the ARB (0) primitive arrives at terminal 2, the active hub port A will simultaneously forward all three tokens to the next hub port. Thus, this process is entirely similar to the situation where the destination is local and the CLS primitive is initiated by the source node. The process of closing down the connection where the destination is local in either the DSH or the SDH configuration, is symbolized by blocks 248 and 250 in FIG. 15. Specifically, block 248 symbolizes propagating the CLS primitive from either the destination node or the source node or both simultaneously to the source node and causing the source node to stop substituting its current fill word for the ARB (0) primitive output by the active hub port. Block 250 represents the process of the active hub port seeing the ARB (0) primitive arrive at terminal 2 and forwarding the three tokens if all three tokens are presently in the possession of the active hub port (or the Rx_OPN_token bit=1 and the Rx_CLS_token bit=1 concurrently.

Figure 22:
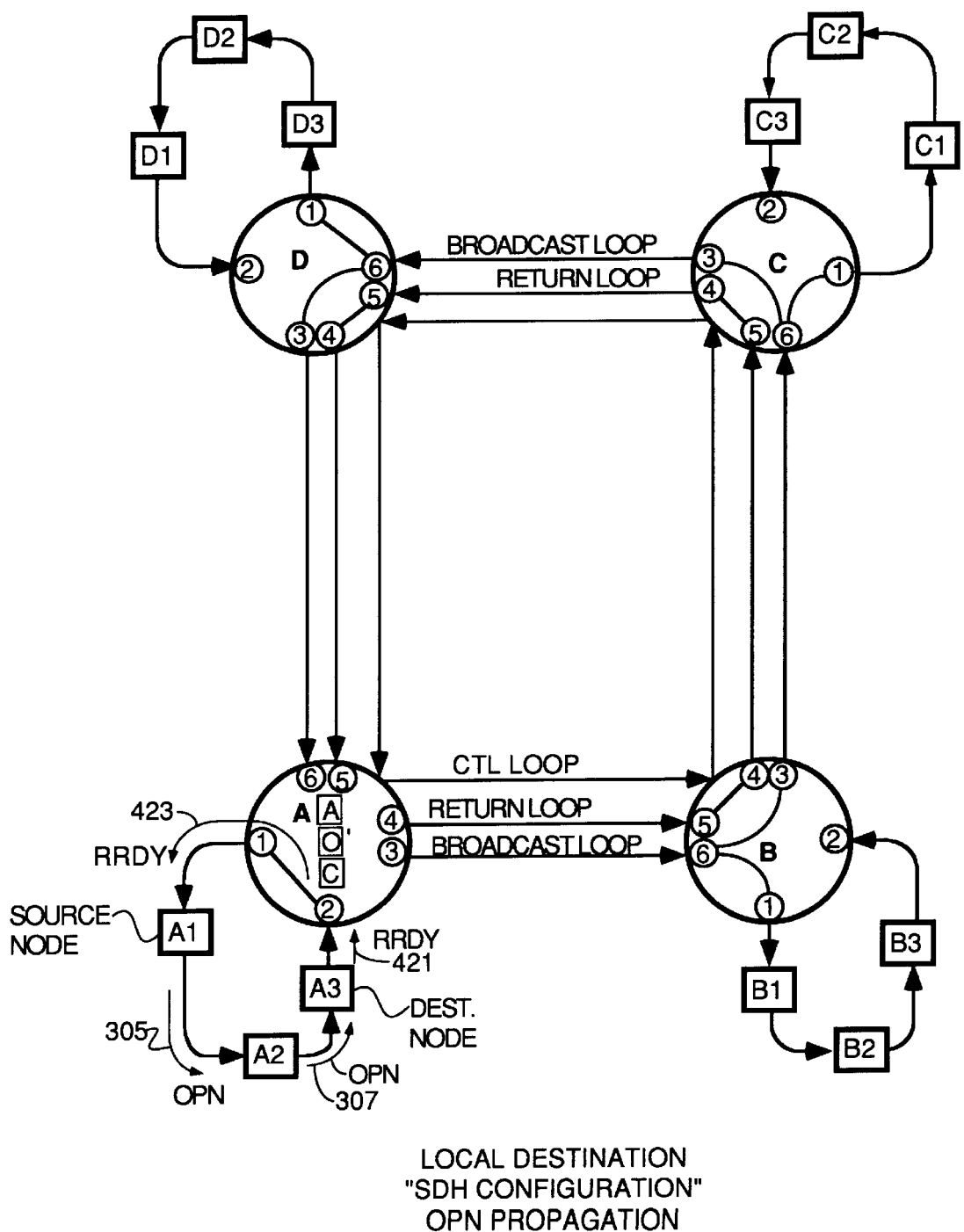
FIG. 22 is a diagram illustrating OPN primitive propagation and switching connections in the active and inactive hub ports according to the accelerated protocol of FIG. 15 for a local destination in an SDH configuration.
Figure 23:
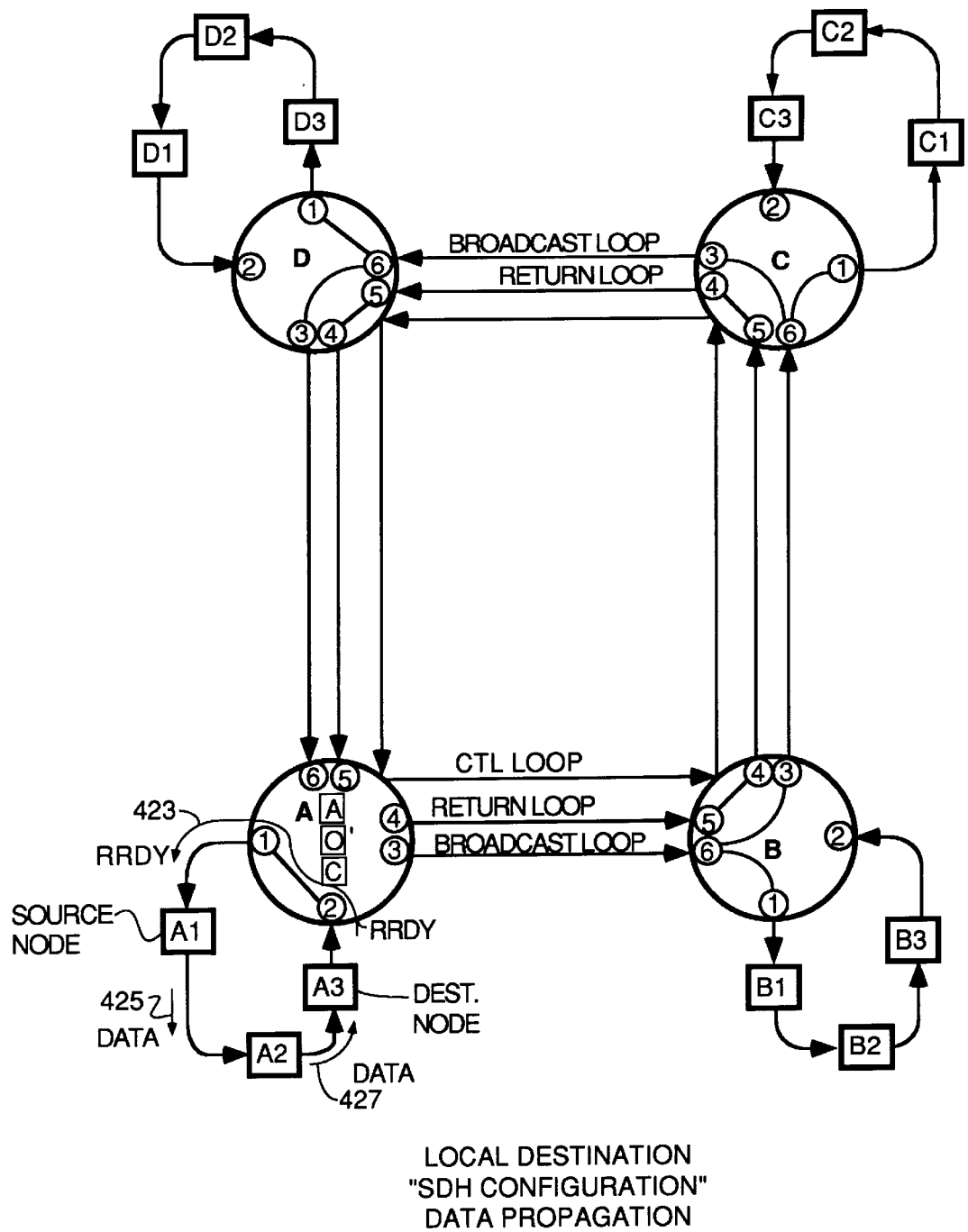
FIG. 23 is a diagram illustrating data frame propagation and switching connections in the active and inactive hub ports according to the accelerated protocol of FIG. 15 for a local destination in an SDH configuration.

FIG. 22 is a diagram showing OPN primitive propagation where the destination node is local and a SDH configuration exists where the destination node is between the source node and the active hub port and downstream of the source node. In this situation, it is assumed that the source node is A1, and the destination node is A3. The OPN primitive initiated by the source node, represented by arrow 305 is passed through node A2 to destination node A3, as symbolized by arrow 307. In response to receiving the OPN primitive, the destination node issues a RRDY primitive which arrives at terminal 2 of the active hub port. Note that in this situation, the active hub port never sees the OPN primitive so an OPN primitive never gets broadcast by making the 2-3 connection. As such, the processing of FIG. 15 is not applicable to this particular situation since the active hub port never sees the OPN primitive at terminal 2 and this is the basis for the start of the process depicted by the flow chart of FIG. 15. Accordingly, processing for this particular situation is represented by the flow chart of FIG. 29. Block 252 represents the process of the active hub port seeing the RRDY command on terminal 2 and concluding the destination is local. In this case, there is no need to propagate the OPN token, so the active hub port sets a Rx_OPN_token bit=1 and makes a 2-1 connection to forward the RRDY command to the source node locally. The propagation of the RRDY command is represented by arrows 421 and 423 in FIG. 22.

The source node responds by transmitting a data frame which propagates around the subloop to the destination node A3. This RRDY/data frame handshake protocol continues until all the data is sent from the source to the destination or either the source node or the destination node issues a CLS primitive. This process is represented by block 254 in FIG. 29 and FIG. 23 which shows data propagation for a local destination in the SDH configuration. Data propagation between the source node and destination node is represented by arrows 425 and 427.

Figure 27:
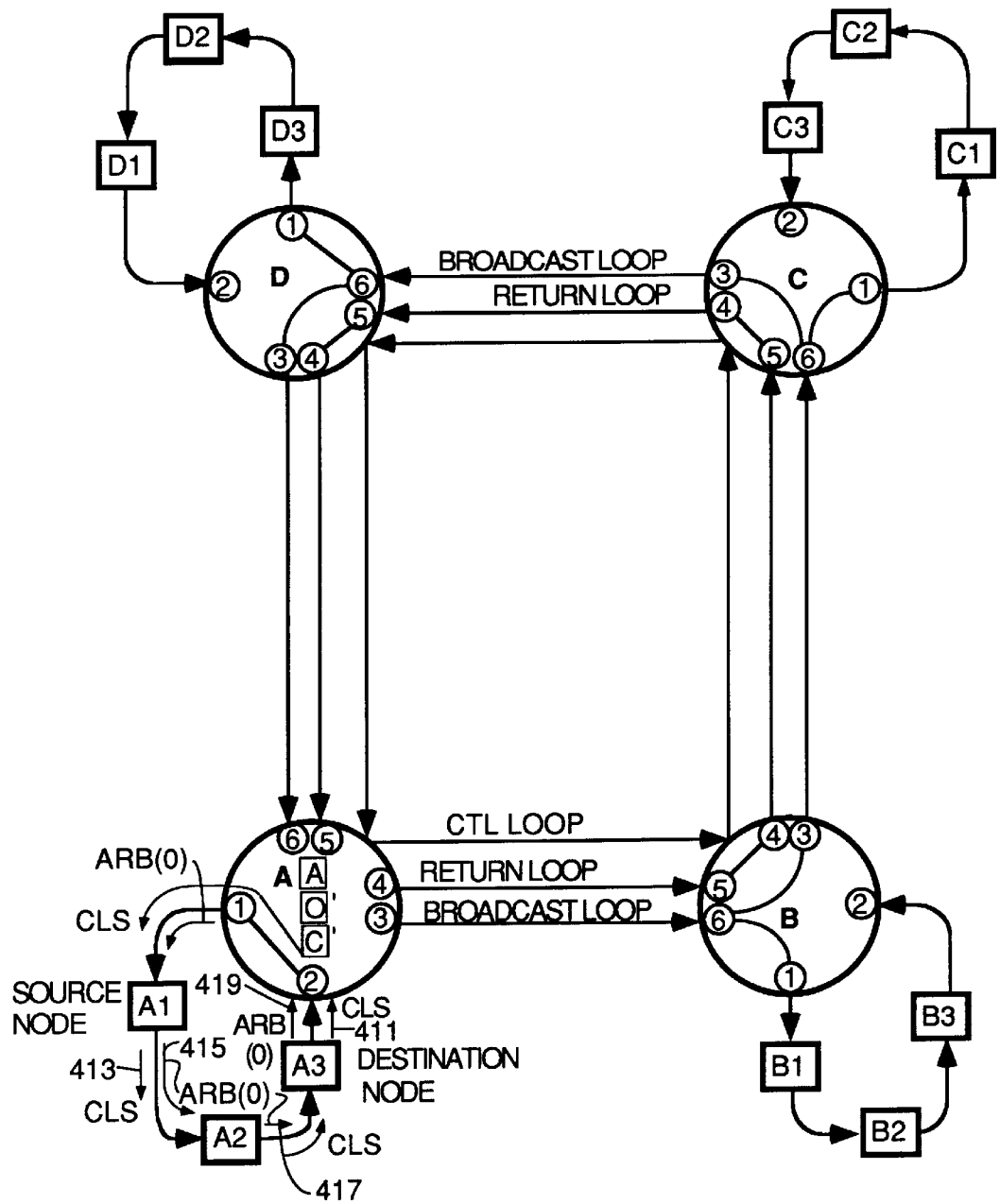
FIG. 27 is a diagram illustrating CLS primitive propagation and switching connections in the active and inactive hub ports according to the accelerated protocol of FIG. 15 for a local destination in an SDH or a DSH configuration where the destination and source simultaneously initiate the CLS.

FIG. 27 illustrates the propagation of the CLS primitive where the destination is local and either a SDH or a DSH configuration exists where both the source node and the destination node simultaneously issue CLS primitives. Basically the CLS primitive issued by the destination node, symbolized by arrow 411, propagates across the 2-1 connection of hub port A and arrives at the source node A1.

Simultaneously, the CLS primitive issued by source node A1, symbolized by arrow 413, propagates through node A2 to the destination node A3. When the CLS primtive transmitted from the destination node A3 arrives at the source node, the source node A1 stops substituting its current fill word for the ARB (0) primitives being output by the active hub port at terminal 1. This causes ARB primitives to propagate through nodes A2 and A3 as symbolized by arrows 415, 417 and 419.

When the ARB (0) primitive arrives at terminal 2 of active hub port A, it forwards all three tokens, assuming that all three tokens are currently in possession of hub port A (or the active hub port has the ARB token and the Rx_OPN_token bit=1 and the Rx_CLS_token bit=1 concurrently). This process is also symbolized by blocks 248 and 250 in FIG. 15. The rules for setting the Rx_OPN_token bit and the Rx_CLS_token bit are given above in the active hub port rules for the three token embodiment. Those rules are:

(1) If the CLS token has been initiated by the active hub port and has and has returned on the control loop or (2) if a local destination, SDH configuration exists and either the source node or destination node, or both simultaneously have transmitted a CLS command.

Figure 24:
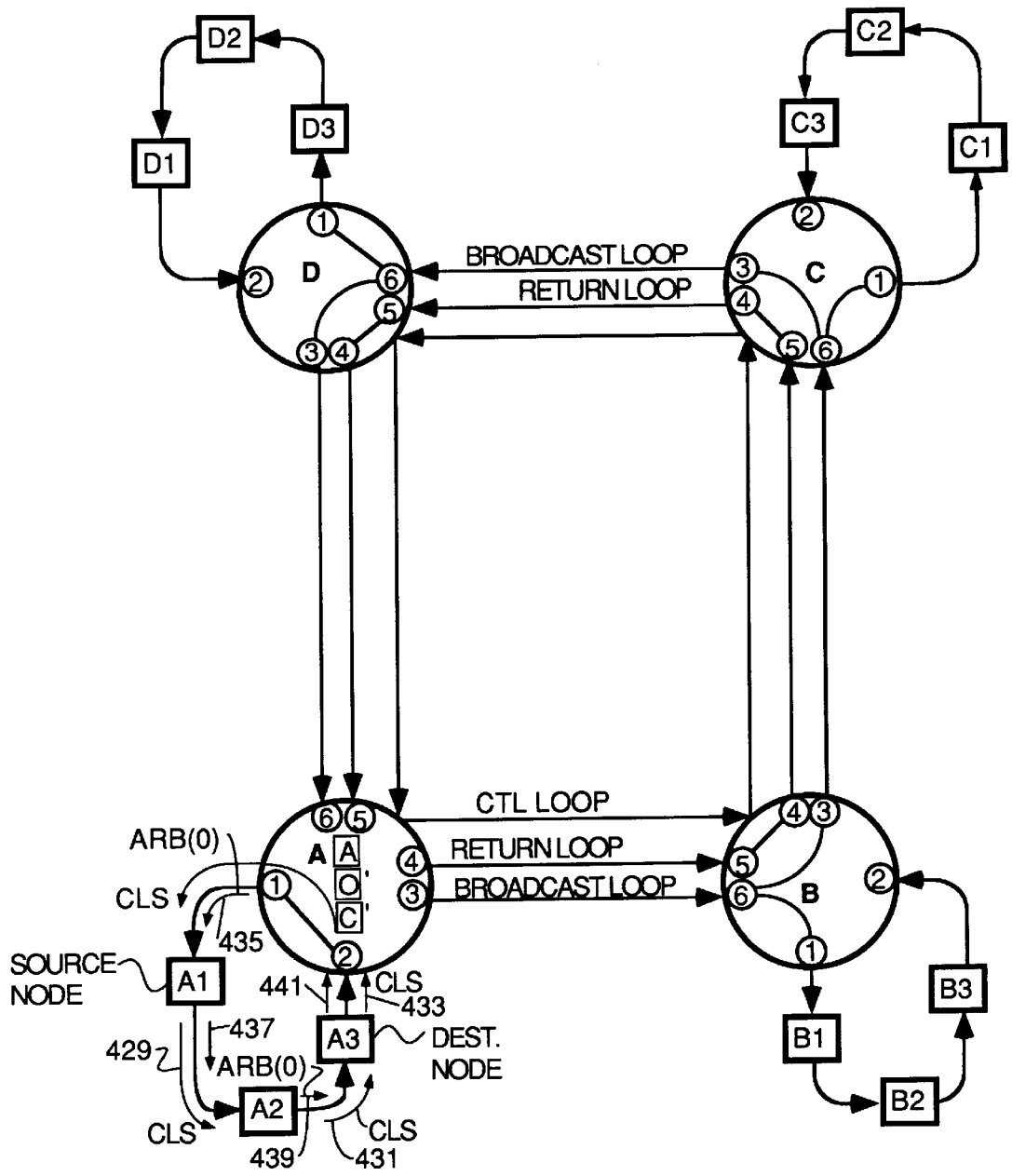
FIG. 24 is a diagram illustrating CLS primitive propagation and switching connections in the active and inactive hub ports according to the accelerated protocol of FIG. 15 for a local destination in an SDH configuration where the source initiates the CLS.
Figure 25:
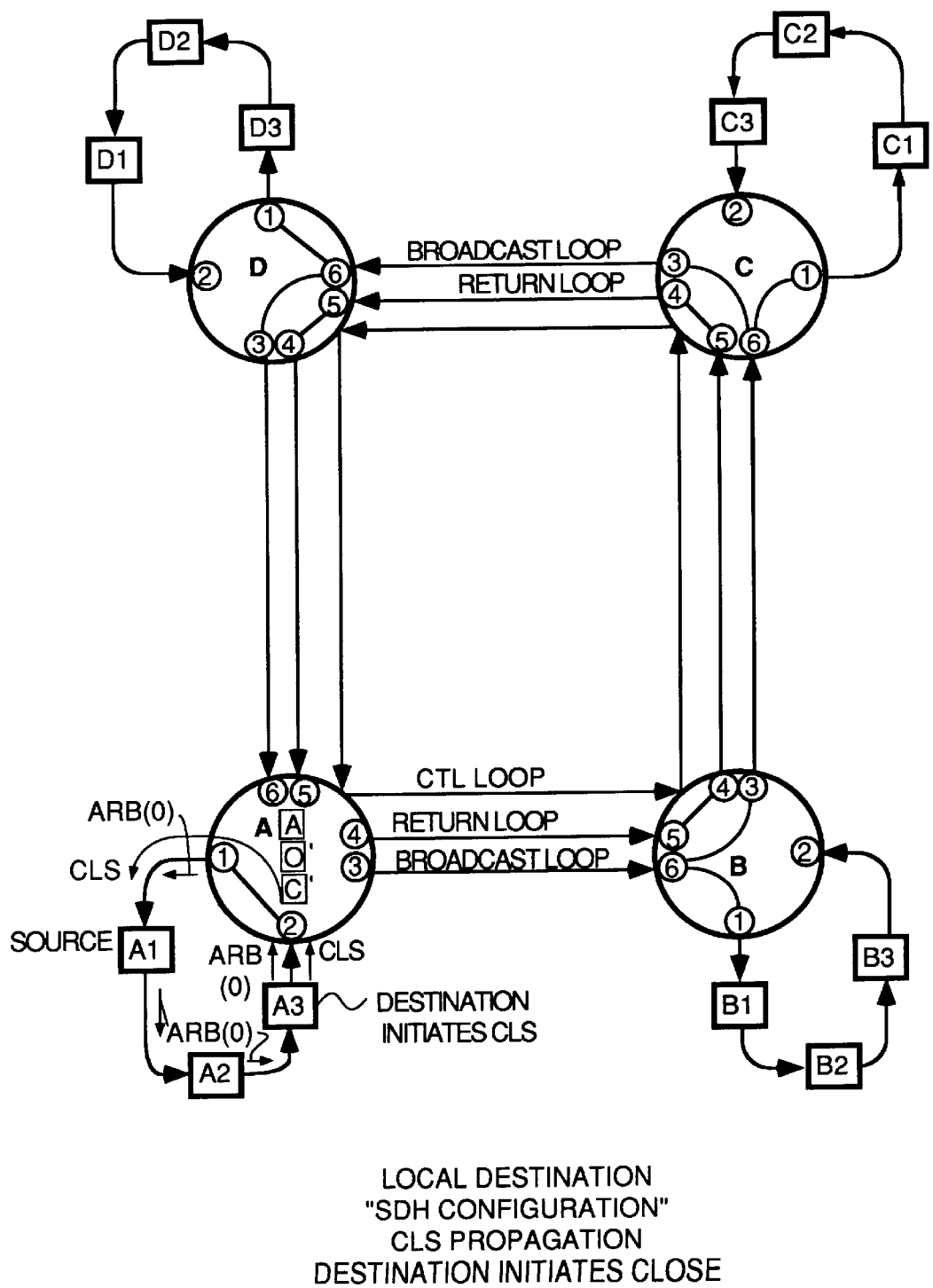
FIG. 25 is a diagram illustrating CLS primitive propagation and switching connections in the active and inactive hub ports according to the accelerated protocol of FIG. 15 for a local destination in an SDH configuration where the destination initiates the CLS.

FIG. 24 is a diagram showing the propagation of the CLS primitive in a local destination situation with a SDH configuration. FIG. 24 assumes that the source node initiates the close, as symbolized by arrow 429. This CLS primitive propagates through node A2 to node A3. The destination node A3 passes the CLS primitive through, as symbolized by arrows 431 and 433. The CLS primitive then passes from terminal 2 to terminal 1 and returns to the source node A1. The source node A1, in response, stops substituting its current fill word for the ARB (0) primitives which are constantly being output by the active hub port A (which started when the active hub port first detected an OPN, RRDY or CLS on terminal 2). This process is symbolized by arrows 435 and 437. The ARB (0) primitives then passes through nodes A2 and A3, as symbolized by arrows 439 and 441, and returns to the active hub port A terminal 2. The active hub port then forwards all three tokens to the next hub port if it has all three tokens in its possession (or has the ARB token and Rx_OPN_token bit=1 and Rx_CLS_token bit=1 concurrently) at the time that the ARB (0) primitive reaches terminal 2.

Figure 29:
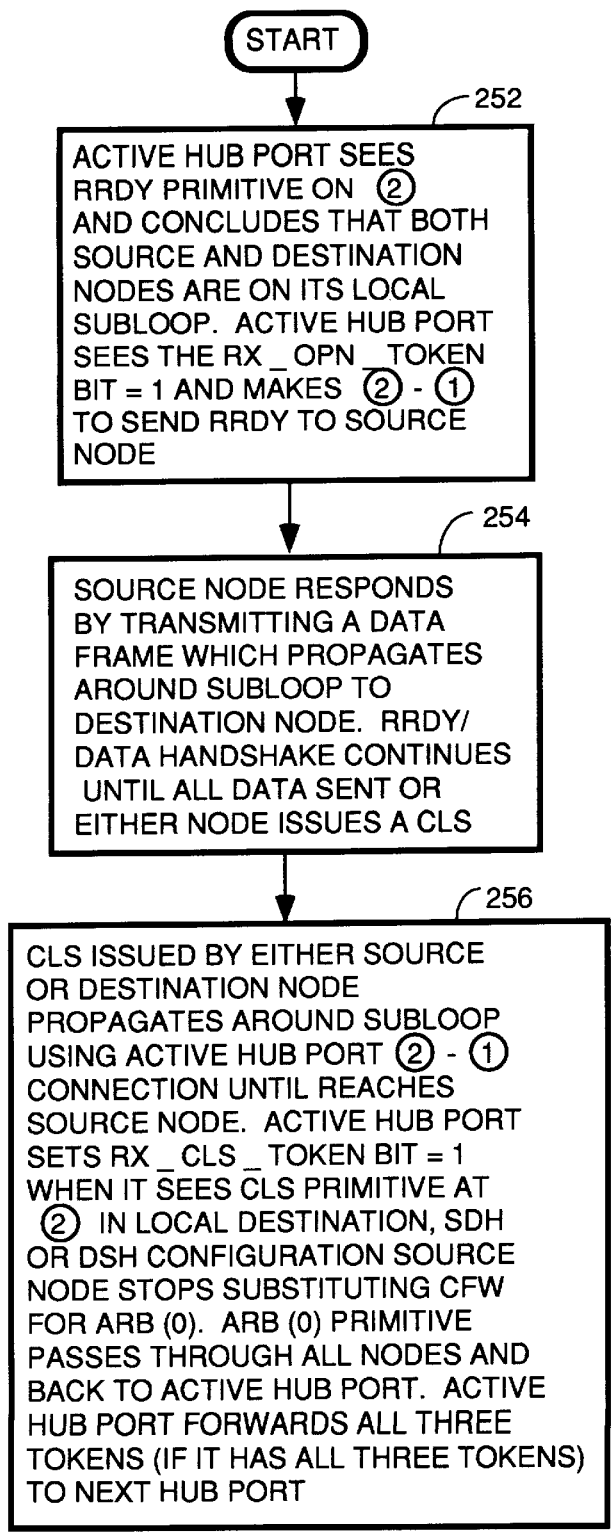
FIG. 29 is a flow chart illustrating the flow of process steps according to the three token embodiment of the invention where the destination is local.

This process of CLS primitive propagation and forwarding of the ARB (0) primitive back to the active hub port and forwarding of the three tokens as a result is represented by block 256 in FIG. 29. The active hub port also sets the Rx_CLS_token bit=1 when it sees the CLS primitive at terminal 2.

The situation where the destination is local and in a SDH or DSH configuration where CLS primitives are simultaneously issued by both the source node and the destination node is basically the same as the process represented by block 256 in FIG. 29. Specifically, when the CLS primitive is received by the active hub port A from the destination node A3, the destination node sets the Rx_CLS_token bit=1 and forwards the CLS primitive from terminal 2 to terminal 1. The propagation of the CLS primitive in this situation is exactly as shown in FIG. 27. When the CLS primitive issued by the destination node reaches the source node A1, the source node A1 stops substituting its current fill word for the ARB (0) primitives being continuously substituted by the active hub port A and passes the ARB (0) primitive to the next node and the active hub port, as symbolized by arrows 415, 417 and 419. When the ARB (0) primitive 419 reaches terminal 2 of the active hub port, the active hub port determines if it is then possession of the ARB, OPN and CLS tokens or the Rx_OPN_token bit=1 and the Rx_CLS_token bit=1 concurrently. If these conditions exist, then the active hub port forwards all three tokens to the next hub port.

Figure 28:
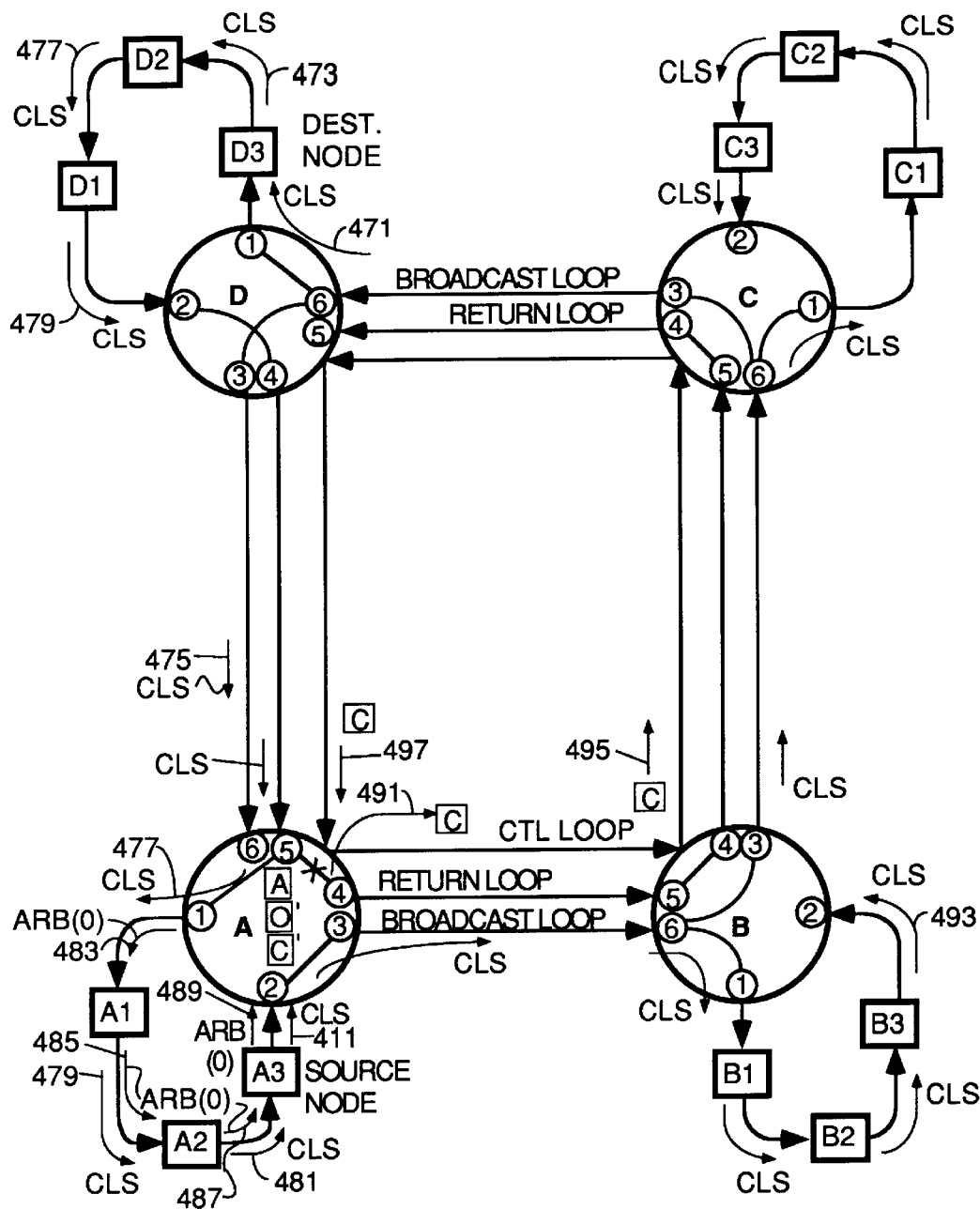
FIG. 28 is a diagram illustrating CLS primitive propagation and switching connections in the active and inactive hub ports according to the accelerated protocol of FIG. 15 for a remote destination where the source and destination simultaneously initiate the CLS.

The situation where the destination is remote and there is simultaneous transmission of CLS primitives by both the source node and the destination node is shown in FIG. 28. In this case, the CLS primitive issued from source node A3 reaches terminal 2 and is broadcast by virtue of the 2-3 connection, and the active hub port initiates the CLS token and sets its CFW to ARB (0) and starts substituting it's CFW for all incoming fill words. The active hub port set connections 2-3 and 5-1 and blocked the 5-4 connection when it first saw the OPN primitive arrive on terminal 2 earlier in the transaction. The other hub ports B and C have the 5-4 and 6-3, 6-1 connections already made. This causes the CLS primitive to propagate around the B and C subloops and simultaneously to traverse the entire broadcast loop until they reach terminal 6 of the destination hub port D. When the CLS primitive issued by the source node, represented by arrow 471 reaches the destination node D3, the destination node forwards it believing that it is the CLS primitive that the destination node initially issued. The CLS primitive that the destination node initially issued is represented by arrow 473. Because the destination hub port D has the 6-1 and 6-3 connections made and the 2-4 connection made, the original CLS primitive broadcast by the active hub port A returns to active hub port A on the broadcast loop, as symbolized by arrow 475. There it is discarded. However, the CLS primitive 473 issued by the destination node reaches terminal 2 of the destination node, as symbolized by arrows 477 and 479, and propagates along the 2-4 connection to terminal 5 of the active hub port A. There it is transmitted along the 5-1 connection outbound on the A subloop and propagates around the A subloop to the source node A3, as symbolized by arrows 477, 479 and 481.

The CLS token is handled in this situation as follows. When the CLS primitive arrived on terminal 2, as previously mentioned the active hub port A initiated the CLS token on the control loop, as symbolized by arrow 491. The CLS token is trapped by each hub port until the CLS primitive received on the broadcast loop and sent around the subloop by virtue of the 6-1 connection in each inactive hub port propagates all the way around its subloop and returns to terminal 2. Therefore, when the CLS primitive that was broadcast returns to terminal 2 for hub port B, as symbolized by arrow 493, the CLS token is forwarded from hub port B to hub port C, as symbolized by arrow 495. The same thing happens at hub port C and D. When the CLS primitive 479 transmitted by the destination node D3 reaches terminal 2 of hub port D, the CLS token is not likely to have reached destination hub port D yet. However, when the CLS primitive 471 on the broadcast loop reaches active hub port D, it too is forwarded around the D subloop and reaches terminal 2. However, at the time that the CLS primitive 479 initiated by the destination node D3 reaches terminal 2, the active hub port D set a CLS history bit indicating that it had recevied a CLS primitive on terminal 2. Thus, when the CLS token reaches the active hub port D on the control loop, active hub port D checks the CLS history bit and sees that it is set and immediately forwards the "CLS token" on the control loop on the active hub port A, as symbolized by arrow 497. Thus, when the ARB (0) primitive reaches terminal 2 of the active hub port A, if the CLS token has arrived from the destination port D, then all three tokens will be forwarded. However, if the CLS token has not yet arrived from the destination hub port D, then the next ARB (0) primitive which reaches terminal 2 after the CLS token has arrived on the control loop at active hub port A, will cause all three tokens to be forwarded. Note that this requires that the active hub port continually substitute ARB (0) primitives in the fill word between frames that are being circulated on the subloop A even after the first ARB (0) primitive is received at terminal 2.

The Fibre Channel Arbitrated Loop protocol standard allows full duplex loop tenancies to occur. In this situation, the source node wants to not only send data but also to receive data. Thus, a situation can arise when the source node issues an OPN primitive and immediately follows up with one or more RRDY primitives. To handle this situation, several additional rules must be implemented in the active port and inactive port state machines which are not illustrated in FIGS. 15–29 but are given in the Switching and Token Handling Rules given above for the three token embodiment and which are also illustrated in the state diagrams given in FIG. 30 et seq. When a source node wishes to initiate a full duplex connection, the OPN primitive takes the form OPN(AL_PD, AL_PS) as opposed to the form OPN(AL_PD, AL_PD) taken when only half duplex is desired. After opening full duplex, the source node follows with one or more RRDY primitives immediately following the OPN. The OPN recipient or destination node returns one or more data frames to the source node in response to the receipt of the RRDY primitive(s), the number of data frames equaling the number of RRDY primitive received, each data frame starting with a SOF start of frame delimiter. In Fibre Channel Arbitrated Loop networks, SOF delimiters are characterized by K28.5-D21.5 in the first two characters of the ordered set immediately preceding a data frame. Data may be transmitted simultaneously by both the source node and destination node in full duplex operation. The following two rules for inactive and active hub ports, respectively, are implemented in the state machines to handle full duplex operation.

Inactive Hub Port Full Duplex State Transition Rule

If an inactive hub port detects an OPN primitive on terminal 6 followed by an SOF delimiter on terminal 2, then the source node has opened full duplex, and the destination node is coupled to the subloop to which the inactive hub port is coupled. In this case, the inactive hub port must treat the start of frame delimiter as if it were an RRDY primitive and open the 5-4 connection, make the 2-4 connection and set the OPN history bit=1.

Active Hub Port Full Duplex State Transition Rule

If an active hub port detects an OPN primitive on terminal 2 followed by an RRDY on terminal 2, it must increment counter for every RRDY detected. This prepares the active hub port for the possibility that the destination node may be on the active hub port's local loop and the broadcast of the RRDY primitives via the 2-3 connection onto the broadcast loop will result in a loss of the RRDY primitives. If the OPN token is subsequently received on the control loop before an RRDY primitive or a CLS primitive is detected on the return loop, then the active hub port knows that the destination is local. When the fact that the destination node is local is confirmed, the active hub port carries out the following rules: first the stored copy of the OPN primitive (every active hub port stores a copy of every OPN primitive that arrives on terminal 2) is transmitted out on terminal 1 in place of an idle or ARB fill word; and, second, a number of RRDY primitives equal to the value of the RRDY counter must be transmitted out on terminal 1 in place of idle or ARB primitives. In this way, the local destination node will receive as many RRDY primitives from the source node as it would have had it not been on the local subloop coupled to the active hub port.

Figure 30:
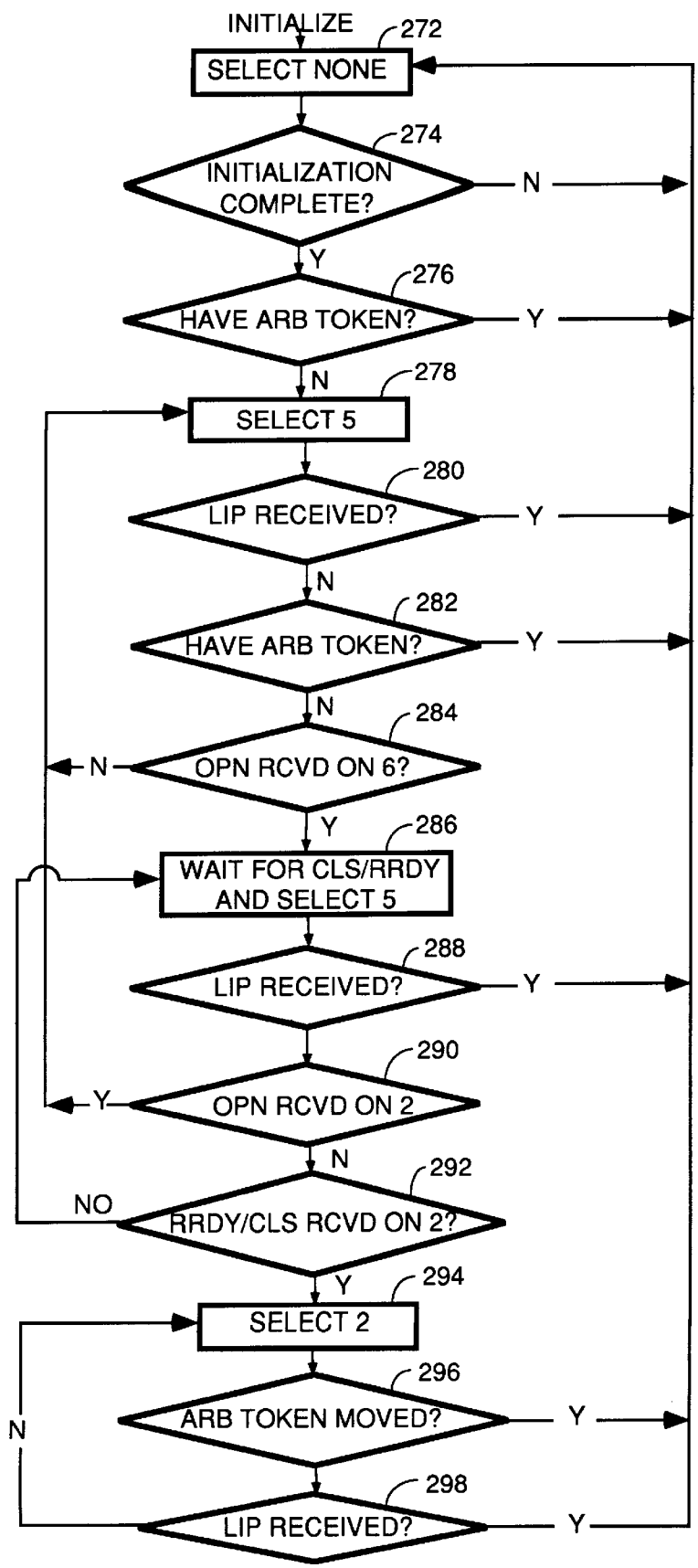
FIG. 30 shows a state diagram in the form of a flow chart illustrating the concurrent processes being carried out in all state machines to control switching of terminal 4.

State Diagrams Showing Concurrency of Operations in Hub Port State Machines Referring to FIG. 30, there is shown a state diagram expressed in terms of a flow chart for a state machine which controls switching of terminal 4 between first, second, third and fourth states. This state machine initializes to a first state represented by block 272 wherein terminal 4 is not coupled to any other terminal. Test 274 determines if initialization is complete, and goes back to 272 if it is not. When initialization is complete, test 276 determines if the ARB token is in possession of this hub port. If so, state 272 is maintained. If not, the second state, represented by block 278 is entered wherein the state machine connects terminal 4 to terminal 5. Then, test 280 determines If an initialization primitive (LIP) has been received. If so, state 272 is entered again. If not, test 282 determines if this hub port has the arb token. If so, state 272 is entered again. If not, test 284 determines if an OPN has been received on terminal 6. If not, state 278 is maintained. If so, state 286 is entered to either maintain the connection between terminal 4 and terminal 5 or make that connection if not already made, and, further, to wait for a CLS or RRDY to arrive on terminal 2. Next, test 288 determines if a LIP primitive has been received. If so, state 272 is reentered. If not, test 290 determines if an OPN has been received on 2. If so, state 278 is reentered. If not, test 292 determines if an RRDY or CLS has been received on terminal 2. If not, state 286 is reentered. If so, state 294 is entered where the state machine makes a connection between terminal 4 and terminal 2. Next, test 296 determines if the ARB token has moved. If so, state 272 is reentered. If not, test 298 determines if an initialization LIP has been received. If so, state 272 is reentered. If not, state 294 is maintained.

Figure 31:
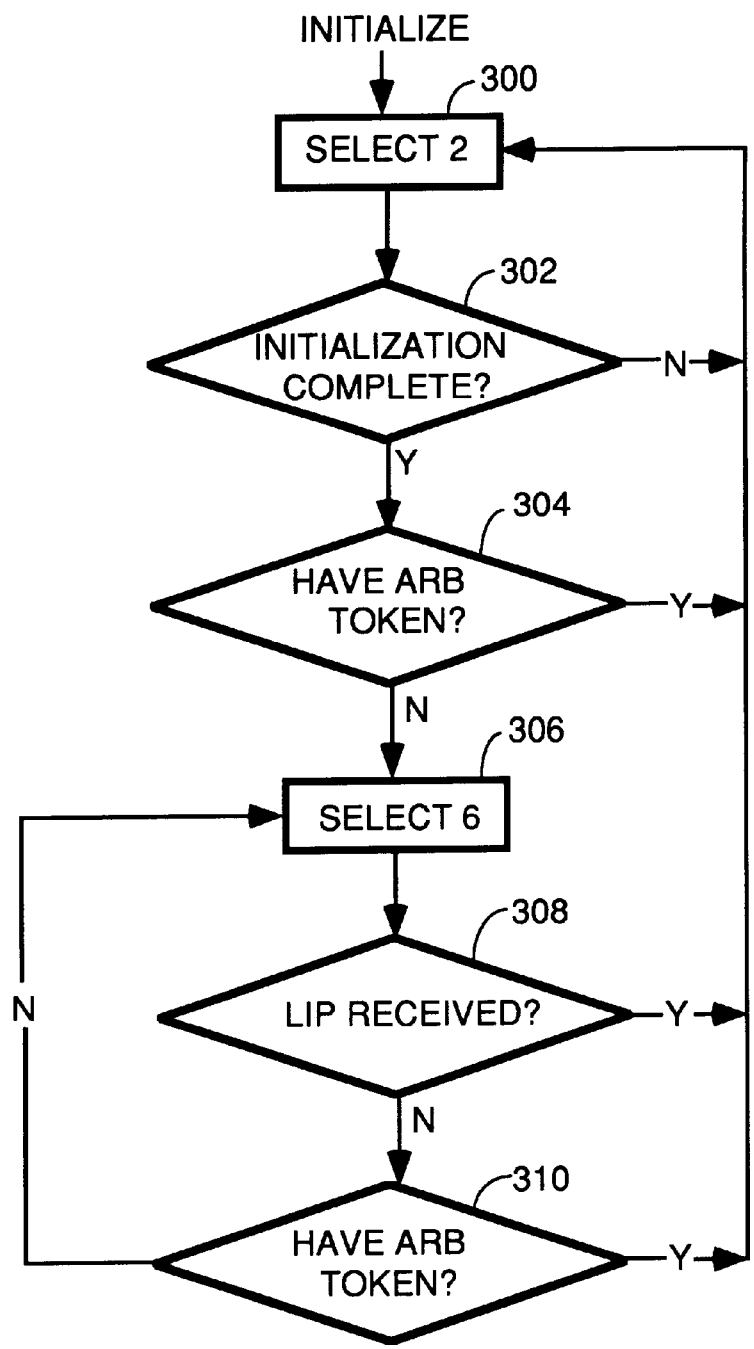
FIG. 31 shows a state diagram in the form of a flow chart illustrating the concurrent processes being carried out in all state machines to control switching of terminal 3.

Referring to FIG. 31, there is shown a state diagram for the state machine states and transitions to control terminal 3. These states and transitions happen concurrently with the other states and transitions described in the other state diagrams. The state machine process to control terminal 3 initializes to a state 300 to make a 2-3 connection. Next, test 302 determines if initialization is complete. If not, state 300 is maintained. If so, test 304 determines if the ARB token is in possession of this hub port. If so, state 300 is maintained. If not, state 306 is entered to make a 6-3 connection. Next, test 308 determines if a LIP has been received. If so, state 300 is reentered. If not, test 310 determines if this hub port has the ARB token. If not, state 306 is reentered. If so, state 300 is reentered.

Figure 32:
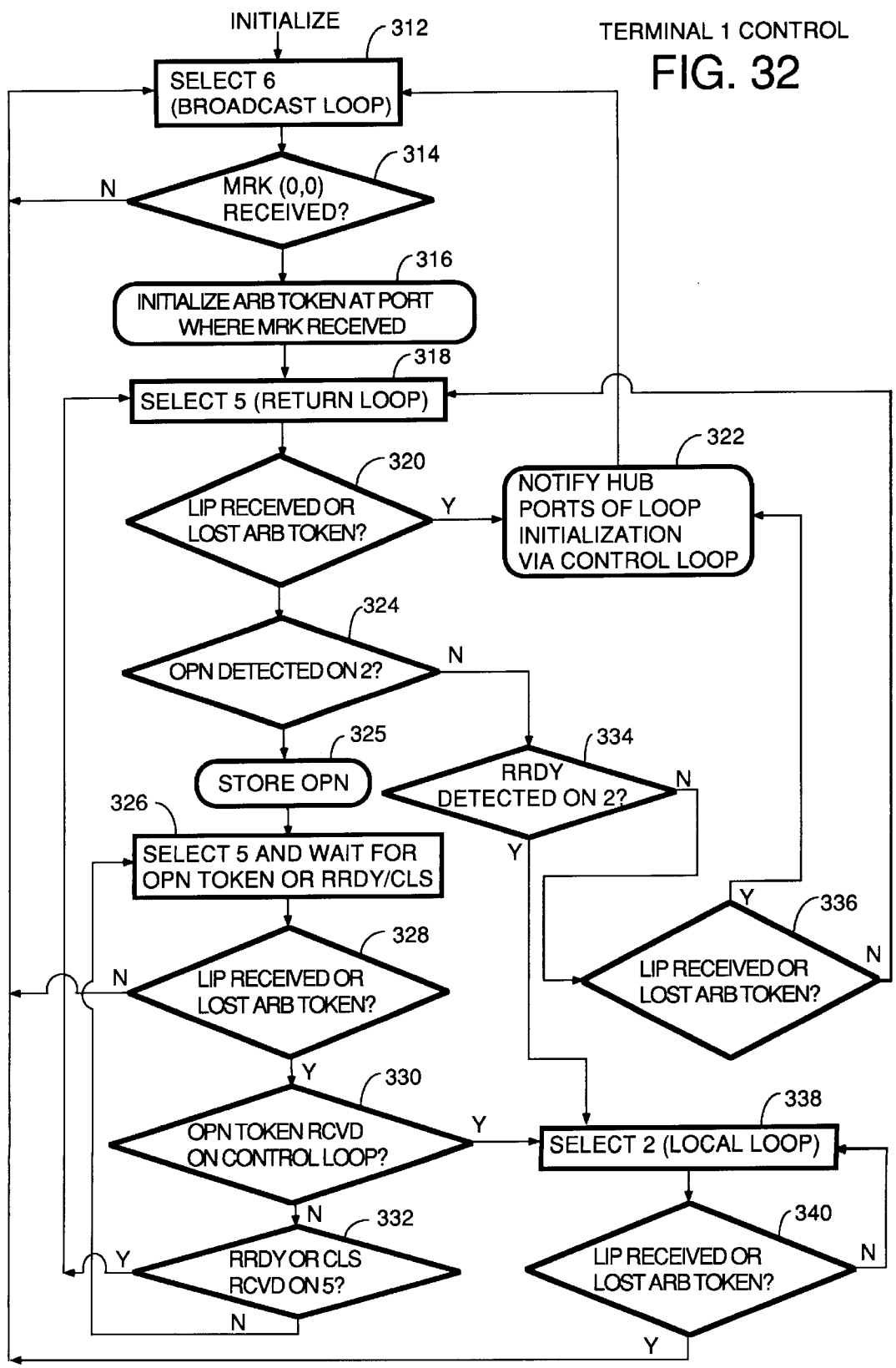
FIG. 32 shows a state diagram in the form of a flow chart illustrating the concurrent processes being carried out in all state machines to control switching of terminal 1.

Referring to FIG. 32, there is shown a state diagram in the form of a flow chart illustrating the concurrent processes being carried out in all state machines to control switching of terminal 1. The process initializes to state 312 wherein a 6-1 connection is made to connect local subloops to the broadcast loop. Next, test 314 determines if a MRK(0,0) primitive has been received. If not, state 312 is maintained. If so, a conditional output state 316 is entered to initialize the ARB token at the hub port where the MRK was received. Next, state 318 is entered to make a 5-1 connection, and test 320 is performed to determine if a LIP has been received or the ARB token has been lost. If either of these events has occurred, another conditional output state 322 is entered to notify the hub ports of loop initialization via the control loop. After this is done, state 312 is reentered.

If test 320 determines no LIP has been received and the ARB token has not been lost, test 324 is performed to determine if an OPN has been received on terminal 2. If so, step 325 is performed to store a copy of the OPN including its destination and source node addresses (if any source node address is included) in a memory in the fill word generator. This stored OPN will be used in case the conclusion is drawn that the destination node is on the local subloop. Next, state 326 is entered to make a 5-1 connection and wait for the OPN token or the appearance of an RRDY or CLS primitive to appear on terminal 5. Then, test 328 determines if a LIP has been received or the ARB token has been lost. If neither of these events has occurred, state 312 is reentered. If either event has occured, test 330 determines if the OPN token has been received on the control loop. If not, test 332 determines if an RRDY or CLS has been received on terminal 5. If not, state 326 is reentered. If so, state 318 is reentered.

If test 324 determined that an OPN has not been detected on terminal 2, test 334 determines whether an RRDY has been detected on terminal 2. If not, test 336 determines if a LIP has been received or the ARB token has been lost. If either even has occurred, conditional output state 322 is reentered. If not, state 318 is reentered.

If test 334 determines that an RRDY has been received on terminal 2, or if test 330 determines that the OPN token has been received on the control loop, state 338 is entered to make a 2-1 connection for local traffic. Then, test 340 is performed to determine if a LIP has been received or the ARB token has been lost. If neither event has occurred, state 338 is maintained. If either event has occurred, state 312 is reentered.

Figure 33:
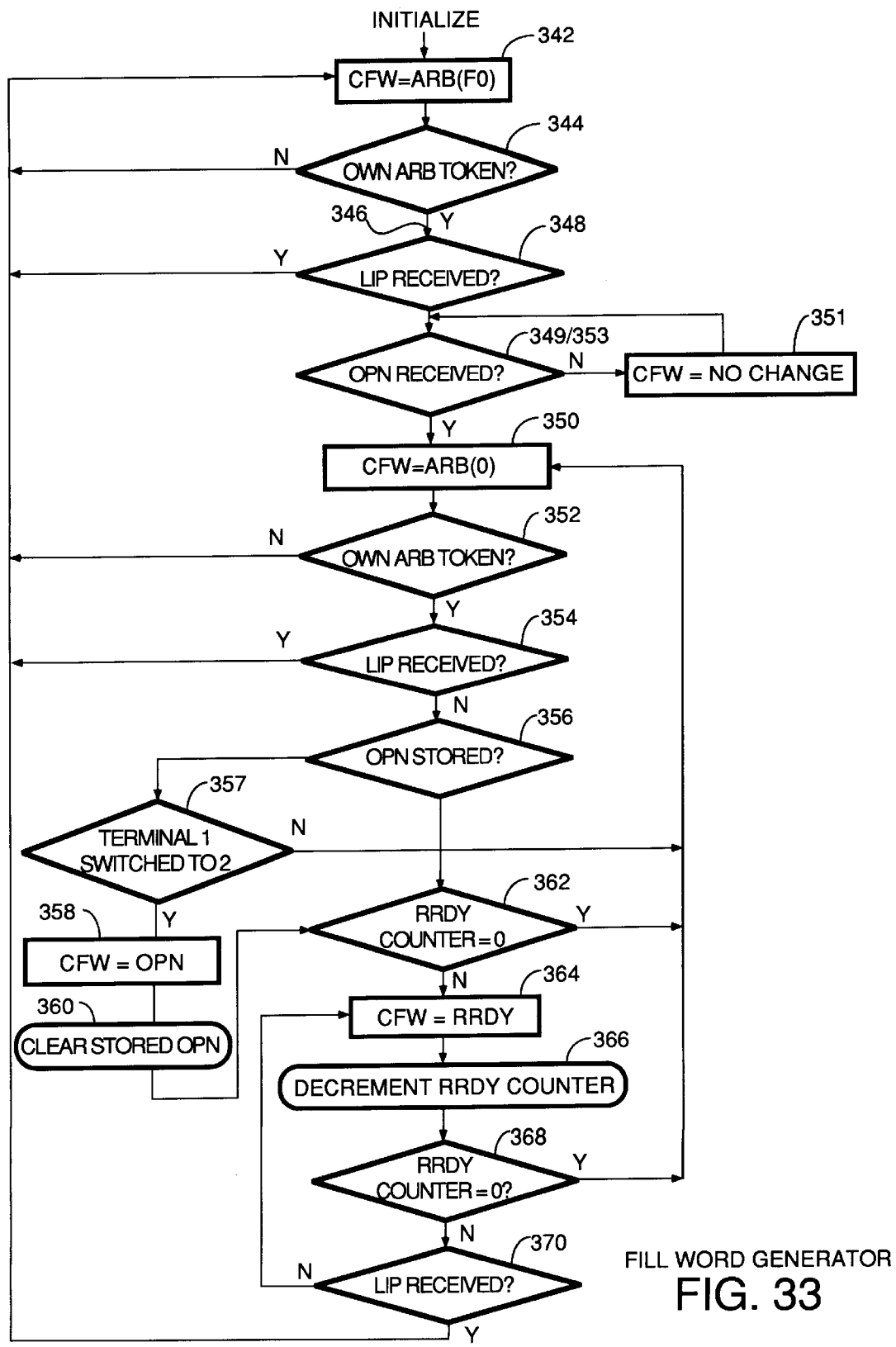
FIG. 33 is a state diagram in the form of a flow chart which shows the processes carried out in all state machine fill word generators to carry out the local arbitrations on each subloop.

Referring to FIG. 33, there is shown a state diagram in the form of a flow chart which illustrates the processing which occurs concurrently in all the hub port fill word generator state machines to carry out the local arbitration. The fill word state machines initialize to state 342 wherein the current fill word is set to ARB(F0). Next, test 344 determines if the hub port owns the ARB token. If not, state 342 is maintained. If the ARB token has been sent to the hub port, it is the active hub port. In this case, path 346 is taken to test 348 which determines if a LIP initialization primitive has been received. If so, state 342 is maintained. If not, test 349 is performed to determine if an OPN has been detected on terminal 2. If not, the active hub port (in possession of the ARB token) passes any inbound ARB primitives outbound on its subloop unchanged to notify the local arbitration winner it has won arbitration and has control of the data path, as symbolized by state 351. Next, test 353 is performed to determine if an OPN has been seen on terminal 2. If not, state 351 is reentered. If so, state 350 is entered to start transmitting ARB(0) primitives outbound on the subloop as probes.

If test 349 determines that an OPN has been seen on terminal 2, state 350 is entered wherein the fill word state machine sets the current fill word to ARB(0). This ARB(0) acts as a probe to determine when the source node has finished transferring all data and has closed the subloop. The source node has a normal state comprised of an OPN, data frame and CLS and a transfer state comprised of OPN, data, CLS, OPN (possibly of another node), data, CLS . . . for as many cycles as it desires. While data is being transferred in either state, the source node effectively opens the subloop and all inbound ARB primitives are thrown away. When transfer or normal mode is complete and the source node has received confirmation of the close from the destination node in the form of receiving its CLS primitive back, the source node then recloses the subloop and passes inbound ARBs straight through unchanged. When the ARB(0) output by the active hub port in state 350 comes back to the active hub port, it knows the data path has been relinquished and forwards the OPN token to the next hub port. This prevents the ARB token from being prematurely transferred to the next hub port in transfer mode which could happen if the state machine was not programmed to probe for the time when the subloop is closed by the source node which is the only time that the active hub port can be sure that the source node is done transferring data. This ARB(0) probe is necessary since the active hub port cannot determine of a source node is in regular mode or transfer mode.

Next, test 352 is performed to determine if the hub port still has the ARB token. If not, state 342 is reentered. If the hub port is still in possession of the ARB token, test 354 is performed to determine if a LIP primitive has been received. If so, state 342 is reentered. If not, test 356 is performed to determine if an OPN primitive has been stored in the case where the destination node is local as determined by return of the OPN token on the return loop. If so, the active hub port test whether its terminal 1 has been connected to its terminal 2 in test 357. If not, state 350 is reentered to wait for the conclusion to be drawn that the destination node is local. If so, the active hub port has concluded that the destination port is on its local subloop along with the source node. In this case, the stored OPN must be propagated out on the local subloop so state 358 is entered to set the current fill word to the OPN which was stored including its destination address. Next, the operation of step 360 is performed to clear the stored OPN so that multiple OPNs are not transmitted to the local destination node. Next, test 362 determines if the RRDY counter is 0. If it is 0, the OPN was half duplex, and state 350 is reentered. If the RRDY counter is something other than 0, the OPN was full duplex, so state 364 is entered and the current fill word is set to RRDY. The series of steps described next are designed to send the number of RRDYs to the local destination as were counted by the RRDY counter so as to handle a full duplex OPN with multiple RRDYs. Step 366 decrements the RRDY counter, and then test 368 tests the RRDY counter again to determine if it has reached 0. If so, state 350 is reentered. If not, test 370 is performed to determine if a LIP primitive has been received. If so, state 342 is reentered. If not, state 364 is reentered.

Figure 1:
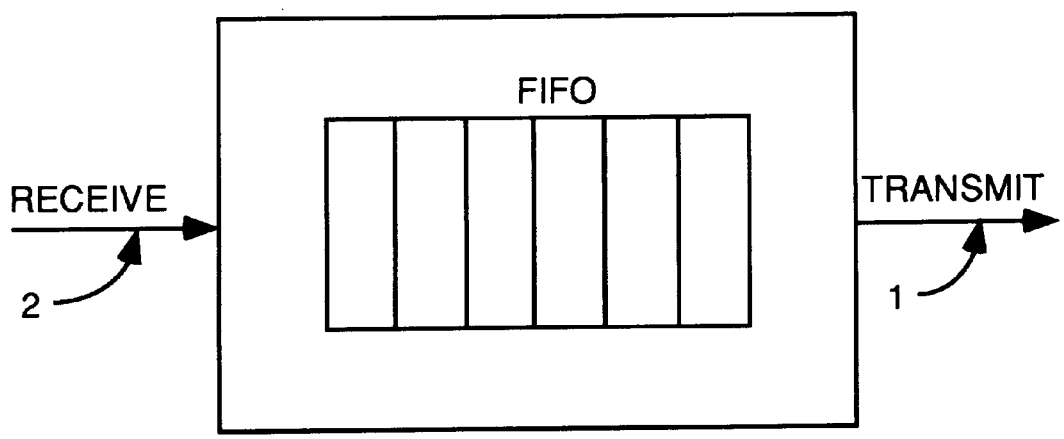
FIG. 1 is a diagram of the prior art structure of a Fibre Channel node showing the 6 word internal FIFO that causes a 6 word delay or latency time when primitives or data frames are transmitted therethrough.
Figure 2:
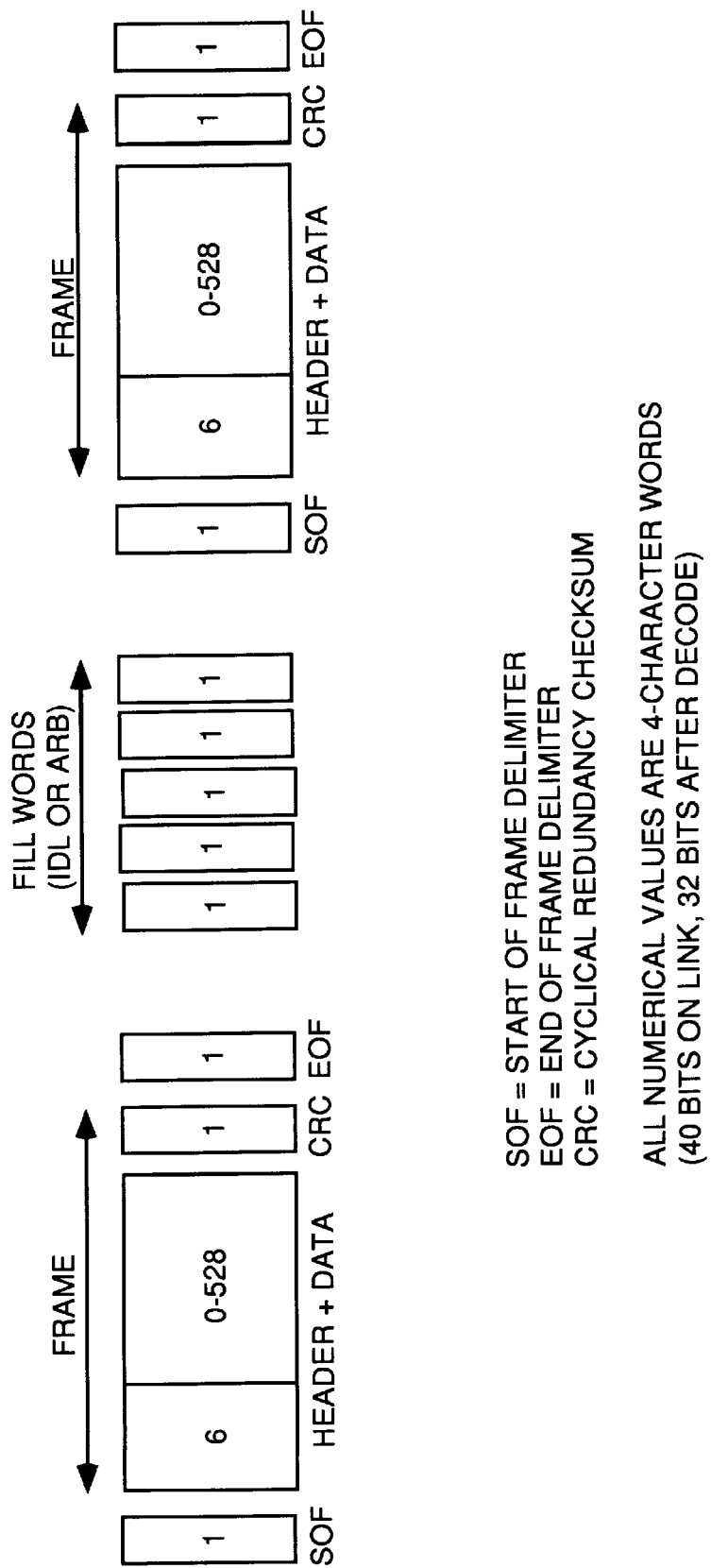
FIG. 2 is a diagram of the structure of prior art data frames and fill words that are transmitted between data frames.
Figure 4:
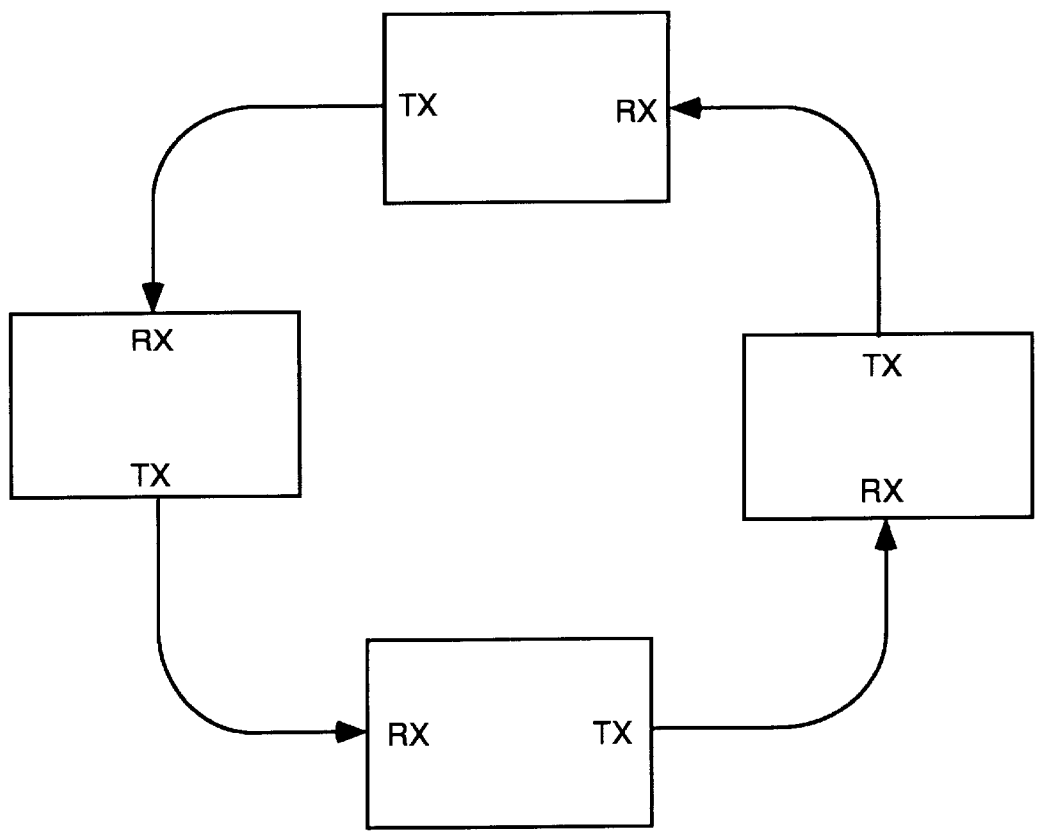
FIG. 4 is a diagram of a prior art Fibre Channel local area network.
Figure 5:
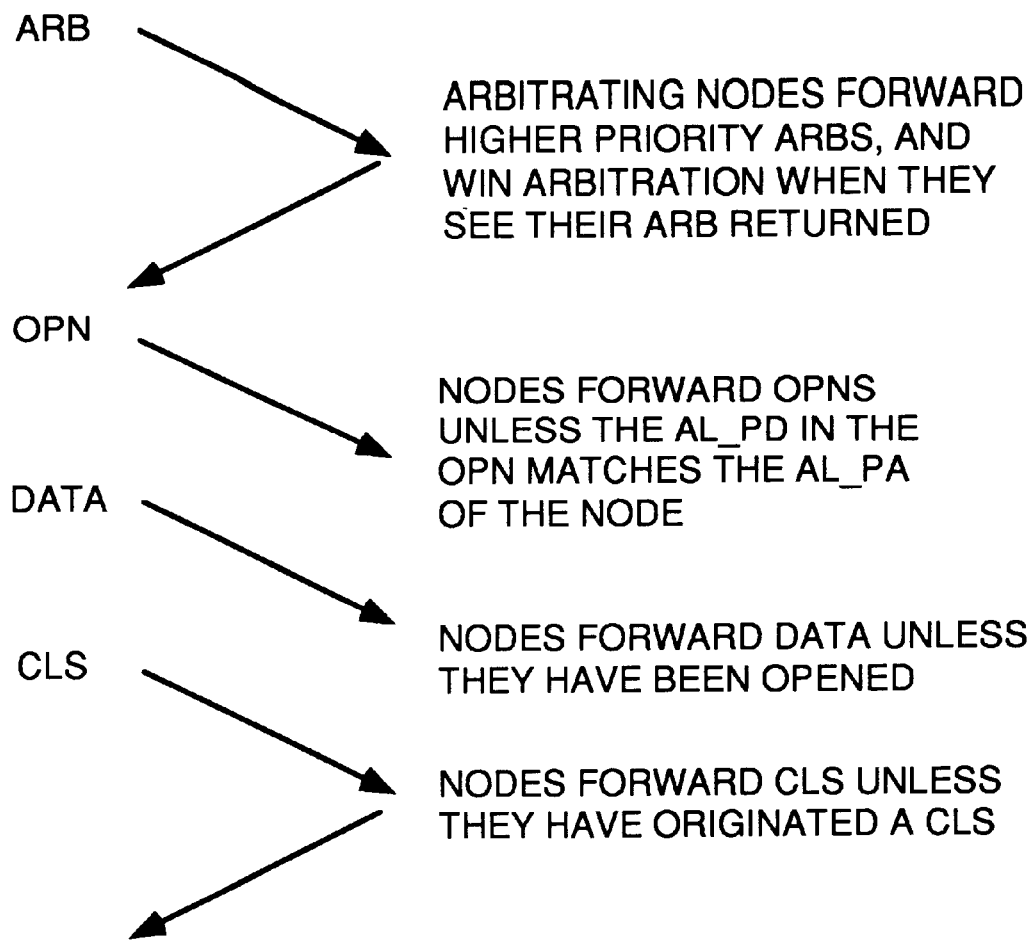
FIG. 5 is a protocol flow of a typical Fibre Channel handshake or protocol to establish control of the local area network for a data transfer, called a loop tenancy.
Figure 6:
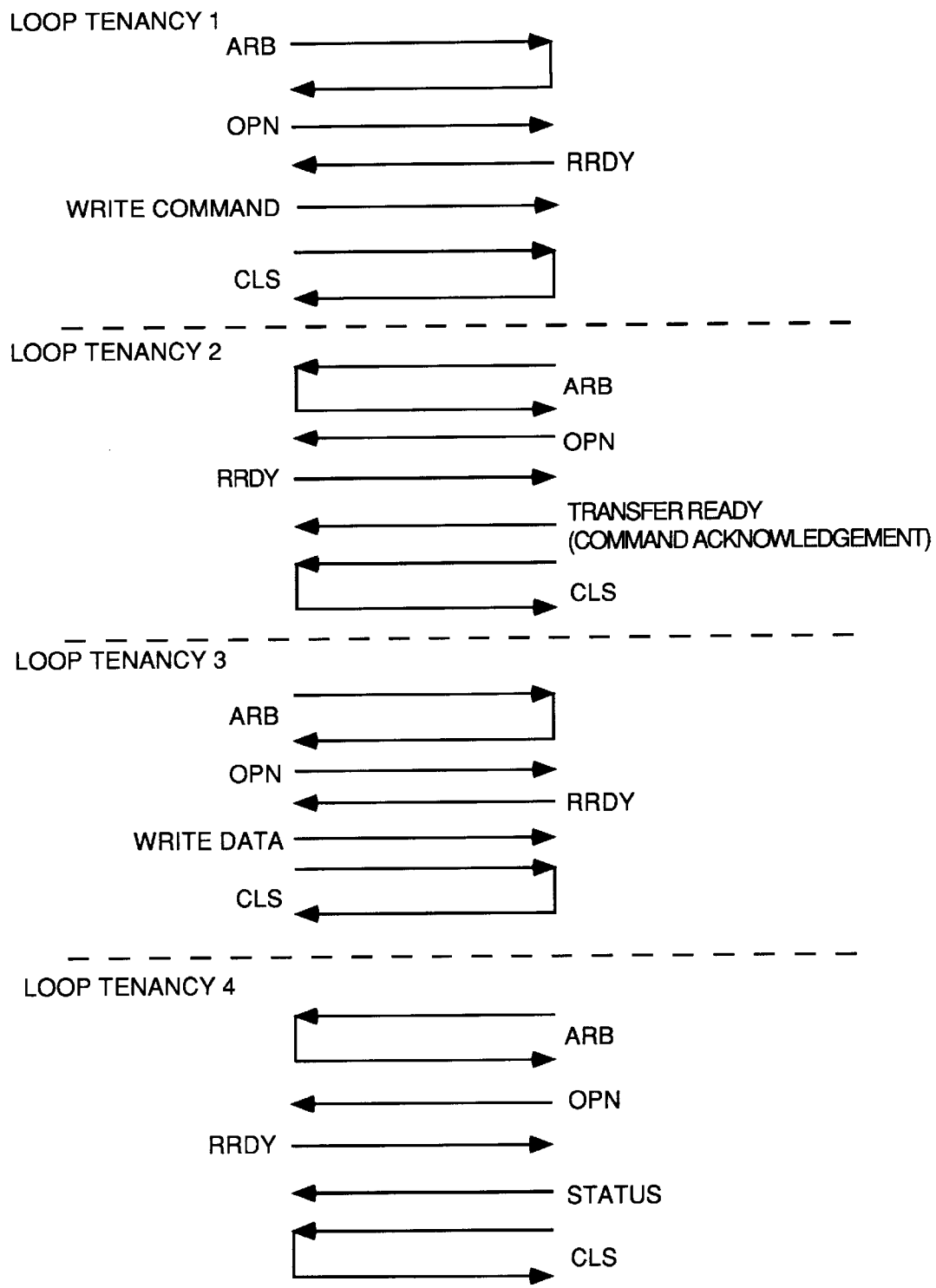
FIG. 6 is a diagram of the prior art handshaking or protocol exchanges that must occur to carry out a write transaction according to the SCSI protocol layer above a Fibre Channel protocol layer to illustrate the latency times that are suffered by the prior art, unaccelerated Fibre Channel protocol.
Figure 7:
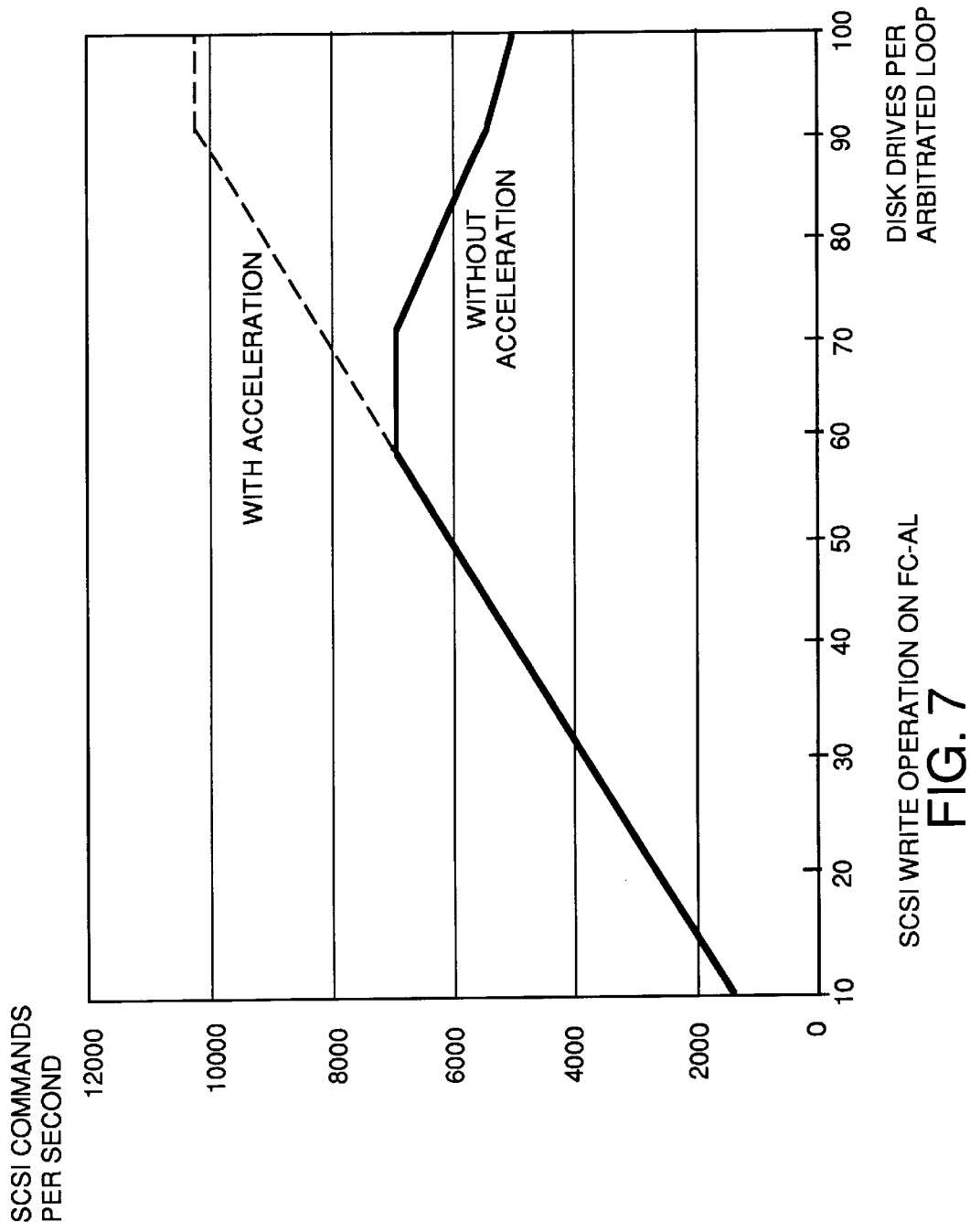
FIG. 7 is a graph of comparing the expected improvements with the accelerated protocol of the invention over the unaccelerated Fibre Channel protocol in term os SCSI commands per second versus the number of disk drives per arbitrated loop.
Figure 34:
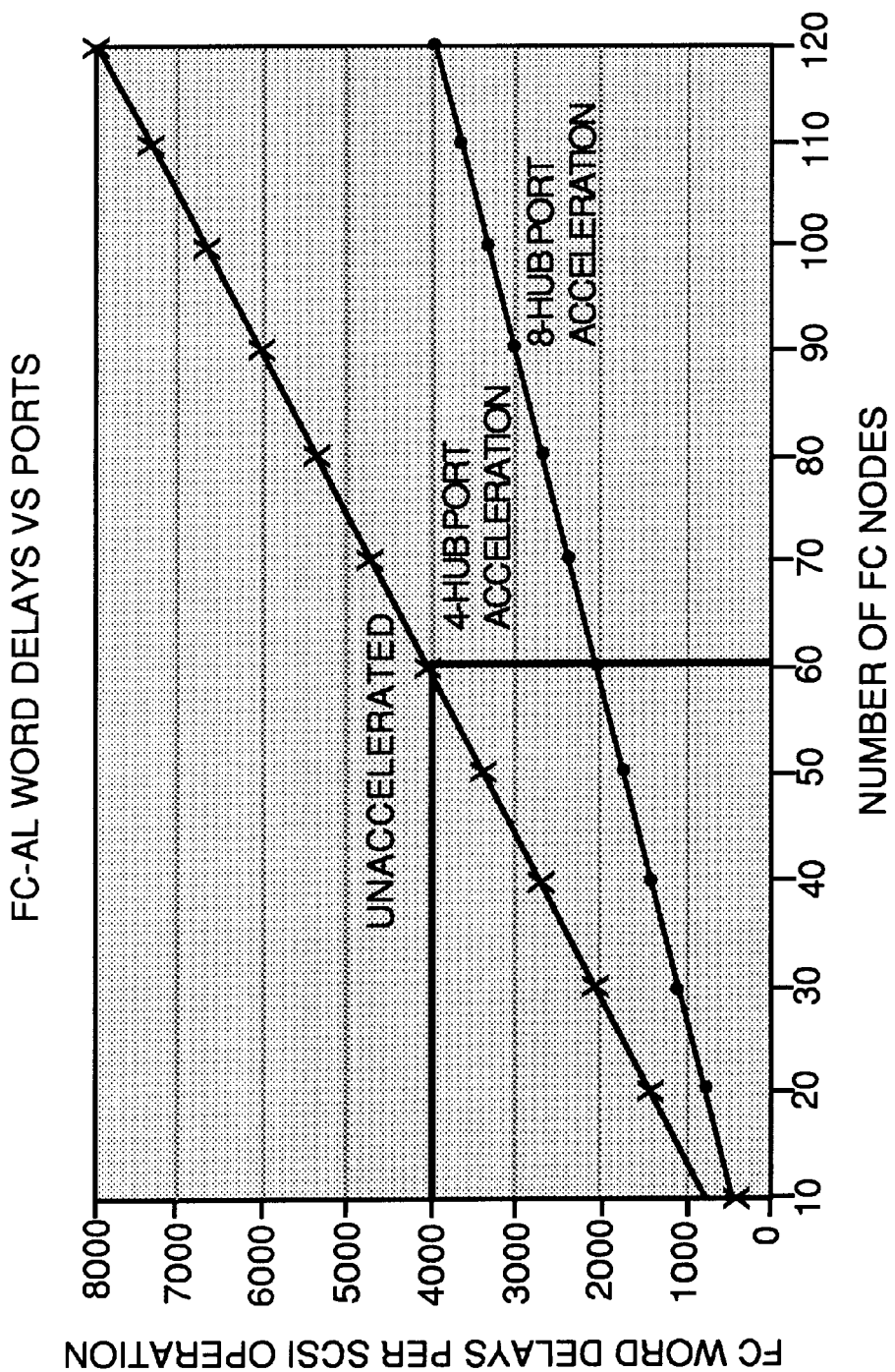
FIG. 34 is a graph showing the amount of acceleration for 4 hub port and 8 hub port accelerated hubs compared to an unaccelerated Fibre Channel Arbitrated Loop hub.

Referring to FIG. 34, there is shown a graph illustrating the acceleration for a 4 hub port and 8 hub port accelerated hub according to the teachings of the invention as compared with an unaccelerated Fibre Channel Arbitrated Loop hub. The acceleration is expressed on the vertical axis in terms of the number of Fibre Channel word delays per SCSI operation for a given number of Fibre Channel nodes on the horizontal axis for various configurations. The graph assumes that each node imposes a 6 word delay and assumes the number of round trips required to execute a SCSI write operation in accordance with the protocol of FIG. 6. The graph further assumes that for an accelerated hub, each sub loop has coupled thereto a number of nodes equal to the total number of nodes divided by the number of hub ports.

As an example of how to use the graph of FIG. 35, assume a Fibre Channel Arbitrated Loop having 60 nodes total. In an unaccelerated hub configuration, 4000 word delays would be suffered to carry out a single SCSI write transaction according to the protocol of FIG. 6. If a 4 hub port accelerated hub were used to couple the 60 total Fibre Channel nodes, 2000 Fibre Channel word delays would be incurred in carrying out each SCSI write transaction according to the protocol of FIG. 6. If a 8 hub port accelerated hub were used to couple the 60 total Fibre Channel nodes, 1000 Fibre Channel word delays would be incurred in carrying out each SCSI write transaction according to the protocol of FIG. 6.

Although the invention has been described in terms of the genus and several species disclosed herein, those skilled in the art will appreciate numerous modifications and alternative embodiments which implement the teachings of the invention. All such modifications and alternative embodiments are intended to be included within the scope of the claims appended hereto.

What is claimed is:

1. A Fibre Channel Arbitrated Loop network, comprising:
a plurality of subloops, each subloop coupling a plurality of Fibre Channel Arbitrated Loop nodes by a data transmission medium;
a plurality of hub port means, each hub port means having subloop data ports coupled to a subloop such that data can be transmitted into the subloop and received from said subloop, and each hub port means having broadcast data ports for coupling to a broadcast loop transmission medium and having return loop data ports for coupling to a return loop transmission medium, each said hub port means for establishing switching connections to accelerate data transmissions between source and destination Fibre Channel Arbitrated Loop nodes by causing the subloops upon which said source and destination nodes are resident, if they are resident on different subloops, to be coupled together such that data passing between said source and destination Fibre Channel Arbitrated Loop nodes does not have to pass through all the Fibre Channel Arbitrated Loop nodes on any subloop on which neither the source Fibre Channel Arbitrated Loop node nor destination Fibre Channel Arbitrated Loop node is resident;
a broadcast loop transmission medium coupling all said hub port means together via their said broadcast data ports; and
a return loop transmission medium coupling all said hub port means together via their said return loop data ports; and
a control loop coupling all said hub port means together to carry control token data.

2. A subloop for use in a Fibre Channel Arbitrated Loop network, comprising:
first means for receiving inbound ARB primitives and substituting an ARB (F0) priority ranking into any received ARB primitive and transmitting the ARB primitive with the ARB F(0) priority ranking, and having inbound and outbound data ports;
a transmission media coupled to said inbound data and outbound data ports of said first means;
a plurality of Fibre Channel Arbitrated Loop nodes having inbound and outbound data ports coupled to said transmission media, each said Fibre Channel Arbitrated Loop node having a priority ranking and having means for examining the priority of inbound ARB primitives and substituting the priority ranking of said Fibre Channel Arbitrated Loop node in said ARB primitive if said Fibre Channel Arbitrated Loop node desires control of said Fibre Channel Arbitrated Loop network if and only if the priority ranking of the inbound ARB primitive is lower than the priority ranking of said Fibre Channel Arbitrated Loop node so as to generate a modified ARB primitive, and transmitting the modified ARB primitive out on said transmission media, and, if the priority ranking of the inbound ARB primitive is higher than the priority ranking of the Fibre Channel Arbitrated Loop node, retransmitting the ARB primitive unchanged.

3. A Fibre Channel Arbitrated Loop network, comprising:
a plurality of subloops, each comprised of:
a hub port means means for receiving inbound ARB primitives and substituting an ARB (F0) priority ranking into any received ARB primitive to generate a modified ARB primitive, and transmitting the modified ARB primitive out onto said subloop, each hub port means having an inbound data port and an outbound data port;
a transmission medium coupled to said inbound data port and said outbound data port of said hub port means;
a plurality of Fibre Channel Arbitrated Loop nodes, each having inbound and outbound data ports coupled to said transmission medium, each said Fibre Channel Arbitrated Loop node having a priority ranking and having arbitration means for examining the priority of inbound ARB primitives and substituting the priority ranking of said Fibre Channel Arbitrated Loop node in said ARB primitive if said Fibre Channel Arbitrated Loop node desires control of said Fibre Channel Arbitrated Loop network if and only if the priority ranking of the inbound ARB primitive is lower than the priority ranking of said Fibre Channel Arbitrated Loop node so as to generate a modified ARB primitive, and transmitting said modified ARB primitive out on said transmission medium, and, if the priority ranking of the inbound ARB primitive is higher than the priority ranking of the Fibre Channel Arbitrated Loop node, retransmitting the ARB primitive unchanged;
and further comprising a broadcast loop transmission medium and a return loop transmission medium coupling said each said hub port means together in a ring topology;
and wherein each said hub port means further comprises means for receiving an ARB token and stopping substituting priority ranking F0 into inbound ARB primitives and retransmitting said incoming ARB primitives unchanged;
and wherein said arbitrations means in each of said Fibre Channel Arbitrated Loop nodes includes means for examining incoming ARB primitive priority rankings, and if a match to said Fibre Channel Arbitrated Loop node's priority ranking is found, determining that said Fibre Channel Arbitrated Loop node is to be the source node in a Fibre Channel Arbitrated Loop Tenancy data transfer and transmitting an OPN primitive identifying a destination node to which data is to be sent during said loop tenancy;
and wherein each said hub port means further comprises means for examining each OPN primitive arriving at its inbound data port from the subloop to which said hub port means is connected and making a determination if the destination Fibre Channel Arbitrated Loop node identified in an OPN primitive is on the same local subloop to which said hub port means is connected, and, if so, making a switching connection such that data can pass between said source and destination Fibre Channel Arbitrated Loop nodes on the subloop transmission media to which said hub port means is connected without the need for said data to propagate across either said broadcast loop or said return loop, and, if the destination Fibre Channel Arbitrated Loop node identified in an OPN primitive arriving at said inbound data port from a source Fibre Channel Arbitrated Loop node on the subloop to which said hub port means is connected is not on the same said local subloop as said source Fibre Channel Arbitrated Loop node, broadcasting said OPN primitive on said broadcast loop to all other hub port means, and wherein each said hub port means includes means for receiving broadcast OPN primitives from said broadcast loop and transmitting said broadcast OPN primitives on their local subloops, and wherein each said hub port means includes means for making a determination as to which subloop has the destination Fibre Channel Arbitrated Loop node identified in said broadcast OPN primitive coupled thereto, said determination made by determining the primitives that arrive at predetermined ports of said hub port means and the order in which they arrive and drawing inferences therefrom according to predetermined rules, and making appropriate switching connections based upon said inferences such that only the subloops having the source and destination Fibre Channel Arbitrated Loop nodes coupled thereto are coupled together through said broadcast and return loop transmission media such that data flowing between said source and destination Fibre Channel Arbitrated Loop nodes does not need to flow through any Fibre Channel Arbitrated Loop nodes on subloops not having either the source or destination node coupled thereto.

4. A Fibre Channel Arbitrated Loop network, comprising:
   a plurality of subloops, each subloop coupling a plurality of Fibre Channel Arbitrated Loop nodes by a data transmission medium;
   a plurality of hub port means, each hub port means having subloop data ports coupled to a subloop such that data can be transmitted into the subloop and received from said subloop, and each hub port means having broadcast data ports and having return loop data ports, each said hub port means for conducting simultaneous arbitration on its subloop with concurrent arbitrations on other subloops such that the arbitration winner on each said subloop is already established in advance of the time an ARB token arrives;
   a data path coupling said hub port means together and carrying data between said broadcast data ports and between said return loop data ports.

5. The apparatus of claim 4 wherein said data path is a time division multiple access bus having one or more time slots dedicated to carrying data between broadcast data ports and one or more other timeslots dedicated to carrying data between said return loop data ports and other timeslots for carrying control token data.

6. The apparatus of claim 4 wherein said data path is comprised of:
   a broadcast loop transmission medium coupling all said hub port means together via their said broadcast data ports; and
   a return loop transmission medium coupling all said hub port means together via their said return loop data ports; and
   a control loop coupling all said hub port means together to carry control token data.

7. A Fibre Channel Arbitrated Loop network, comprising:
   a plurality of subloops, each subloop coupling a plurality of Fibre Channel Arbitrated Loop nodes by a data transmission medium;
   a plurality of hub port means, each hub port means having subloop data ports coupled to a subloop such that data can be transmitted into the subloop and received from said subloop, and each hub port means having broadcast data ports and having return loop data ports, each said hub port means for determining a source Fibre Channel Arbitrated Loop node and receiving an OPN primitive therefrom and broadcasting said OPN primitive to all other said hub port means, each said hub port means including means for circulating on its local subloop any OPN primitive received from another hub port means so as to locate the destination Fibre Channel Arbitrated Loop node identified in said OPN primitive more quickly;
   a data path coupling said hub port means together and carrying data between said broadcast data ports and between said return loop data ports.

8. The apparatus of claim 7 wherein said data path is a time division multiple access bus having one or more time slots dedicated to carrying data between broadcast data ports and one or more other timeslots dedicated to carrying data between said return loop data ports and other timeslots for carrying control token data.

9. The apparatus of claim 7 wherein said data path is comprised of:
   a broadcast loop transmission medium coupling all said hub port means together via their said broadcast data ports; and
   a return loop transmission medium coupling all said hub port means together via their said return loop data ports; and
   a control loop coupling all said hub port means together to carry control token data.

10. A Fibre Channel Arbitrated Loop network, comprising:
    a plurality of subloops, each subloop coupling a plurality of Fibre Channel Arbitrated Loop nodes by a data transmission medium;
    a plurality of hub port means, each hub port means having subloop data ports coupled to a subloop such that data can be transmitted into the subloop and received from said subloop, and each hub port means having broadcast data ports and having return loop data ports, each said hub port means for making switching connections after a source Fibre Channel Arbitrated Loop node and a destination Fibre Channel Arbitrated Loop node are found such that data may be transmitted between said Fibre Channel Arbitrated Loop source node and said Fibre Channel Arbitrated Loop destination node without having to pass through the Fibre Channel Arbitrated Loop nodes on subloops not having either said Fibre Channel Arbitrated Loop source node or said Fibre Channel Arbitrated Loop destination node coupled thereto;
    a data path coupling said hub port means together and carrying data between said broadcast data ports and between said return loop data ports.

11. The apparatus of claim 10 wherein said data path is a time division multiple access bus having one or more time slots dedicated to carrying data between broadcast data ports and one or more other timeslots dedicated to carrying data between said return loop data ports and other timeslots for carrying control token data.

12. The apparatus of claim 10 wherein said data path is comprised of:
    a broadcast loop transmission medium coupling all said hub port means together via their said broadcast data ports; and
    a return loop transmission medium coupling all said hub port means together via their said return loop data ports; and
    a control loop coupling all said hub port means together to carry control token data.

* * * * *